United States Patent [19]

Faris

[11] Patent Number: 6,111,598

[45] Date of Patent: Aug. 29, 2000

[54] SYSTEM AND METHOD FOR PRODUCING AND DISPLAYING SPECTRALLY-MULTIPLEXED IMAGES OF THREE-DIMENSIONAL IMAGERY FOR USE IN FLICKER-FREE STEREOSCOPIC VIEWING THEREOF

[75] Inventor: Sadeg M. Faris, Pleasantville, N.Y.

[73] Assignee: Peveo, Inc., Hawthorne, N.Y.

[21] Appl. No.: 08/152,020

[22] Filed: Nov. 12, 1993

[51] Int. Cl.[7] ..................................................... H04N 13/04
[52] U.S. Cl. .................................. 348/57; 348/42; 348/58
[58] Field of Search ................................ 348/42, 51, 55, 348/56, 57, 58; H04N 13/04

[56] References Cited

U.S. PATENT DOCUMENTS

| 1,435,520 | 11/1922 | Hammond . |
| 2,099,694 | 11/1937 | Land . |
| 2,301,254 | 11/1942 | Carnahan . |
| 2,317,875 | 4/1943 | Athey et al. . |
| 2,385,687 | 9/1945 | Carnahan . |

(List continued on next page.)

FOREIGN PATENT DOCUMENTS

| 5389959 | 3/1980 | Japan . |
| 59-264515 | 6/1986 | Japan . |
| 6159555 | 9/1987 | Japan . |
| 489888 | 8/1938 | United Kingdom . |
| 1523436 | 8/1978 | United Kingdom . |
| 2111798 | 7/1983 | United Kingdom . |
| 2231754 | 11/1990 | United Kingdom . |

OTHER PUBLICATIONS

"Stereoscopic real–time and multiplexed video system" by Lenny Lipon, StereoGraphics Corporation, published in SPIE vol. 1915, Stereoscopic Displays and Applications IV, pp. 6–11, Feb. 1993.

Technical Brochure for the SGS 310, 410, 610 Stereoscopic 3–D Display Kits, published Jun. 1992 from Tektronix Display Products, Beaverton, Oregon.

Article in NASA Tech Briefs, Sep. 1991, pp. 12–13, Describing CrystalEyes® stereo 3–D viewing system from StereoGraphics Corp., San Rapheal, CA.

"Large Screen Electro–stereoscopic Displays" by Lenny Lipton, published in SPIE vol. 1255 Large–Screen Projection Display II, pp. 108–103, Feb. 1990.

(List continued on next page.)

Primary Examiner—Howard W. Britton
Attorney, Agent, or Firm—Thomas J. Perkowski, Esq.

[57] ABSTRACT

A Method and apparatus is provided for producing and displaying pairs of spectrally-multiplexed gray-scale or color images of 3-D scenery for use in stereoscopic viewing thereof. In one illustrative embodiment of the present invention, pairs of spectrally-multiplexed color images of 3-D scenery are produced using a camera system records left and right color perspective images thereof and optically processes the spectral components thereof. In another illustrative embodiment of the present invention, pairs of spectrally-multiplexed color images of 3-D imagery are produced within a computer-based system which generates left and right perspective images thereof using computer graphic processes, and processes the pixel data thereof using pixel-data processing methods of the present invention. Thereafter, produced pairs of spectrally-multiplexed images can be recorded on diverse recording mediums, and accessed by the display system of the present invention for real-time display on diverse display surfaces including, for example, flat-panel liquid-crystal display (LCD) surfaces, CRT display surfaces, projection display screen surfaces, and electro-luminescent panel display surfaces. In the various illustrative embodiments of the display system, stereoscopic viewing of 3-D imagery is facilitated by wearing electrically passive or electrically-active light polarizing spectacles during the image display process of the present invention.

21 Claims, 40 Drawing Sheets

U.S. PATENT DOCUMENTS

| | | |
|---|---|---|
| 2,417,446 | 3/1947 | Reynolds . |
| 2,571,612 | 10/1951 | Rines . |
| 2,631,496 | 3/1953 | Rehorn . |
| 2,647,440 | 8/1953 | Rehorn . |
| 2,949,055 | 8/1960 | Blackstone . |
| 2,983,835 | 5/1961 | Frey . |
| 3,275,745 | 9/1966 | Var . |
| 3,371,324 | 2/1968 | Sinto . |
| 3,507,549 | 4/1970 | Land . |
| 3,741,626 | 6/1973 | Wentz . |
| 3,807,831 | 4/1974 | Soret . |
| 3,821,466 | 6/1974 | Roese . |
| 3,858,001 | 12/1974 | Bonne . |
| 3,944,351 | 3/1976 | Ito et al. . |
| 4,122,484 | 10/1978 | Tan . |
| 4,281,341 | 7/1981 | Byatt . |
| 4,286,286 | 8/1981 | Jurosson et al. . |
| 4,431,265 | 2/1984 | Benton . |
| 4,504,856 | 3/1985 | Jackman . |
| 4,523,226 | 6/1985 | Lipton et al. . |
| 4,562,463 | 12/1985 | Lipton . |
| 4,566,758 | 1/1986 | Bos . |
| 4,582,396 | 4/1986 | Bos et al. . |
| 4,583,117 | 4/1986 | Lipton . |
| 4,588,259 | 5/1986 | Sheiman . |
| 4,641,178 | 2/1987 | Street .................................... 348/57 |
| 4,670,744 | 6/1987 | Buzak . |
| 4,709,263 | 11/1987 | Brumage . |
| 4,719,507 | 1/1988 | Bos . |
| 4,723,159 | 2/1988 | Imsand . |
| 4,792,850 | 12/1988 | Lipton . |
| 4,873,572 | 10/1989 | Miyuzaki et al. . |
| 4,877,307 | 10/1989 | Kalmanush . |
| 4,943,852 | 7/1990 | Femano et al. . |
| 4,984,179 | 1/1991 | Waldern . |
| 4,995,718 | 2/1991 | Jachimowicz ........................ 353/31 |
| 5,007,715 | 4/1991 | Verhulst . |
| 5,113,285 | 5/1992 | Franklin . |

OTHER PUBLICATIONS

"Field–sequential Electronic Stereoscopic Projector" by Lenny Lipton, published in SPIE vol. 1081 Projection Display Technology Systems and Applications, pp. 94–100, Jan. 1989.

"Compatibility of Stereoscopic Video Systems with Broadcast Television Standards" by Lenny Lipton, published in SPIE vol. 1083 Three–Dimensional Visualization and Display Technologies, pp. 95–101, 1989.

"Field–Sequential Stereoscopic Viewing Systems Using Passive Glasses" by Bos, et al., published in Proceedings of the SID, vol. 30, No. 1, pp. 39–43, 1989.

"A Real–time Autostereoscopic Multiplanar 3D Display System" by Rodney Williams, et al. of Texas Instruments, Inc., published in SID 88 Digest, pp. 91–94, 1988.

"High–Performance 3D Viewing Systems Using Passive Glasses", by Philip Bos, published in SID 88 Digest, pp. 450–453, 1988.

"Experience with Stereoscopic Devices and Output Algorithms" by James S. Lipscomb, published in SPIE vol. 1083 Thre–Dimensional Visualization and Display Technologies, pp. 28–34, 1989.

"3–D Comes Home" by Tom Waters, published in Discover, May 1988, pp. 30–32.

"Circular Polarization Image Selection for Timeplex Stereoscopic Video Devices" by Lenny Lipton, Stereographics Corporation, published in SPIE vol. 779 Display System Optics, May 1987, pp. 41–44.

"Three–dimensional TV with cordless FLC Spectacles" by W.J. Hartmann et al., published in Information Display, vol. 10, 1987, pp. 15–17.

"Holographic Display of Three–Dimensional Images" by Larry Hodges et al., published in Information Display, vol. 10, 1987, pp. 8–11.

"Hard copy for true three–dimensional images" by Larry Hodges, et al., published in Information Display, vol. 9, 1987, pp. 12–15,25.

"True three–dimensional CRT–based displays" by Larry Hodges, et al., published in Information Display, vol. 5, 1987, pp. 18–22.

"Holographic Micropatterns and the Ordering of Photographic Grains in Film Systems"(Abstract) by James Cowan, et al., published in ACTA Polytechnica Scandinavica, Applied Physics Series No. 149, Proceedings of Image Science '85, vol. 1, Jun. 1985.

"Three–dimensional Projection with Circular Polarizers" by Vivian Walworth, et al., published by SPIE vol. 462 Optics in Entertainment II, Jan. 1984, pp. 64–68.

"Varifocal Mirror Techniques for Video Transmission of Three–Dimensional Images" by M.C. King, et al., published in Applied Optics, vol. 9, No. 9, Sep. 1970, pp. 2035–2039.

Section 14.6.3 Dichroic Polarizers (pp. 716–718), in Principles of Optics (Fourth Edition) 1970, by Max Born and Emil Wolf, published by Pergamon Press, Oxford.

"A New Approach to Computer–Generated Holography" by M.C. King, et al., published in Applied Optics, vol. 9, No. 2, Feb. 1970, pp. 471–475.

Chapter 10, Section 10.1 Introduction to Polarized Light, Section 10.2 Methods of Producing Polarized Light, and Section 10.3 The Transverse Nature of Light (pp. 485–520), in Optics by Miles V. Klein, published by John Wiley & Sons, Inc. New York.

Chapter 8, Polarization pp. 394–450, in Waves: Berkeley Physics Course–vol. 3, Frank S. Crawford, Jr.

Low–Cost 3–D TV in Electronics (Edited by Alexander A. McKenzie), Jul. 1953, at p. 1996.

Proposal entitled "3–D Flat Panel Color Display PRDA 89–9 Technical/Management and Cost" prepared for Directorate of R&D Contracting ASD/PMRNB, Wright–Patterson AFB, Ohio, by Honeywell, Inc. Systems and Research Center, Phoenix Technology Center, Aug. 1989.

The 1993 product brochure entitled "Professional Products" from the 3D TV Corporation, of San Rafael, California (10 pages).

| FRAME # | $V_L$ | $V_R$ | $I_{L1}/I_{L2}$ | $I_{R1}/I_{R2}$ |
|---|---|---|---|---|
| 1 | 0 | HIGH | GREEN | MAGENTA |
| 2 | HIGH | 0 | MAGENTA | GREEN |
| 3 | 0 | HIGH | GREEN | MAGENTA |
| 4 | HIGH | 0 | MAGENTA | GREEN |
| 5 | 0 | HIGH | GREEN | MAGENTA |
| 6 | HIGH | 0 | MAGENTA | GREEN |

$I_{SMC1}(1,1)$
$I_{SMC1}(2,1)$
$I_{SMC1}(1,2)$
$I_{SMC1}(2,2)$
$I_{SMC1}(1,3)$
$I_{SMC1}(2,3)$

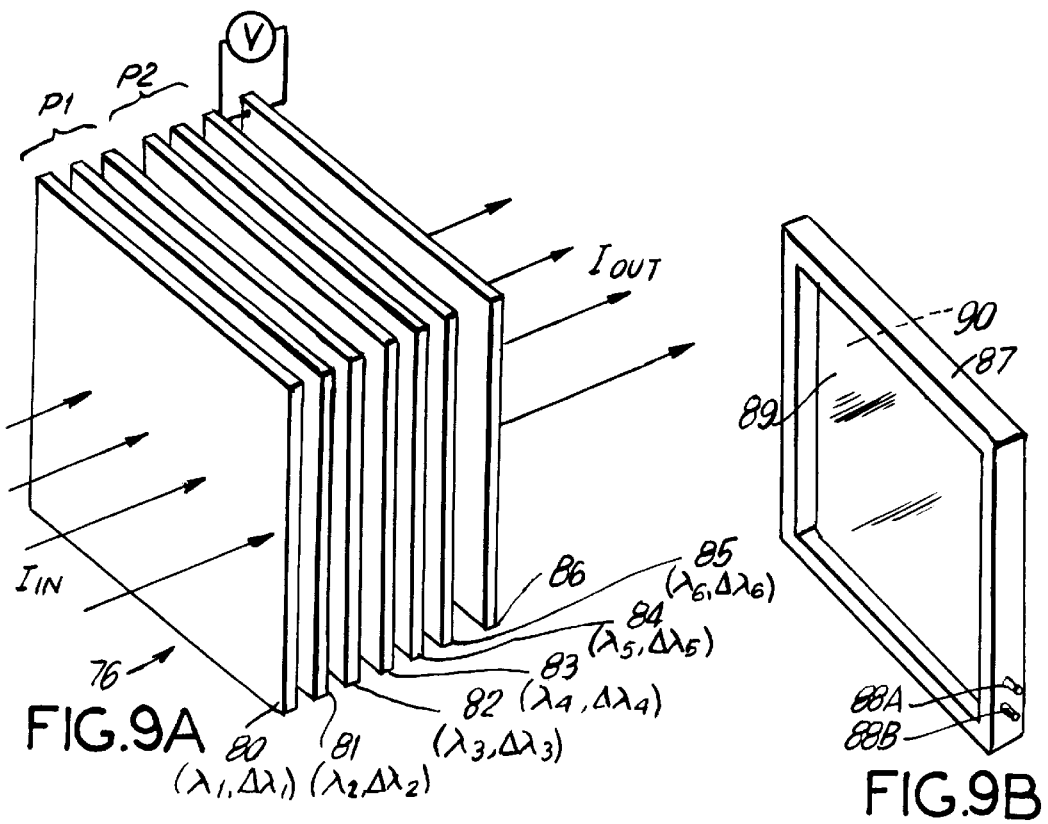
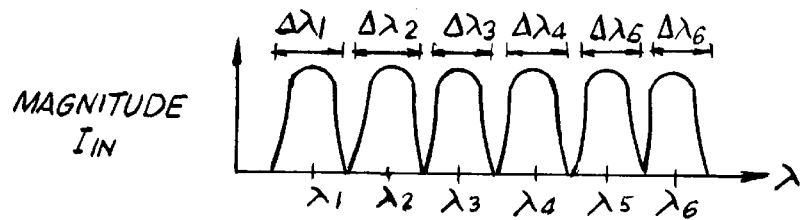
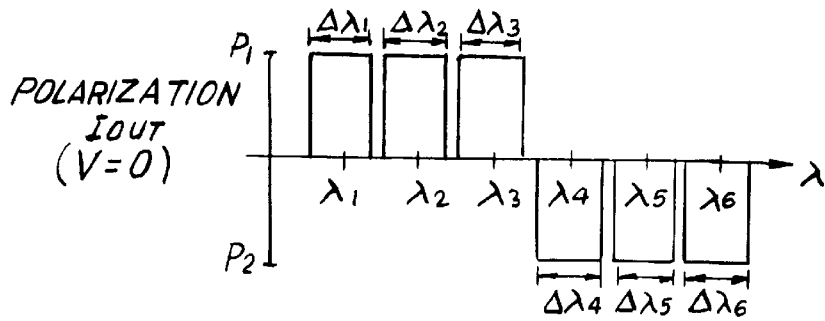
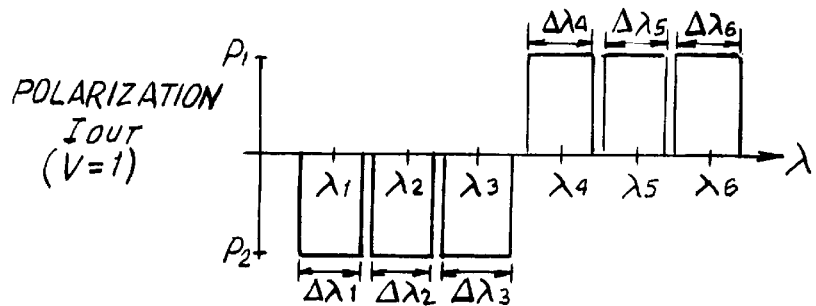

| FRAME # | SPECTRAL COMPS. OF DISPLAY OUTPUT | POLARIZATION STATE OF DISPLAY OUTPUT | SPECTRAL COMPS. VIEWED BY LEFT EYE | SPECTRAL COMPS. VIEWED BY RIGHT EYE | $V_L$ | $V_R$ |
|---|---|---|---|---|---|---|
| 1 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 2 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |
| 3 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 4 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |
| 5 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 6 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |

Frames 1–2: $I_{SMCI}(1,1)$, $I_{SMCI}(2,1)$
Frames 3–4: $I_{SMCI}(1,2)$, $I_{SMCI}(2,2)$
Frames 5–6: $I_{SMCI}(1,3)$, $I_{SMCI}(2,3)$

FIG. 10B

| FRAME # | SPECTRAL COMPS. OF DISPLAY OUTPUT | POLARIZATION STATE OF DISPLAY OUTPUT | SPECTRAL COMPS. VIEWED BY LEFT EYE | SPECTRAL COMPS. VIEWED BY RIGHT EYE | $V_L$ | $V_R$ |
|---|---|---|---|---|---|---|
| 1 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 2 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |
| 3 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 4 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |
| 5 | LEFT IMAGE, MAGENTA | P2 | LEFT IMAGE, MAGENTA | RIGHT IMAGE, GREEN | 0 | 0 |
|   | RIGHT IMAGE, GREEN | P1 |   |   |   |   |
| 6 | LEFT IMAGE, GREEN | P2 | LEFT IMAGE, GREEN | RIGHT IMAGE, MAGENTA | 1 | 1 |
|   | RIGHT IMAGE, MAGENTA | P1 |   |   |   |   |

Frame groupings: $I_{SMCI}(1,1)$, $I_{SMCI}(2,1)$, $I_{SMCI}(1,2)$, $I_{SMCI}(2,2)$, $I_{SMCI}(1,3)$, $I_{SMCI}(2,3)$

FIG. 11B

| FRAME # | SPECTRAL COMPS. OF DISPLAY OUTPUT | POLARIZATION STATE OF DISPLAY OUTPUT | SPECTRAL COMPS. VIEWED BY LEFT EYE | SPECTRAL COMPS. VIEWED BY RIGHT EYE | $V_{OISP}$ |
|---|---|---|---|---|---|
| 1 | LEFT IMAGE, MAGENTA | P2 | LEFT IMAGE, MAGENTA | RIGHT IMAGE, GREEN | 0 |
|   | RIGHT IMAGE, GREEN | P1 |   |   |   |
| 2 | LEFT IMAGE, GREEN | P2 | LEFT IMAGE, GREEN | RIGHT IMAGE, MAGENTA | 1 |
|   | RIGHT IMAGE, MAGENTA | P1 |   |   |   |
| 3 | LEFT IMAGE, MAGENTA | P2 | LEFT IMAGE, MAGENTA | RIGHT IMAGE, GREEN | 0 |
|   | RIGHT IMAGE, GREEN | P1 |   |   |   |
| 4 | LEFT IMAGE, GREEN | P2 | LEFT IMAGE, GREEN | RIGHT IMAGE, MAGENTA | 1 |
|   | RIGHT IMAGE, MAGENTA | P1 |   |   |   |
| 5 | LEFT IMAGE, MAGENTA | P2 | LEFT IMAGE, MAGENTA | RIGHT IMAGE, GREEN | 0 |
|   | RIGHT IMAGE, GREEN | P1 |   |   |   |
| 6 | LEFT IMAGE, GREEN | P2 | LEFT IMAGE, GREEN | RIGHT IMAGE, MAGENTA | 1 |
|   | RIGHT IMAGE, MAGENTA | P1 |   |   |   |

Frames 1,2: $I_{SMCI}(1,1)$, $I_{SMCI}(2,1)$
Frames 3,4: $I_{SMCI}(1,2)$, $I_{SMCI}(2,2)$
Frames 5,6: $I_{SMCI}(1,3)$, $I_{SMCI}(2,3)$

FIG. 12C

| FRAME # | SPECTRAL COMPS. OF DISPLAY OUTPUT | POLARIZATION STATE OF SPECT. COMP. | SPECTRAL COMPS. VIEWED BY LEFT EYE | SPECTRAL COMPS. VIEWED BY RIGHT EYE | $V_{OISP}$ |
|---|---|---|---|---|---|
| 1 | LEFT IMAGE, MAGENTA | P2 | LEFT IMAGE, MAGENTA | RIGHT IMAGE, GREEN | 0 |
|   | RIGHT IMAGE, GREEN | P1 |  |  |  |
| 2 | LEFT IMAGE, GREEN | P2 | LEFT IMAGE, GREEN | RIGHT IMAGE, MAGENTA | 1 |
|   | RIGHT IMAGE, MAGENTA | P1 |  |  |  |
| 3 | LEFT IMAGE, MAGENTA | P2 | LEFT IMAGE, MAGENTA | RIGHT IMAGE, GREEN | 0 |
|   | RIGHT IMAGE, GREEN | P1 |  |  |  |
| 4 | LEFT IMAGE, GREEN | P2 | LEFT IMAGE, GREEN | RIGHT IMAGE, MAGENTA | 1 |
|   | RIGHT IMAGE, MAGENTA | P1 |  |  |  |
| 5 | LEFT IMAGE, MAGENTA | P2 | LEFT IMAGE, MAGENTA | RIGHT IMAGE, GREEN | 0 |
|   | RIGHT IMAGE, GREEN | P1 |  |  |  |
| 6 | LEFT IMAGE, GREEN | P2 | LEFT IMAGE, GREEN | RIGHT IMAGE, MAGENTA | 1 |
|   | RIGHT IMAGE, MAGENTA | P1 |  |  |  |

Frames grouped as: $I_{SMCI}(1,1)$, $I_{SMCI}(2,1)$, $I_{SMCI}(1,2)$, $I_{SMCI}(2,2)$, $I_{SMCI}(1,3)$, $I_{SMCI}(2,3)$

FIG. 13B

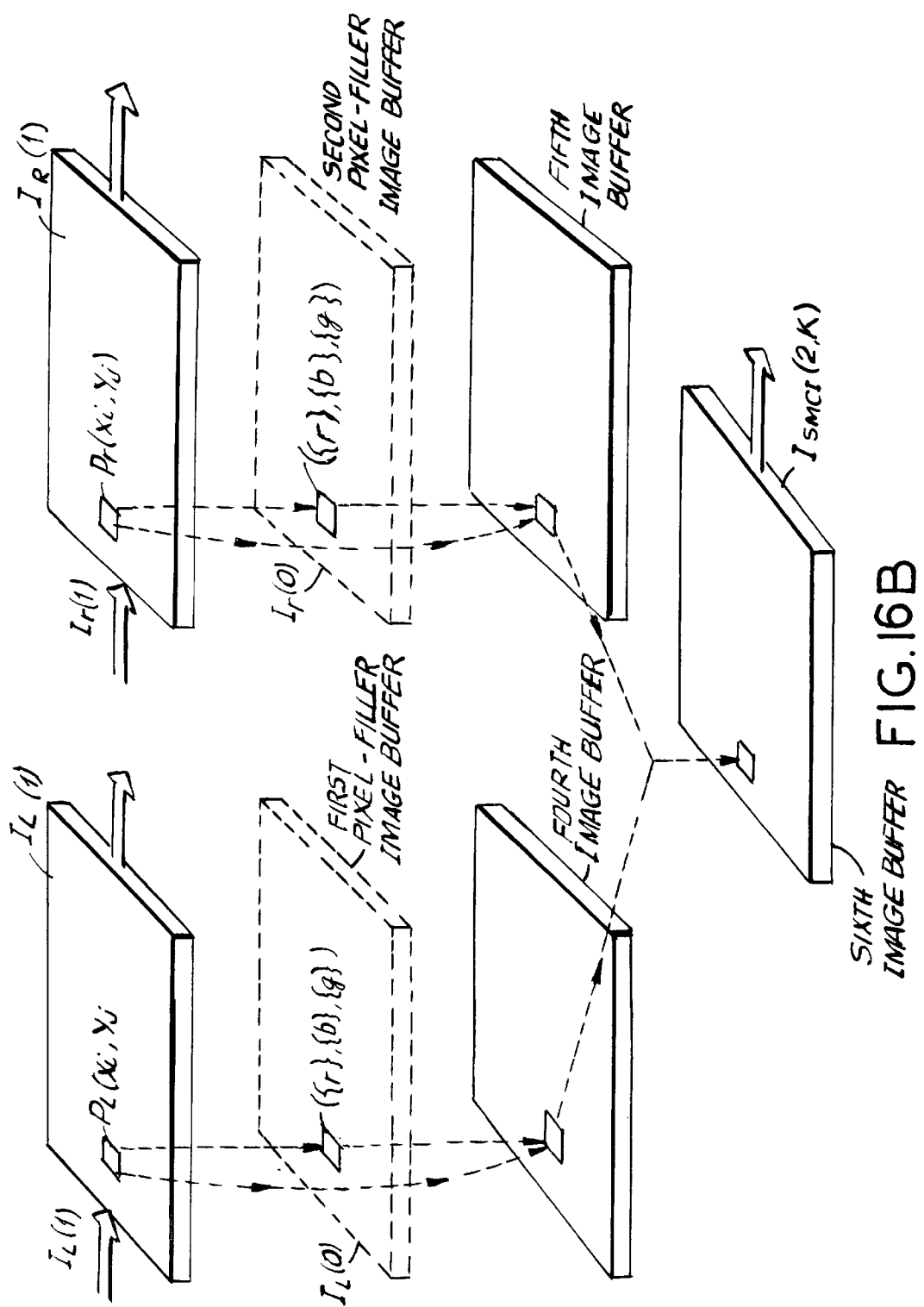

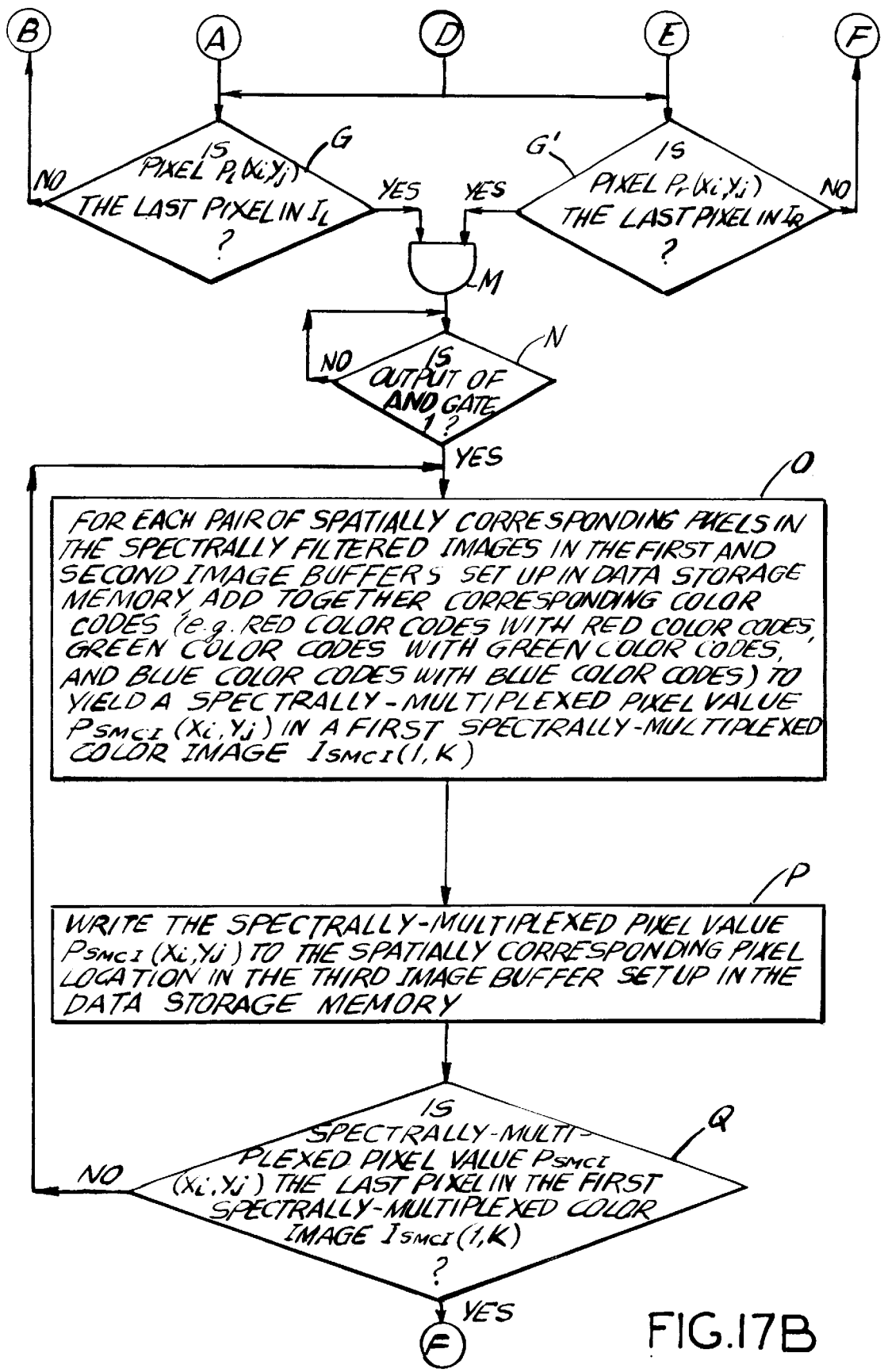

SYSTEM AND METHOD FOR PRODUCING AND DISPLAYING SPECTRALLY-MULTIPLEXED IMAGES OF THREE-DIMENSIONAL IMAGERY FOR USE IN FLICKER-FREE STEREOSCOPIC VIEWING THEREOF

BACKGROUND OF THE INVENTION

1. Field of the Invention

The present invention relates to a method and apparatus for producing and displaying spectrally-multiplexed images of three-dimensional imagery for use in stereoscopic viewing thereof.

2. Brief Description of the Prior Art

The use of stereoscopic imaging in modern times has gained increasing popularity. The reason for this trend in technological innovation is quite clear. At birth, each human being is endowed with the power of stereoscopic vision, and it is this power alone that enables human beings to view the world and all its inhabitants in three dimensions with full depth perception.

Presently, there exist a number of known techniques for recording and displaying stereoscopic images of three dimensional objects and scenery. In the art of video imaging, in particular, two principally different techniques are presently being used to record and display stereoscopic images. The first technique is commonly referred to as "time-multiplexed" or "field-sequential" stereo video or television, whereas the second technique is commonly referred to as "spatially multiplexed" stereo video or television.

In general, each of these stereo imaging techniques involve image recording (i.e. generation) and image display processes. During the image generation process, left and right perspective images (or sequences of perspective images) of 3-D scenery are produced and subsequently recorded on a suitable recording medium. Notably, the recorded left and right perspective images are produced as if actually viewed with the inter-pupil distance of a human observer. Then, during the image display process, the visible light associated with the left and right perspective images is visually presented to the left and right eyes of viewers, respectively, while minimizing the amount of visible light from the left and right perspective images that impinge upon the right and left eyes of the viewer, respectively. As the left and right perspective images of the 3-D scenery are viewed by the left and right eyes of the viewer, a stereoscopic image of the 3-D scenery is perceived, complete with full spatial and depth information of the actual 3-D scenery.

The differences between the above described techniques reside in the manner in which left and right perspective images are "channeled" to the left and right eyes of the viewer in order to preserve stereoscopy. These techniques will be briefly described below.

In 3-D video display systems based upon time-multiplexing principles the left and right perspective images of the 3-D scenery are displayed to viewers during different display periods (i.e. left and right perspective display periods). To ensure that only left perspective images of the 3-D scenery are presented to the left eyes of viewers, the right eye of each viewer is not allowed to view the left perspective image during the left perspective image display period. Similarly, to ensure that only the right perspective images of the 3-D scenery are presented to the right eyes of viewers, the left eye of each viewer is not allowed to view the right perspective image during the right perspective image display period. In the contemporary period, this perspective image "blocking" or selective viewing process is achieved using a pair of liquid crystal light valves (LCLV) as the lenses in special eye wear (e.g. goggles) worn by each viewer using a 3-D image viewing system based on such principles. Typically, a controller is required in order to drive the left LCLV lens during each left perspective image display period, and drive the right LCLV lens during each right perspective image display period.

In 3-D video display systems based upon spatial-multiplexing principles, left and right perspective images of 3-D scenery are spatially multiplexed during the image generation process in order to produce a spatially multiplexed composite image. Then during the image display process, the visible light associated with the left and right perspective image components of the composite image are simultaneously displayed, but with spatially different "polarizations" imparted thereto. To ensure that only left perspective images of the 3-D scenery are presented to the left eyes of viewers, the right eye of each viewer must not be allowed to view left perspective images. Similarly, to ensure that only the right perspective images of the 3-D scenery are presented to the right eyes of viewers, the left eye of each viewer must not be allowed to view right perspective images. Typically, this perspective image "blocking" or selective-viewing process is achieved using a pair of spatially different polarizing lenses mounted in eye wear (e.g. spectacles) worn by each viewer using a 3-D video display system based on such principles of operation.

While each of these above-described 3-D image display techniques may be used to display 3-D color or gray-scale images, systems based on such techniques are not without shortcomings and drawbacks.

In particular, 3-D image display systems based upon time-multiplexing principles are notoriously plagued by "image flicker" problems. While 3-D video display systems based upon spatial-multiplexing principles are inherently free from the "image flicker" problem associated with time-multiplexed 3-D display systems, spatial-multiplexed 3-D display systems require the use of micropolarizers mounted onto display surfaces (e.g. CRT displays, flat panel liquid-crystal displays, light valve projectors, etc.) from which the polarized light of spatially-multiplexed images emanates. Consequently, this requirement necessitates specially manufactured display and projection surfaces which, in particular applications, can impose undesirable limitations upon the stereoscopic viewing process.

As an alternative to the above-described 3-D image display systems and methods, U.S. Pat. No. 4,995,718 to Jachimowicz, et al. proposes a 3-D color video projection display system using spectral-multiplexing and light polarization principles. Similar to the above-described 3-D image display systems, the proposed 3-D projection display system in U.S. Pat. No. 4,995,718 supports both image recording (i.e. generation) and display processes. However, unlike 3-D image display systems based upon time-multiplexing and spatial-multiplexing principles described above, the 3-D color projection display system of U.S. Pat. No. 4,995,718 exploits the spectral properties of both left and right perspective color images in order to ensure that only left and right perspective color images of a 3-D scenery are seen by the left and right eyes of viewers, respectively, during the image display process. Specifically, during the image generation process, left and right perspective color video images of 3-D scenery are recorded. Then during a first display period in the image projection process, the red and blue spectral components (i.e. magenta) of the left perspective color image are imparted with a first light polarization state and then projected onto a display screen using a first image projector, while the green spectral components of the right perspective color image are imparted with a second light polarization state and projected onto the display screen using a second image projector. During the image projection process of the first display period, the separately projected left and right perspective images must be spatially superimposed (i.e. aligned) in order that these differently polarized spectral components are recombined or "multiplexed" on the projection display screen, which is adapted to preserve the polarization states of the multiplexed spectral components. To ensure that only the magenta spectral components of the left perspective image are presented to the left eyes of viewers during the first display period, while only the green spectral components of the right perspective image are presented to the right eyes of viewers, the viewers are each required to wear spectacles having a left lens characterized by the first polarization state, and a right lens characterized by the second polarization state.

Then during a second display period in the image projection process, the green spectral components of the left perspective color image are imparted with a first light polarization state and then projected onto the display screen using the first image projector, while the magenta spectral components of the right perspective color image are imparted with a second light polarization state and then projected onto the display screen using the second image projector. During the second display period the separately projected left and right perspective images must be spatially superimposed (i.e. aligned) in order that these differently polarized spectral components are recombined (i.e. multiplexed) on the projection display screen. Also, the polarized spectacles worn by each viewer ensures that only the green spectral components of the left perspective image are visually presented to the left eyes of viewers during the first display period, while only the magenta spectral components of the right perspective image are visually presented to the right eyes of the viewers. As the projected spectrally multiplexed images are viewed by the viewers wearing the polarized spectacles during the first and second display periods, a stereoscopic image of the 3-D scenery is perceived, complete with full spatial and depth information of the actual 3-D scenery.

While the 3-D color projection display system disclosed in U.S. Pat. No. 4,995,718 is capable of displaying 3-D stereoscopic color images of 3-D scenery, objects and the like, this prior art system and stereoscopic display technique suffers from several significant shortcomings and drawbacks.

In particular, this prior art approach requires the use of three image projectors in order to project spectrally-filtered, polarized left and right images onto a display screen, upon which the polarized spectral components must recombine during each display period. Such image projection operations require multiple image projectors, a display screen, a large display viewing area, and complicated optical signal processing equipment detailed in the Specification of U.S. Pat. No. 4,995,718.

The method of recording and processing left and right color images required by this prior art stereoscopic display method is generally incompatible with conventional television transmission and distribution schemes.

Moreover, when using this prior art display technique 3-D stereoscopic images cannot be "directly" viewed from CRT display surfaces, flat panel display surfaces, LCD display surfaces, plasma display panel surfaces, electroluminescent panel display surfaces and the like.

Thus, there is a great need in the art for an improved method and system for generating and displaying gray-scaled or color stereoscopic images of 3-D objects, while avoiding the shortcomings and drawbacks of prior art apparatus and methodologies.

OBJECTS AND SUMMARY OF THE PRESENT INVENTION

Accordingly, it is a primary object of the present invention to provide a method and apparatus for producing stereo images of 3-D objects and scenery, while overcoming the shortcomings and drawbacks of prior art methodologies and apparatus.

A further object of the present invention is to provide a method and system for producing and displaying spectrally-multiplexed color images of 3-D scenery for use in stereoscopic viewing thereof.

A further object of the present invention is to provide a method of producing a pair of spectrally-multiplexed color images of 3-D scenery by recording left and right color perspective images and thereafter processing the spectral components thereof.

A further object of the present invention is to provide such a method and system for producing pairs of spatially-multiplexed composite images of 3-D imagery, wherein the spectral components of spatially corresponding pixels in the left and right perspective images are multiplexed (i.e. combined) on a pixel-by-pixel basis in order to produce the pixels in each of the spatially-multiplexed composite images, prior to sequentially displaying the same to viewers.

A further object of the present invention is to provide a method and system for direct stereoscopic viewing of 3-D imagery using pairs of spectrally-multiplexed composite images produced by the method and system described above.

A further object of the present invention is to provide a method of producing spectrally-multiplexed color images of 3-D scenery, from a diverse array of devices, including computer systems, camera systems, laser-disc playback units, video-tape recording and playback units, color image scanners, television signal receivers and the like.

A further object of the present invention is to provide an electro-optical device for multiplexing selected spectral components in perspective color images of 3-D scenery, during the production of spectrally-multiplexed color images (SMCI) thereof.

A further object of the present invention is to provide a system and method for displaying pairs of spectrally-multiplexed color images of 3-D scenery in order to permit color stereoscopic viewing thereof.

A further object of the present invention is to provide a method and apparatus for displaying spectrally-multiplexed color images of 3-D scenery on diverse display surfaces including CRT display surfaces, flat-panel liquid-crystal display (LCD) surfaces, electro-luminescent panel display surfaces, projection screen surfaces, and other display surfaces capable of displaying gray-scale or color images at video frame display rates greater than or equal to the flicker frequency of the human vision system.

A further object of the present invention is to embody such a method and apparatus within conventional desktop, laptop, and notebook computer systems in order to provide full 3-D color display capabilities to users thereof.

An even further object of the present invention is to provide a portable computer system capable of displaying pairs of spectrally-multiplexed color images of 3-D scenery in order to permit color stereoscopic viewing thereof while wearing a pair of electrically passive or electrically-active polarized spectacles during the display process.

A further object of the present invention is to provide such a color stereoscopic display system and method, in which stereoscopic viewing of 3-D scenery is achievable while wearing a pair of electrically-passive polarized spectacles during the display process.

A further object of the present invention is to provide such a color stereoscopic display system and method, in which viewing of 3-D scenery is achievable while wearing a pair of electrically-active polarized spectacles during the display process.

An even further object of the present invention is to provide a an electro-optical device for use in polarizing selected spectral components in spectrally-multiplexed color images of 3-D scenery during the stereoscopic display thereof.

A further object of the present invention is to provide a method of and system for recording and displaying spectrally-multiplexed color images of 3-D scenery, which can be readily utilized in conventional television transmission and distribution systems, such as cable television systems and networks, without substantial modification to the same.

These and other objects of the present invention will become apparent hereinafter and in the Claims to Invention.

BRIEF DESCRIPTION OF THE DRAWINGS

For a more complete understanding of the present invention, the Detailed Description of the Illustrative Embodiments of the Present Invention is to be read in conjunction with the following drawings, in which:

FIG. 9A is an exploded schematic diagram of a first embodiment of the optical-image spectrum polarizer of the present invention employed in the display system of FIGS. 8A and 8B, and particularly adapted to impart one of two possible polarization states to the multiple spectral component groups present in the spectrally-multiplexed color images being displayed;

FIG. 9B is a schematic representation illustrating the magnitude versus wavelength response characteristics of an exemplary optical image of arbitrary spectral intensity, provided to the input surface of the optical image spectrum polarizer shown in FIG. 9A;

FIGS. 9C and 9D are schematic representations illustrating the polarization versus wavelength response characteristics of the optical-image spectrum polarizer shown in FIG. 9A during the first and second cyclical display periods of the stereoscopic image display process of the present invention;

FIG. 9E is an exploded schematic diagram of a second illustrative embodiment of the optical-image spectrum polarizer of the present invention, particularly adapted to impart one of two possible polarization states to the spectral component groups associated with the colors green, red and blue typically present in spectrally-multiplexed color images being displayed;

FIG. 10B is a table illustrating which spectral components are displayed by the system of FIG. 10A during the cyclical display periods of the spectral-polarizing display process of the present invention;

FIG. 11B is a table illustrating which spectral components are displayed by the system of FIG. 11A during the cyclical display periods of the image display process of the present invention;

FIG. 12C is a table illustrating which spectral components are displayed by the system of FIGS. 12A and 12B during the cyclical display periods of the image display process of the present invention;

FIG. 13B is a table illustrating which spectral components are displayed by the system of FIG. 13A during the cyclical display periods of the spectral-polarizing display process of the present invention;

FIGS. 16A and 16B are schematic representations illustrating the pixel-data processing operations performed during a modified method of producing spectrally-multiplexed color images according to the present invention, such that the potential of image-flicker is eliminated during the stereoscopic viewing process of the present invention FIGS. 17A to 17G, taken together, provide a flow chart illustrating the steps performed during the modified method of producing spectrally-multiplexed color images according to the present invention;

DETAILED DESCRIPTION OF THE ILLUSTRATIVE EMBODIMENTS OF THE PRESENT INVENTION

Figure 1:
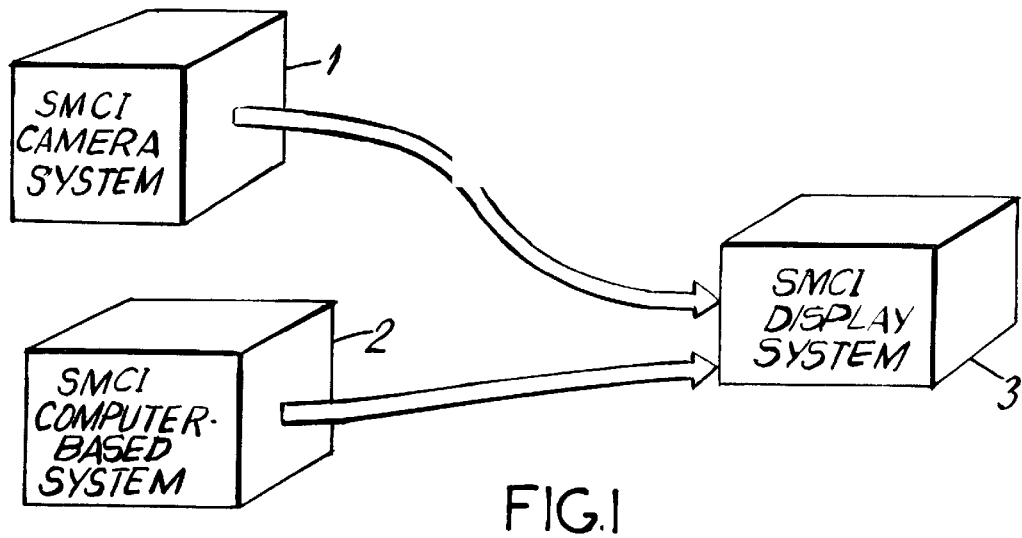
FIG. 1 is a block schematic diagram of the apparatus for producing and displaying spectrally-multiplexed color images (SMCI) of 3-D scenery for use in stereoscopic viewing thereof in accordance with the present invention.

As illustrated in FIG. 1, the present invention embraces both the production and display of spectrally-multiplexed images of 3-D imagery which permit viewers to stereoscopically view the same with the perception of full depth and three dimensionality. As used hereinafter and in the claims to invention appended hereto, the term "3-D imagery", "3-D scenery", and "3-D object" shall be understood to include any form of imagery, real or synthetic, concrete or abstract, having structural, graphical or ornamental features representable within three or more dimensions, which may include, but certainly is not limited to, three-dimensional physical space in which the spatial dimensionality of object are conventionally represented. Also, as used hereinafter and in the claims to invention, the term "spectrally-multiplexed" and "spectral-multiplexing" shall be understood to include the selective combining of spectral components of two or more perspective optical images of 3-D scenery, as well as the selective combining of pixel color values (i.e. codes) of perspective image data.

While the present invention can be used to produce and display either color or gray-scaled spectrally-multiplexed images of 3-D scenery, the illustrative embodiments of the present invention shall be described hereinafter using color perspective images, although it shall be understood that gray-scaled (e.g. black and white) perspective images can be utilized with excellent results to produce and display spectrally-multiplexed gray-scaled images of 3-D scenery.

In general, spectrally-multiplexed color images (SMCI) can be produced using a spectrally-multiplexed color image producing camera system 1, a SMCI producing computer system 2, or any other SMCI producing device 4 constructed and operated in accordance with the principles of the present invention. Such apparatus and processes will be described in great detail with reference to FIGS. 2 through 7E. Similarly, spectrally-multiplexed gray-scaled and color images can be stereoscopically displayed using a number of different type display systems constructed and operated in accordance with the principles of the present invention. Such display systems are generally represented by the block designated by reference numeral 3 in FIG. 1. Such apparatus and processes will be described in great detail hereinafter with reference to FIGS. 8A through 14B.

Figure 2:
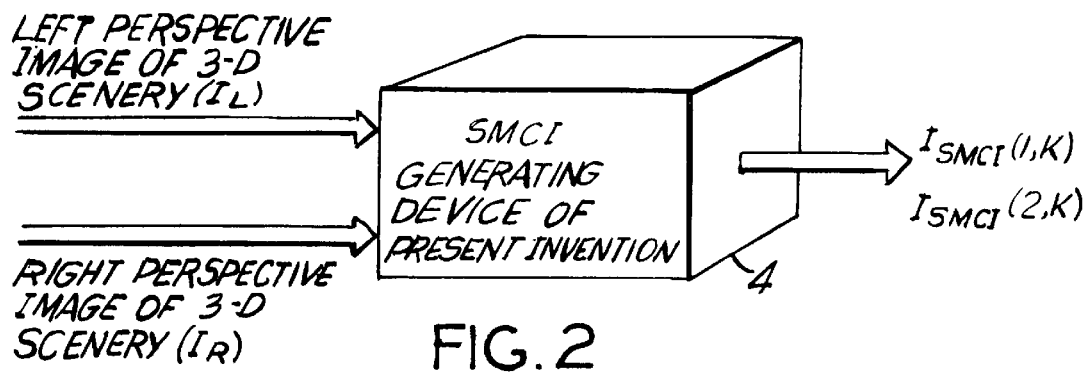
FIG. 2 is a block schematic diagram of a generic device for producing spectrally-multiplexed color images of 3-D scenery from pairs of left and right perspective color images thereof.

In FIG. 2, a spectrally-multiplexed image generator 4 is schematically illustrated. In accordance with the present invention, pairs of spectrally-multiplexed color images, $I_{SCMI}(1,k)$ and $I_{SMCI}(2,k)$, are sequentially displayed at a video frame display rate in excess of the flicker frequency (e.g., 30 frames per second) in order to enable a viewer to perceive 3-D scenery with full three dimensionality and depth perception, along a particular point of view. As shown, each such spectrally-multiplexed color image displayed contains a selected group of spectral components (e.g. red and blue color related spectral components or green color related spectral components) taken from the left and right perspective color images $I_L$ and $I_R$ of the 3-D scene. As will be described in great detail hereinafter, the spectral multiplexing process carried out by the SMCI generator 4 can be realized within a computer system using the pixel data processing techniques illustrated in FIGS. 3 and 3A, and 7A and 7B, or by optical processing techniques carried out by the camera systems illustrated in FIGS. 4 through 7D.

Figure 3:
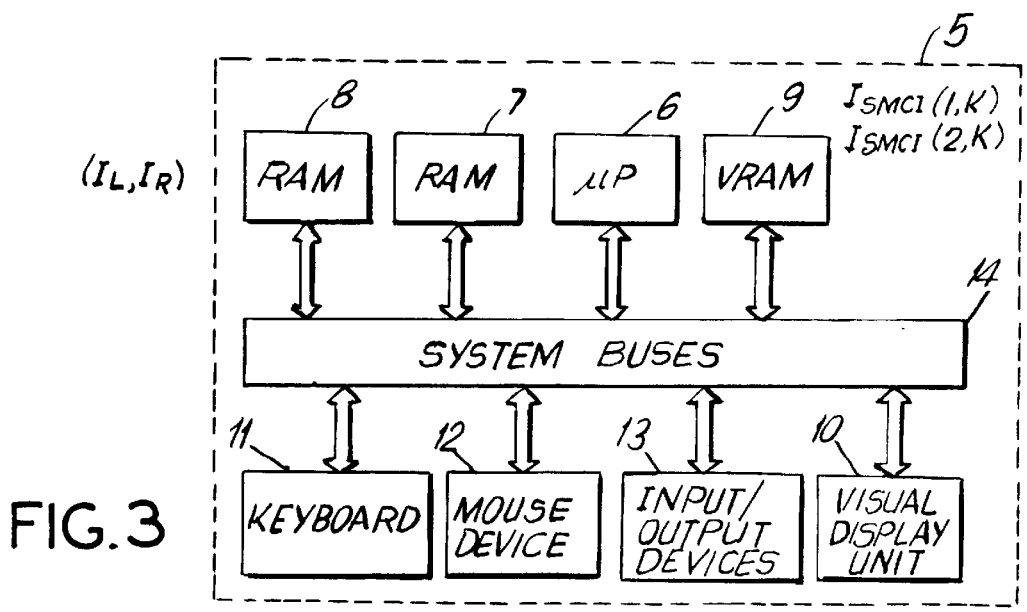
FIG. 3 is a block schematic diagram of a computer system programmed in accordance with the principles of the present invention and capable of producing pairs of spectrally-multiplexed color images of 3-D scenery from pairs of left and right perspective color images thereof.

As illustrated in FIG. 3, the SMCI computer system (e.g. workstation) 5 of the illustrative embodiment comprises a number of integrated system components, namely: one or more central processing units 6 (e.g. microprocessor); program memory storage 7 for storing an operating system program, application programs, and various image processing routines of the present invention; random access data storage memory (e.g. VRAM) 8 for storing left and right color perspective images of a 3-D object or scene, upon which spectral multiplexing is to be performed; a mass-type data storage memory 9 for storing produced pairs of spectrally-multiplexed color images $\{I_{SMCI}(1,k), I_{SMCI}(2,k)\}$; a visual display unit 10 having a visual display screen or surface; a keyboard or other text input device 11; a pointing and selecting device (.e.g. mouse or track-ball) 12; and one or more video output devices 13, such as CD-ROM or stereo-video camera. As illustrated, each of these system components is operably associated with processor 6 by way of one or more system buses 14 in a manner known in the art. In the preferred embodiment, the operating system may be Unix® X-Windows, allowing the processor to support at least two input/output windows, pointing and selecting device 12, and multi-media input and output devices 13. It is understood, however, that other suitable operating system programs can be used with acceptable results. In applications where images of 3-D scenery or objects are generated using computer programming techniques, conventional computational algorithms can be used to generated left and right color perspective images with the computer system. Presently suitable graphics software is commercially available for creating high resolution 3-D color models, renderings and animations, as well as performing perspective image generation functions upon Intel 386/486 microprocessor based personal computer systems. Exemplary software is available from Autodesk, Inc. of Sausalito, Calif. under the trademark "Autodesk 3D Studio," Release 2.

In general, each such perspective color image produced within the SMCI computer system comprises a matrix of pixels. Each pixel in the image matrix is designated as $P(x_i,y_j)=(\{x_i,y_j\},\{r_{i,j}\},\{g_{i,j}\}, \{b_{i,j}\})$, and has a color value representative of the spectral content of the image at the pixel's location in the image, indicated by the coordinate pair (x,y). In typical color video applications, the color value of each pixel contains a magnitude for each of the spectral components, e.g. $\{g_{i,j}\},\{b_{i,j}\},\{r_{i,j}\}$, constituting the system of color representation being used in the illustrative embodiment. In the SMCI computer system of the present invention, the left and right color perspective images are stored in data storage memory (e.g. frame buffers) 7 and are then processed by processor 6 in accordance with the spectral-multiplexing algorithm schematically illustrated in FIG. 3A. As shown, the spectral-multiplexing algorithm comprises six stages of data processing which together produce pairs of spectrally-multiplexed color images for display and stereoscopically viewing of the 3-D object modeled in the computer system. To achieve computational efficiency, these stages can be performed simultaneously (e.g. in parallel) as shown.

Figure 3A:
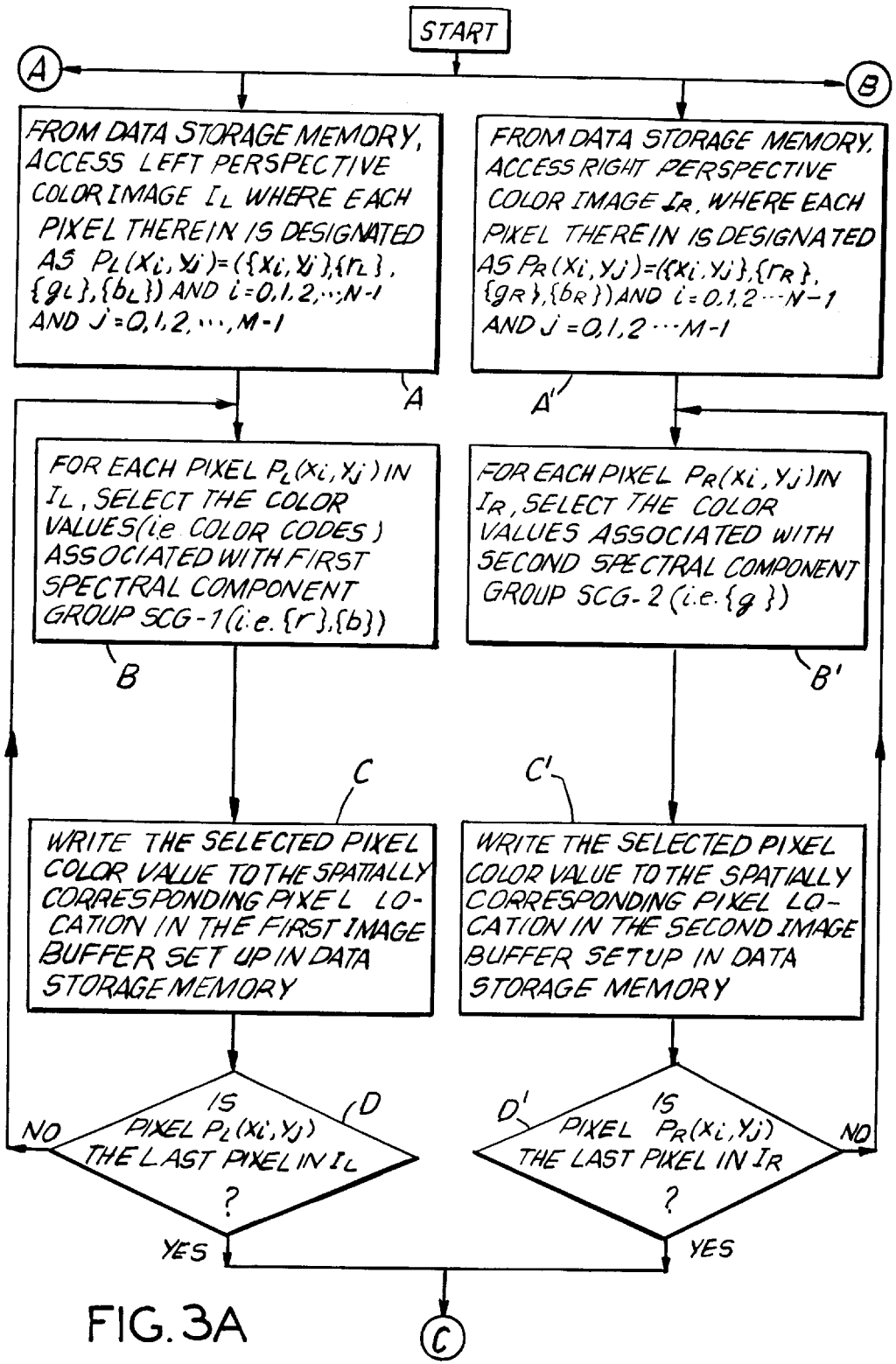
FIGS. 3A to 3D provide a schematic representation of the pixel-data processing method carried out by the computer system of FIG. 3 in order to produce pairs of spectrally-multiplexed color images of 3-D scenery from pairs of left and right perspective color images thereof.

As illustrated at Block A in FIG. 3A, processor 6 performs the first step in the first stage of the spectral-multiplexing algorithm by accessing from data storage memory 8, a frame of digital data representative of the left perspective color image $I_L$ where each pixel therein is designated as :$P(x_i,y_j)=(\{x_i,y_j\},\{r_{i,j}\},\{g_{i,j}\}, \{b_{i,j}\})$, and i=0,1, . . . N−1 and j=0, 1, . . . ,M−1. At Block B, for each pixel $P_L(x_{i,yj})$ in the left color perspective image $I_L$, the processor selects the color value (i.e. color codes) associated with the first predefined spectral component group SCG1 (i.e. $\{r\}, \{b\}$). Then at Block C the processor writes the selected pixel color value to the corresponding pixel location in a first image buffer set up in data storage memory 8. When the processor determines at Block D that the last pixel in the left perspective image has been processed(i.e. i=N−1 and j=M−1), it proceeds to Block E. While the pixel-data processing operations set forth at Blocks A through D are being carried, preferably the corresponding image processing operations set forth at Blocks A' through D' are carried out in parallel using a second image buffer. For purposes of completion, these pixel-data processing operations will be described below.

Figure 3B:
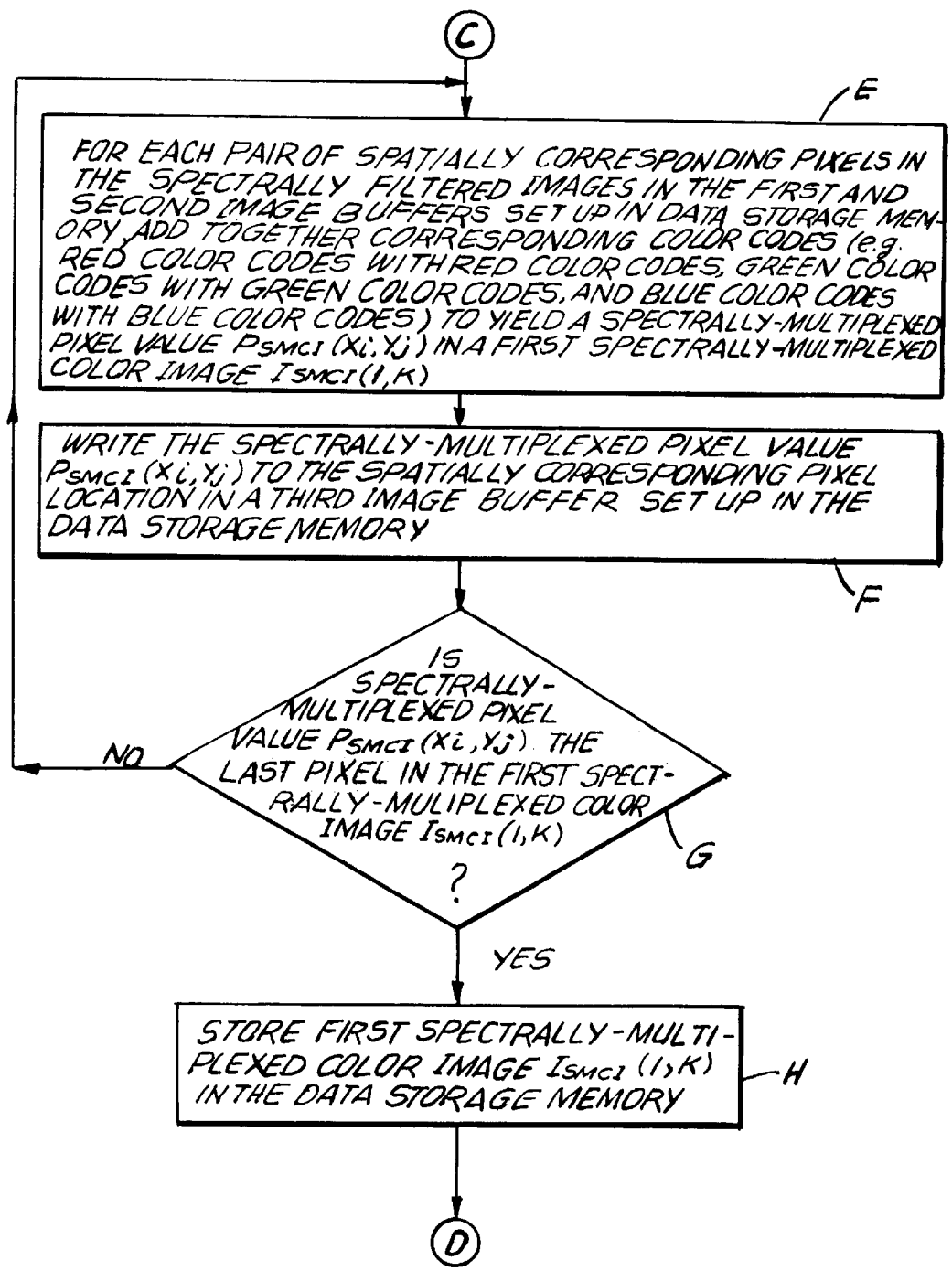
Figure 3C:
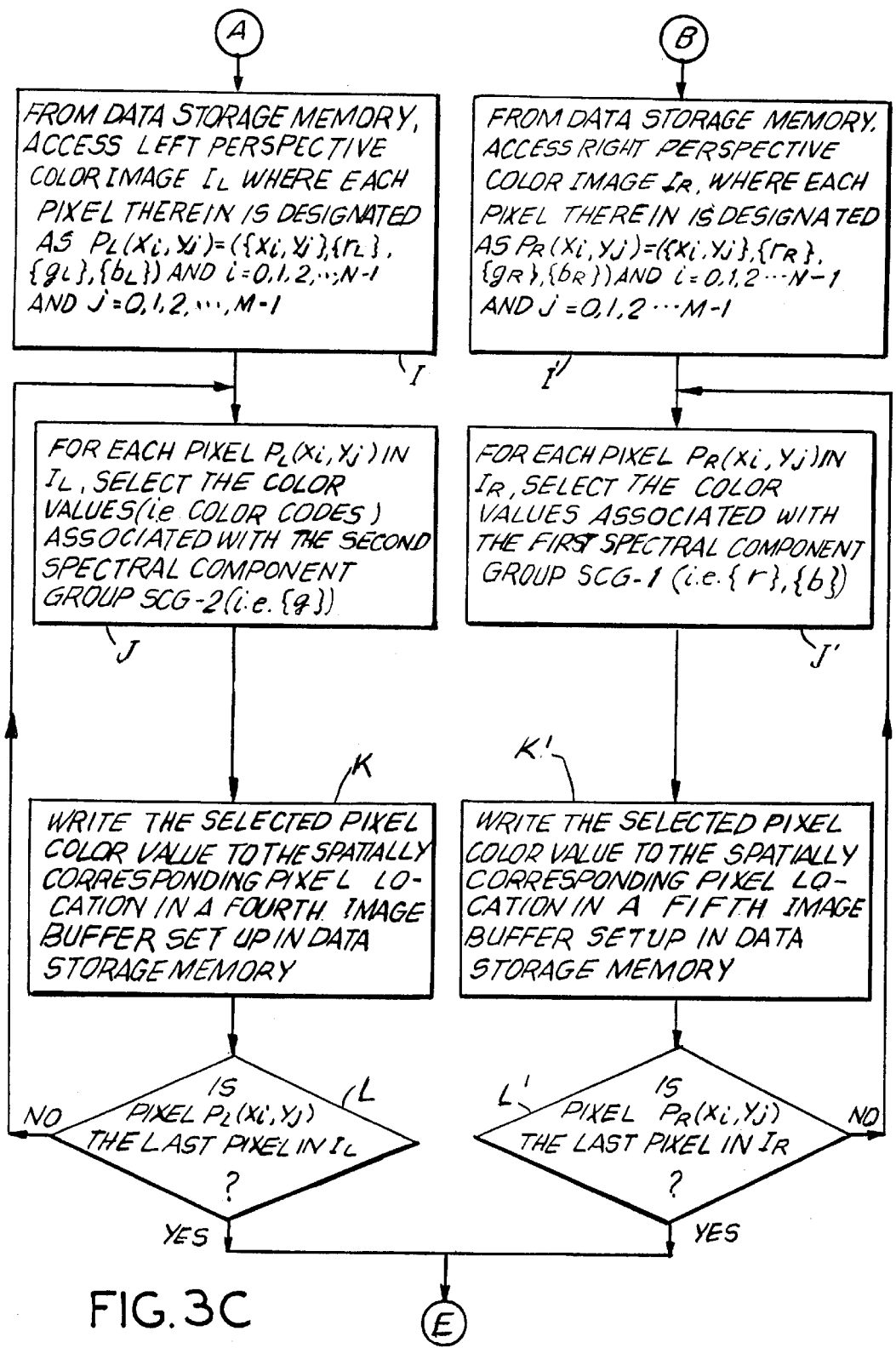

As illustrated at Block A' in FIG. 3C, the first step in the second stage of the spectral-multiplexing algorithm involves accessing from data storage memory 8, a frame of digital data representative of the right perspective color image $I_R$ where each pixel therein is designated as :$P(x_i,y_j)=(\{x_i,y_j\}, \{r_{i,j}\},\{g_{i,j}\}, \{b_{i,j}\})$, and i=0,1, . . . N−1 and j=0,1, . . . ,M−1. At Block B', for each pixel $P_R(x_i,y_j)$ in the right color perspective image $I_R$, the processor selects the color value (i.e. color code) associated with the second predefined spectral component group SCG2 (i.e. {g}). Then at Block B' the processor writes the selected pixel color value to the corresponding pixel location in a second image buffer set up in data storage memory 8. When the processor determines at Block D' that the last pixel in the right perspective image has been processed (i.e. i=N−1 and j=M−1), the processor proceeds to Block E' in FIG. 3D.

At Block E in FIG. 3B, the processor processes the spectrally filtered images residing in the first and second image buffers so as to produce a first spectrally-multiplexed color image $I_{SMCI}(1,k)$. As indicated at Block E, for each pair of spatially corresponding pixels in the pair of spectrally filtered images buffered in the first and second image buffers, the processor adds together the corresponding color values $\{r_{x,y}\},\{g_{x,k}\},\{b_{x,y}\}$ in order to yield the (i,j)-the spectrally-multiplexed pixel $P_{SMCI}(x_i,y_j)$ in the first spectrally-multiplexed color image $I_{SMCI}(1,k)$ in the k-th stereo image pair thereof. Then at Block F, the processor writes the spectrally-multiplexed pixel $P_{SMCI}(x_i,y_j)$ into its spatially corresponding pixel location in a third image buffer set up in data storage memory 8. As indicated at Block G, these pixel processing operations are performed for each set of spatially corresponding pixels residing in the first and second image buffers, until the entire first spectrally-multiplexed color image $I_{SMCI}(1,k)$. is generated (i.e., i=N−1 and j=M−1). Then at Block H, the first spectrally-multiplexed color image $I_{SMCI}(1,k)$. is stored in a first image buffer set up in data storage memory 9. Thereafter, the processor proceeds to perform pixel-data processing operations necessary to produce the second spectrally-multiplexed color image $I_{SMCI}(2,k)$ of the k-th stereo image pair thereof. The details of these pixel-data processing stages will be described below.

As illustrated at Block I in FIG. 3C, the first step in the fourth stage of the spectral-multiplexing algorithm involves accessing once again from data storage memory 8, the frame of digital data representative of the left perspective color image $I_L$ where each pixel therein is designated as :$P(x_i,y_j)=(\{x_i,y_j\},\{r_{i,j}\},\{g_{i,j}\},\{b_{i,j}\})$, and i=0,1, ... N−1 and j=0, 1, ... ,M−1. At Block J, for each pixel $P_L(x_i,y_j)$ in the left color perspective image $I_L$, the processor selects the color value (i.e. color code) associated with the second predefined spectral component group SCG2 (i.e. {g}). Then at Block K the processor writes the selected pixel color value to the corresponding pixel location in a fourth image buffer set up in data storage memory 8. When the processor determines at Block L that the last pixel in the left perspective image has been processed (i.e. i=N−1 and j=M−1), the processor performs the pixel-data processing operations set forth at Blocks M through P. Preferably while the processor is carrying out the pixel-data processing operations set forth at Blocks I through L, it also carries out in parallel corresponding operations at Blocks I' through L'. For purposes of completion, these pixel-data processing operations will be described below.

As illustrated at Block I' in FIG. 3C, the first step in the fifth stage of the spectral-multiplexing algorithm involves accessing once again from data storage memory 8, the frame of digital data representative of the right perspective color image $I_R$ where each pixel therein is designated as :$P(x_i,y_j)=(\{x_i,y_j\},\{r_{i,j}\},\{g_{i,j}\},\{b_{i,j}\})$, and i=0,1, ... N−1 and j=0, 1, ... ,M−1. At Block J', for each pixel $P_R(x_i,y_j)$ in the right color perspective image $I_R$, the processor selects the color value (i.e. color codes) associated with the first predefined spectral component group SCG1 (i.e. {r}, {b}). Then at Block K' the processor writes the selected pixel color value to the corresponding pixel location in a fifth image buffer set up in data storage memory 8. When the processor determines at Block P' that the last pixel in the right perspective image has been processed (i.e. i=N−1 and j=M−1), the processor proceeds to Block M in FIG. 3D.

Figure 3D:
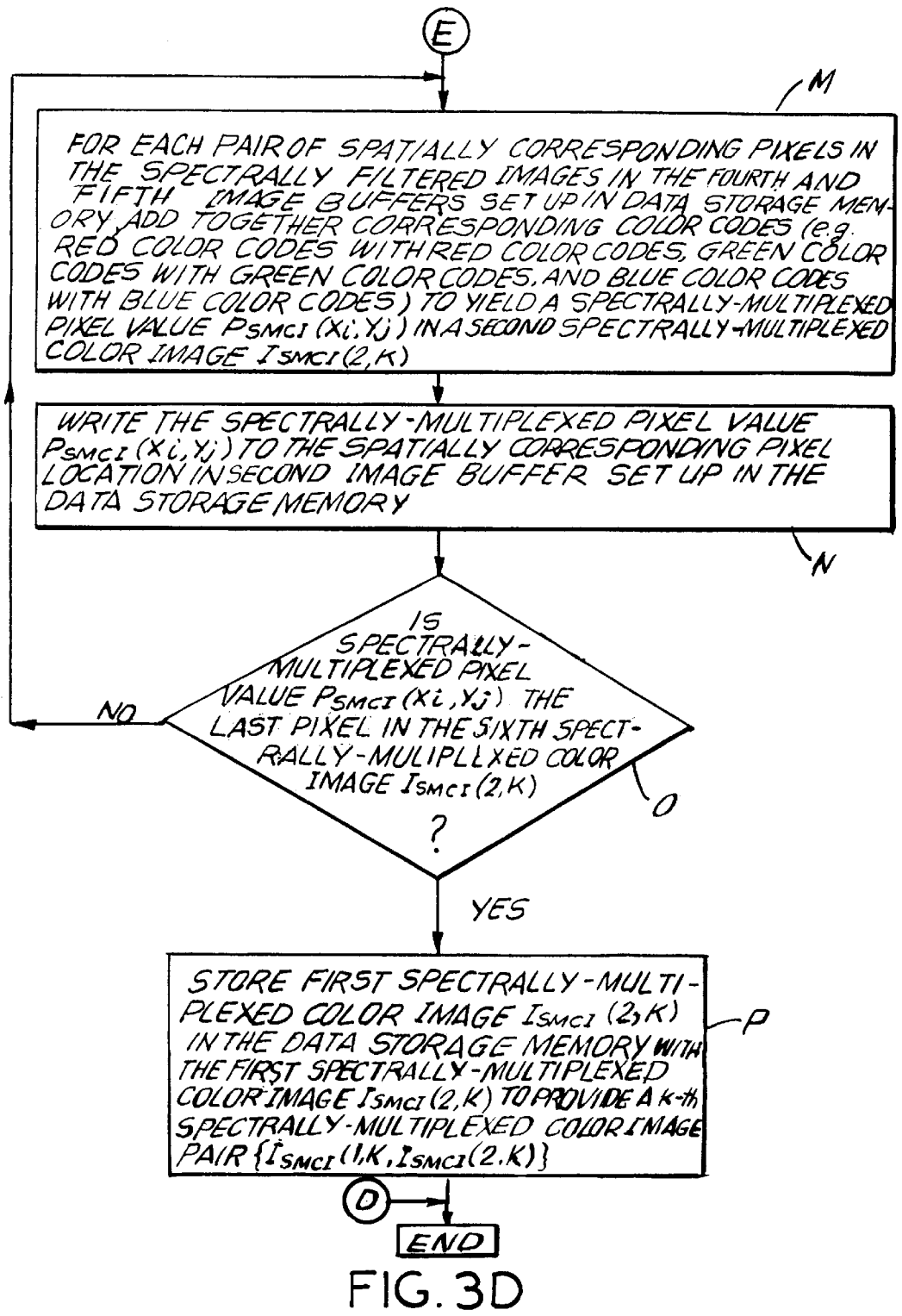

At Block M in FIG. 3D, the processor processes the spectrally filtered images residing in the fourth and fifth image buffers so as to produce the second spectrally-multiplexed color image $I_{SMCI}(2,k)$. As indicated at Block M, for each pair of spatially corresponding pixels in the pair of spectrally filtered images buffered in the fourth and fourth image buffers, the processor adds together the corresponding color codes $\{r_{x,y}\},\{x,k\},\{b_{x,y}\}$ in order to yield the (i,j)-th spectrally-multiplexed pixel $P_{SCMI}(x_i,y_j)$ in the second spectrally-multiplexed color image $I_{SMCI}(2,k)$. in the k-th stereo image pair thereof. Then at Block N the processor writes the spectrally-multiplexed pixel $P_{SCMI}(x_i,y_j)$ into its spatially corresponding pixel location in a sixth image buffer set up in data storage memory 8. As indicated at Block O, these pixel-data processing operations are performed for each set of spatially corresponding pixels residing in the fourth and fifth image buffers until the entire second spectrally-multiplexed color image $I_{SMCI}(2,k)$. is generated. Then at Block P, the second spectrally-multiplexed color image $I_{SMCI}(2,k)$. is stored in a second image buffer set up in data storage memory 9 along with the first spectrally-multiplexed color image $I_{SMCI}(1,k)$. for future access and display. Together, the first and second spectrally-multiplexed color images comprise a spectrally-multiplexed color image pair $\{I_{SMCI}(1,k),I_{SMCI}(2,k)\}$, containing sufficient visual information for stereoscopic viewing of the original 3-D scene or object modeled in the computer system. The above-described data processing method can be repeated upon left and right perspective color images of either real or synthetic 3-D scenery and objects in order to produce spectrally-multiplexed color image pairs at a sufficiently high rate to support 3-D stereoscopic display and animation processes. Novel techniques for stereoscopically displaying pairs of spectrally-multiplexed color images produced by the SMCI computer system hereof, will be described in detail hereinafter.

Notably, each pixel in the spectrally-multiplexed image contains spectral component information regarding both left and right perspective images, and these combined spectral components are simultaneously presented during the stereoscopic display process of the present invention. In marked contrast, in prior art spatially-multiplexed composite images, spatially corresponding left and right pixels are spatially separated and presented simultaneously during the display process. Furthermore, in prior art time-multiplexed imaging techniques, all of the pixels in the left perspective image and all of the pixels in the right perspective image are displayed sequentially during different display periods. Consequently, the stereoscopic display imaging technique of the present invention can be used in direct stereoscopic viewing applications without suffering from (i) image-flicker commonly associated with prior art time-multiplexing techniques or (ii) the loss of image resolution associated with prior art spatial-multiplexing techniques. In addition, the present invention avoids the shortcomings and drawbacks of prior art spectral-multiplexing techniques of U.S. Pat. No. 4,995,718 by providing general-purpose "direct viewing" capabilities for use with CRT, flat panel, electroluminescent and plasma display surfaces, as well as all projection display techniques.

Figure 4:
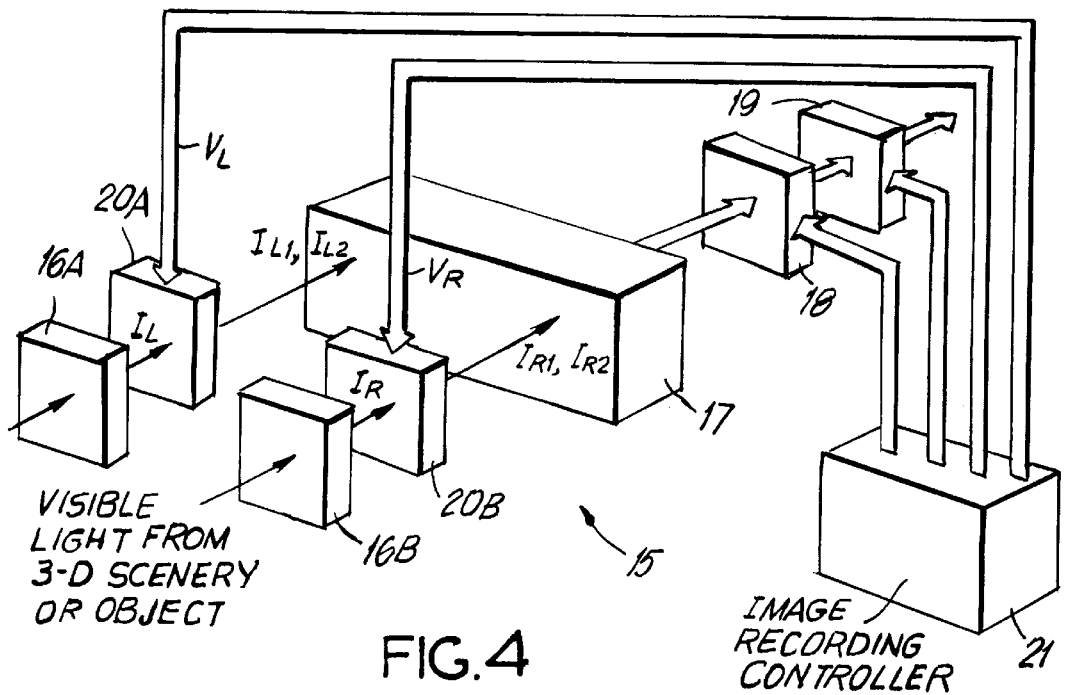
FIG. 4 is a schematic block diagram of a first embodiment of the camera system of the present invention which produces spectrally-multiplexed color images of 3-D scenery from pairs of left and right perspective color images thereof.

In FIG. 4, the first embodiment of the SMCI camera system of the present invention is schematically illustrated.

Unlike the SMCI computer system of the present invention, SMCI camera system 15 utilizes optical processing techniques in order to produce pairs of spectrally-multiplexed color images of 3-D scenery, from left and right perspective color images thereof. As shown in FIG. 4, SMCI producing camera system 15 comprises a number of components, namely: first and second color image producing elements 16A and 16B, for producing left and right perspective color images $I_L$ and $I_R$ respectively; an optical image combining element 17 for spatially combining pairs of optical images; a color image recording element (e.g., a CCD color image detecting array and scanning electronics) 18 and an image frame buffer 19 for detecting and recording gray-scaled or color images formed on the image detecting array; first and second optical-image spectrum multiplexers 20A and 20B for selectively multiplexing (i.e. transmitting) groups of spectral components from the left and right perspective color images, to optical combining element 17; and an image recording controller 21 for providing control signals to the first and second optical-image spectrum multiplexers 20A and 20B, and also to the color image detector 18 in order. to control the operation thereof as hereinafter described. The function of optical image combining element 17 is to assemble multiplexed spectral components in order to form a first spectrally-multiplexed color image during a first recording period, and also to assemble multiplexed spectral components in order to form a second spectrally-multiplexed color image during a second recording period. The function of recording controller 21 is to generate appropriate control signals which cause the first and second optical-image spectrum multiplexers 20A and 20B to selectively transmit particular groups of spectral components constituting the left and right perspective images in order to produce (i) the first spectrally-multiplexed color image on the color-image recording element during the first recording period, and (ii) the second spectrally-multiplexed color image on the color-image detector during the second recording period.

Figure 4A:
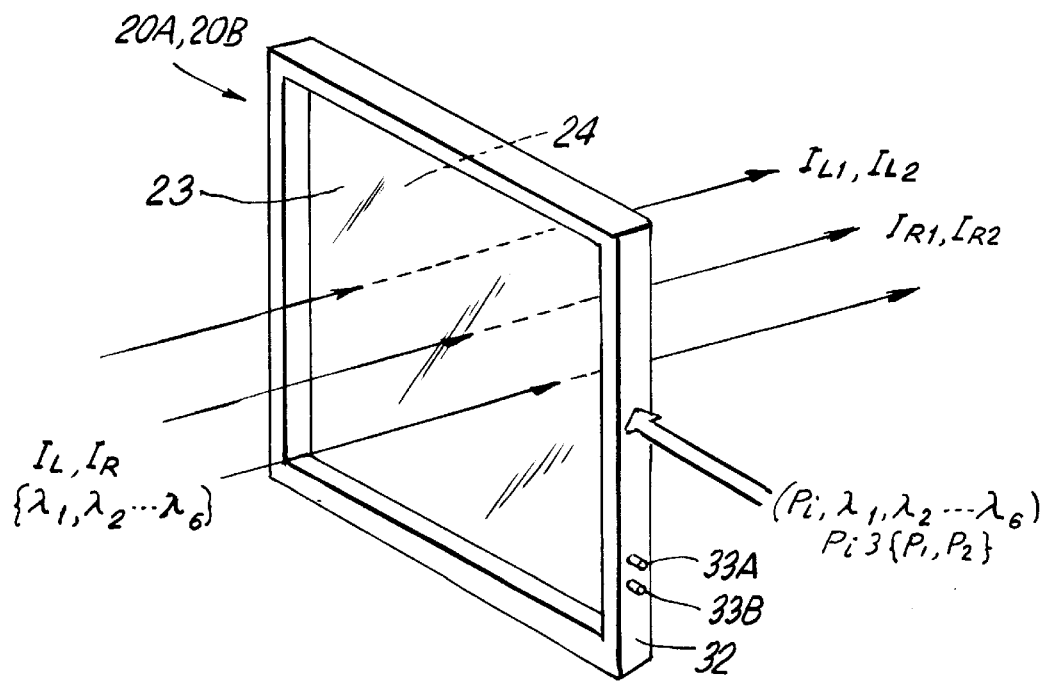
FIG. 4A is a perspective view of a generic optical-image spectrum multiplexer (OISM) in accordance with the present invention.

In FIG. 4A, optical image spectrum multiplexer 20A, 20B of the present invention is schematically represented as an electro-optical element of physically thin dimensions (e.g. 1 to 10 millimeters) having an optically transparent input surface 23 through which the spectral components of a perspective color or perspective gray-scale image are permitted to enter, and an optically transparent output surface 24 from which selected spectral components of the image are permitted emerge according to the control signals generated by the recording controller 21 during the image recording process. As schematically illustrated, each perspective color image presented to the input surface of the optical-image spectrum multiplexer, comprises an ensemble of electromagnetic waves of varying wavelength (i.e. frequency) in the optical region of the electromagnetic spectrum. Typically, perspective "gray-scale" images transmit or reflect electromagnetic energy having a bandwidth which extends over the entire optical spectrum, e.g., from about 400 to about 750 nanometers. It is understood, however, that the bandwidth characteristics of particular gray-scaled images will vary depending on the spatial characteristics of the scene represented thereby. Perspective "color" images also transmit or reflect electromagnetic energy having a bandwidth which extends over the entire optical spectrum, e.g., from about 400 to about 750 nanometers. However, it is understood that the bandwidth characteristics of particular color images may extend into the ultraviolet and/or infrared regions of the electromagnetic spectrum. As is well known that certain groups of optical wavelengths contribute to the perception of particular colors in the human vision system. For example, the color green is perceived when the retinal surface of the human vision system is illuminated with the group of optical wavelengths in the region characterized by $\{\lambda_G, \Delta\lambda_G\}$. The color red is perceived when the retinal surface of the human vision system is illuminated with the group of optical wavelengths in the region characterized by $\{\lambda_R, \Delta\lambda_R\}$. Similarly, the color blue is perceived when the retinal surface of the human vision system is illuminated with the group of optical wavelengths in the region characterized by $\{\lambda_B, \Delta\lambda_B\}$.

Figure 4B:
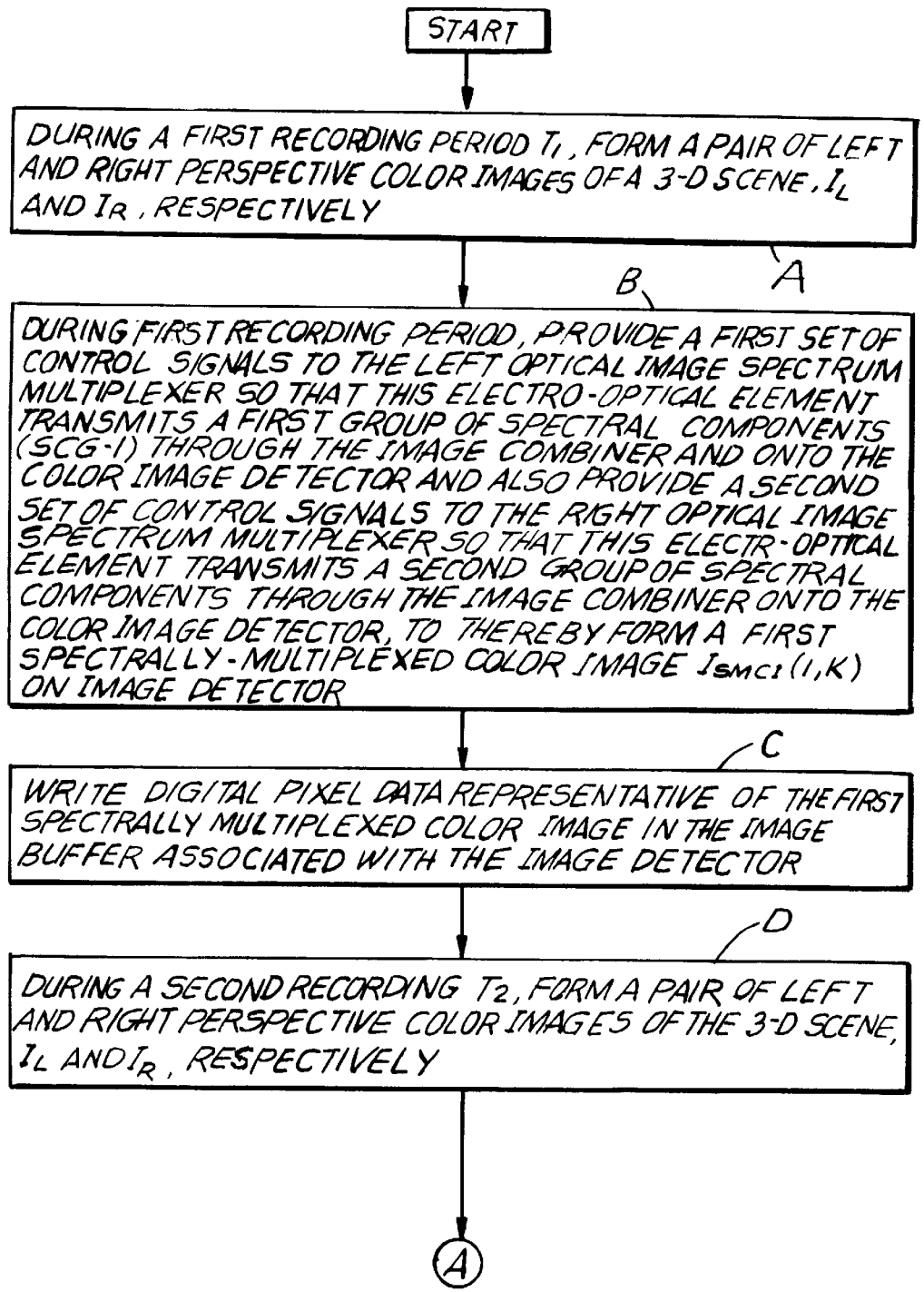
FIGS. 4B and 4C, taken together, show a flow chart illustrating an optical image processing method carried out by the camera system of FIG. 4 in order to produce pairs of spectrally-multiplexed color images from pairs of left and right perspective color images thereof.
Figure 4C:
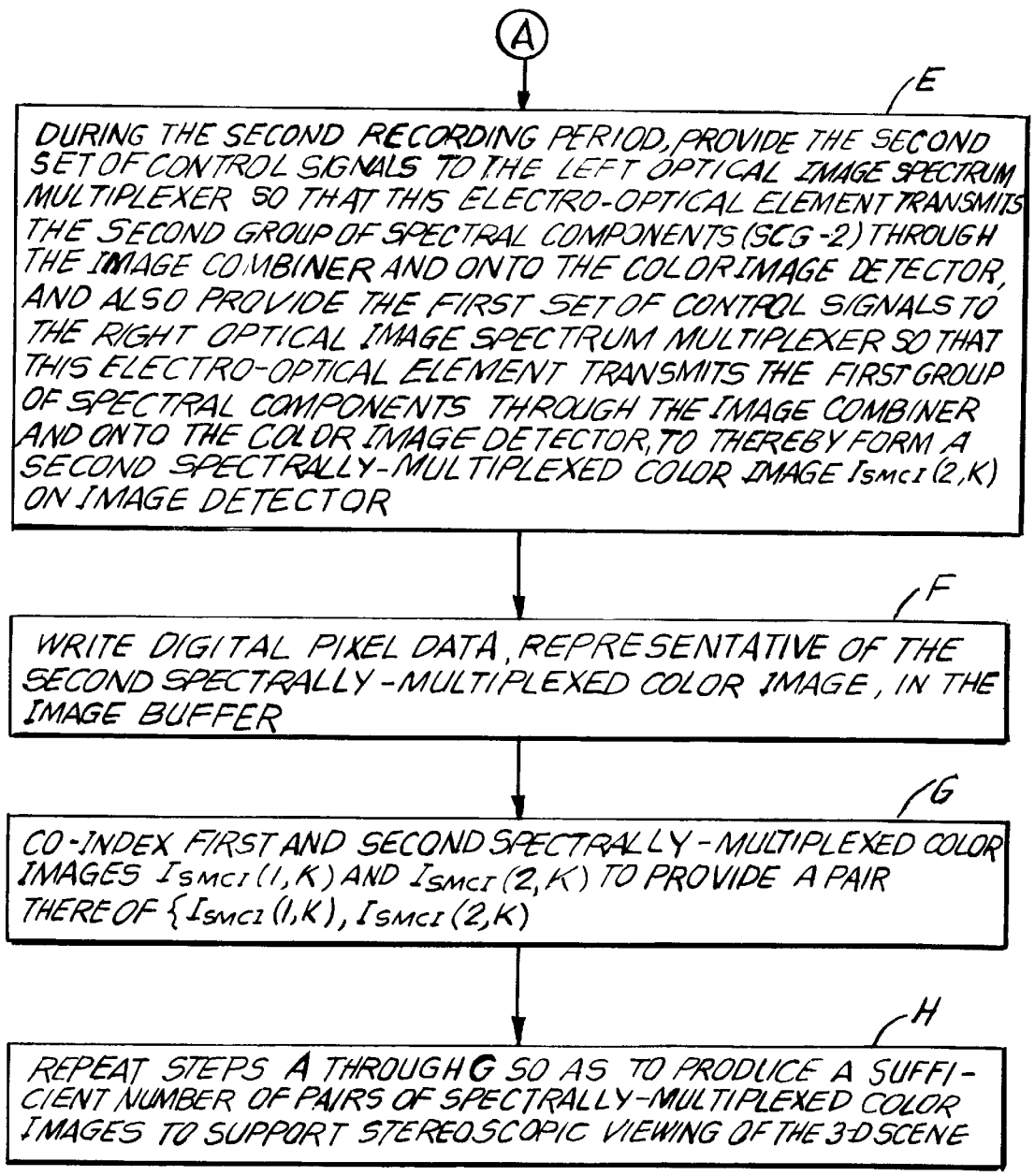

The operation of the SMCI camera system shown in FIG. 4 will be described below with reference to the flow chart of FIG. 4B. As indicated at Block A in FIG. 4B, during a first recording period T1 measured by recording controller, a first pair of left and right perspective color images of a 3-D scene or object, $I_L$ and $I_R$, are formed through left and right image forming lenses 16A and 16B, respectively. As indicated at Block B in FIG. 4B, during the first recording period, the recording controller 21 provides a first set of control signals to the left optical image spectrum multiplexer 20A so that this electro-optical element selectively multiplexes (e.g., passes or transmits) a first group of spectral components SCG1 through the optical image combiner 17 and onto the color image detector 18 to thereby form a first spectrally filtered image $I_{L1}$ thereon. During the first recording period, the recording controller also provides a second set of control signals to the right optical image spectrum multiplexer 20B so that this electro-optical element selectively transmits a second group of spectral components SCG2 through the optical image combiner 17 and also onto the color image detector 18 to thereby form a second spectrally filtered image $I_{R1}$ thereon. Together, the first and second groups of spectral components (i.e., spectrally filtered images $I_{L1}$ and $I_{R1}$) provide sufficient energy to form a first spectrally-multiplexed color image $I_{SMCI}(1,k)$ of the 3-D scenery on the color image detector 18. In response to this incident energy pattern, color image detector 18 produces a first digital data set representative of the intensity and color of the pixels comprising the first spectrally-multiplexed color image $I_{SMCI}(1,k)$. As indicated at Block C in FIG. 4B, the recording controller 21 writes digital pixel data representative of the first spectrally-multiplexed color image into the image buffer 19 operably associated with the color image detector 18. Then as indicated at Block D in FIG. 4B, during a second recording period T2 measured by the recording controller, a second pair of left and right perspective color images, $I_L$ and $I_R$ of the same 3-D scene or object are formed once again through left and right image forming lenses 16A and 16B, respectively. As indicated at Block E in FIG. 4C, during the second recording period, the recording controller 21 provides the second set of control signals to the left optical image spectrum multiplexer 20A so that electro-optical element 20A selectively transmits the second group of spectral components SCG2 through the optical image combiner 17 and onto the color image detector 18, to thereby form a third spectrally filtered image $I_{L2}$. Also during the second recording period, the recording controller 21 provides the first set of control signals to the right optical image spectrum multiplexer 20B so that electro-optical element 20B selectively transmits the first group of spectral components SCG1 through the optical image combiner 17 and onto the color image detector 18, to thereby form a fourth spectrally filtered image $I_{R2}$. Together, the first and second groups of spectral components (i.e., third and fourth spectrally filtered images $I_{L2}$ and $I_{R2}$) form a second spectrally-multiplexed color image $I_{SMCI}(2,k)$ of the 3-D scene on the color image detector. In response to this incident energy pattern, the color image detector produces a second digital data set representative of the intensity and color of the pixels comprising the second spectrally-multiplexed color image $I_{SMC}(2,k)$. As indicated at Block F in FIG. 4C, the recording controller 21 writes digital pixel data representative of the second spectrally-multiplexed color image into the image buffer 19, operably associated with the color image detector. As indicated at Block G, the first and second spectrally-multiplexed color images are then co-indexed in buffer memory by the recording controller in order to produce a first spectrally-multiplexed color image pair $\{I_{SMC}(1,k), I_{SMC}(2,k)\}$. As indicated at Block H, the above-described process is repeated cyclically at a rate equal to or greater than the 30 image frames per second in order to produce a sufficient number of spectrally-multiplexed color image pairs to support stereoscopic viewing of the recorded 3-D scene during the stereoscopic display process of the present invention.

Figure 5A:
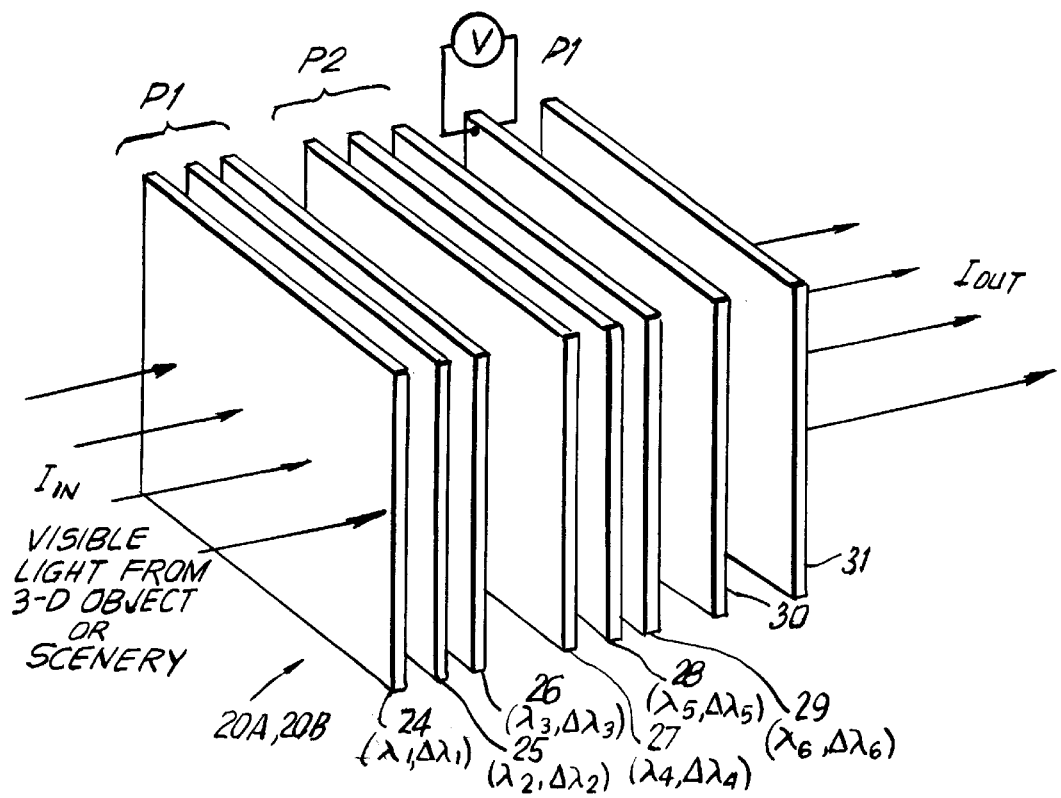
FIG. 5A is a detailed schematic diagram showing an exploded view of a first illustrative embodiment of the optical-image spectrum multiplexer shown in FIG. 4A.
Figure 5B:
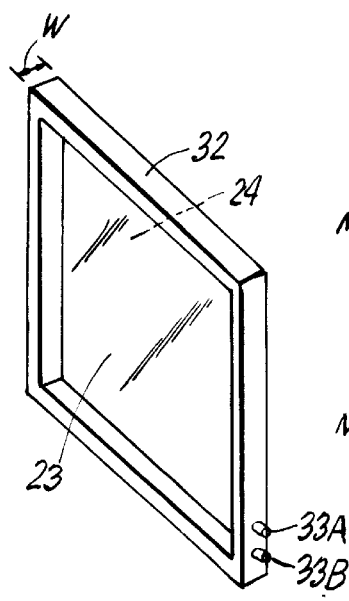
FIG. 5B is a perspective view of the optical image spectrum multiplexer of the present invention, shown fully assembled.

The detailed structure of the optical image spectrum multiplexers employed in the camera system of FIG. 4 will now be described. As shown in FIGS. 5A and 5B, the optical image spectrum multiplexer comprises an assembly of optically transparent electro-optical panels, namely: a first plurality of polarizing filter panels 24,25 and 26, for passing spectral component bands $\Delta\lambda_1$, $\Delta\lambda_2$ and $\Delta\lambda_3$, respectively, while imparting either a linear or circular polarization state P1 thereto; a second plurality of polarizing filter panels 27, 28 and 29, for passing spectral component bands $\Delta\lambda_4, \Delta\lambda_5$ and $\Delta\lambda_6$, respectively, while imparting either a linear or circular polarization state P2 thereto; a voltage-controlled half-wave phase retarding array panel 30 for imparting either a 0 or π radian phase shift to optical signals (e.g, light patterns) transmitted there through when controller 21 provides voltage levels V1 or V2, respectively, thereto; a broad optical band polarization panel 31 for imparting a linear or circular polarization state P1 to optical signal (e.g. light pattern) transmitted therethrough; and a picture-frame-like plastic housing 32 for supporting the perimetrical edges of the above-described panels when they are laminated together in the preferred spatial ordering shown, and also for mounting a pair of electrical conductors 33A and 33B leading to the half-wave phase retarding panel. In general, the dimensions of the electro-optical panel assembly will vary from embodiment to embodiment. However, typical length and width dimensions for the optical image spectrum multiplexer might be 100 millimeters by 100 millimeters, with an overall thickness in the range of from about 1 to about 10 millimeters. Typically, although not necessarily, the spectral component bands of the first plurality of polarizing filter panels 24 through 26 will be selected so as to correspond to a first set of visible colors, while the spectral component bands of the second plurality of polarizing filter panels 27 to 29 will be selected so as to correspond to a second set of visible colors. However, as will be discussed in greater detail hereinafter, spectral component band selection and design should be made with consideration to the amount of power present in the spectral bands of the perspective images being recorded in order to achieve minimal "cross-viewing" between the left and right visual fields of viewers during the stereoscopic display process of the present invention. Suitable methods for manufacturing each of the polarizing filter panels 27 to 29 are disclosed in great detail in co-pending U.S. Pat. No. 5,221,982 to Faris, which is incorporated herein by reference. Suitable methods for manufacturing voltage-controlled half-wave retarding panel 30 are disclosed in great detail in U.S. Pat. No. 4,719,507 to Bas and U.S. Pat. No. 4,670,744 to Buzak, which are also incorporated herein by reference. Notably, construction and operation of the polarizing filter panels 27 to 29 depend on particular properties of chiral liquid crystals (CLC), commonly referred to as cholesteric liquid crystals. These CLC polarizing filters operate according to the inherent "selective reflection property" of cholesteric liquid crystals, and such, provide sharp spectral response characteristics which are highly desirable when practicing the present invention. Notably, however, it is also possible to use conventional dichroic polarizing filters which operate on the inherent "adsorptive property" of dichroic materials in order to polarize spectral components of light. Details concerning the properties of liquid-phase cholesteric liquid crystals can be found in the paper by S. D. Jacobs, et al. at pages 1962–1978 of Journal of the Optical Society of America, B, Volume 5(9), September 1988. Details concerning the properties of solid-state polymer-phase cholesteric liquid crystals can be found in the paper by Robert Maurer at pages 110 et seq., of Society of Information Displays, SID 90 DIGEST, 1990.

Figure 5C:
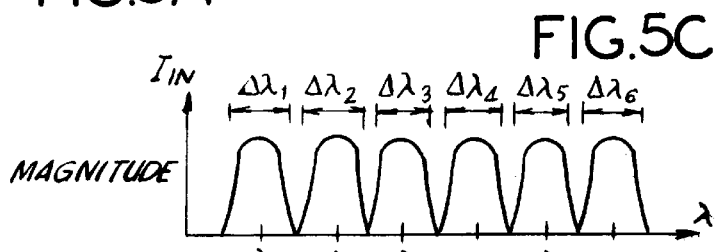
FIG. 5C is a schematic representation illustrating the magnitude versus wavelength response characteristics of an exemplary optical image having multiple groups of spectral components, which are provided to the input surface of the optical image spectrum multiplexer shown in FIG. 5A.
Figure 5D:
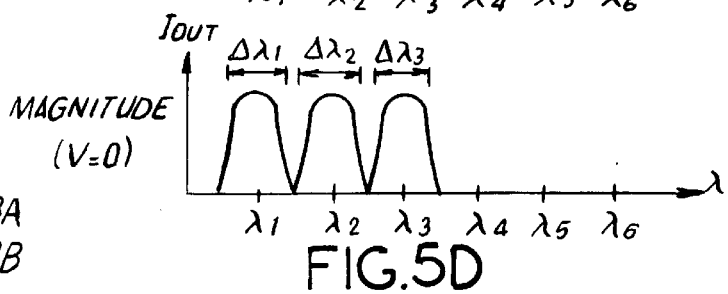
FIG. 5D is a schematic representation illustrating the magnitude versus wavelength response characteristics of the optical image emerging from the output surface of the optical image spectrum multiplexer shown in FIG. 5A, when the control voltage provided thereto has a first pre specified value.
Figure 5E:
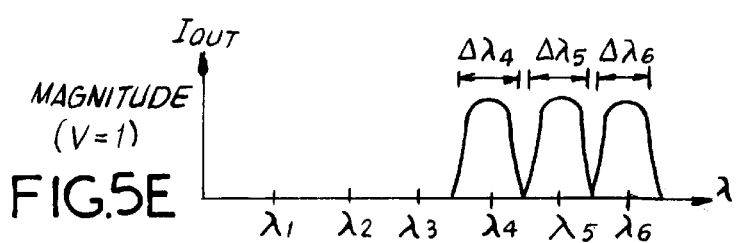
FIG. 5E is a schematic representation illustrating the magnitude versus wavelength response characteristics of the optical image emerging from the output surface of the optical image spectrum multiplexer shown in FIG. 5A, when the control voltage provided thereto has a second pre specified value.

In FIG. 5C, the spectrum for an exemplary optical image is schematically represented. Typically, an optical signal with such frequency characteristics is provided as an optical input signal to the input surface of each optical image spectrum multiplexer 20A and 20B. As shown, this optical input signal comprises six bands $\Delta\lambda_1$, $\Delta\lambda_2$ $\Delta\lambda_3$, $\Delta\lambda_4$, $\Delta\lambda_5$, $\Delta\lambda_6$, and each centered about a central wavelength $\lambda_1$, $\lambda_2$, $\lambda_3$, $\lambda_4$, $\lambda_5$, and $\lambda_6$, respectively. When the recording controller 21 provides control voltage V=0 to half-wave phase retarding panel 30 of the optical image spectrum multiplexer, only the first group of spectral components SCG1 emerge from the output surface of the spectrum multiplexer, while the second spectral component group SCG2 is filtered out, as shown in FIG. 5D. In this state of operation, half-wave phase retarding panel 39 does not convert the polarization state of incoming optical signals. When the recording controller 21 provides control voltage V=1 to the halfwave phase retarding panel of the spectrum multiplexer, only the second group of spectral components SCG2 emerge from the output surface of the spectrum multiplexer, while the first spectral component group SCG1 is filtered out, as shown in FIG. 5E. In this state of operation, half-wave phase retarding panel 39 converts the polarization state of incoming optical signals. Thus, when control voltages $V_L=0$ and $V_R=1$ are provided to the first and second optical image spectrum multiplexers of camera system 15 during the first recording period T1, and when the value of these control voltages are reversed during second recording period T2, then a pair of spectrally multiplexed color images of the 3-D scene are produced for storage and subsequent display.

Figure 5F:
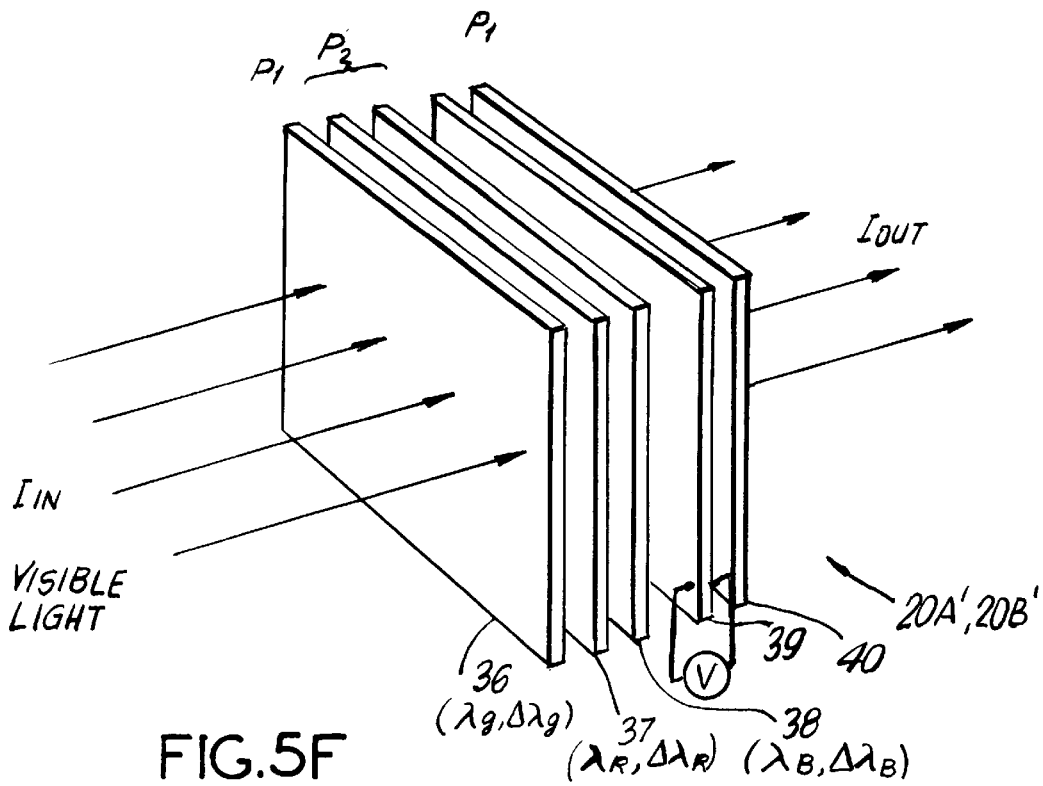
FIG. 5F is a particular embodiment of the optical-image spectrum multiplexer of the present invention shown in FIG. 5A, particularly adapted for multiplexing the spectral component groups associated with the colors green, red and blue.

The detailed structure of a particular embodiment of the optical image spectrum multiplexer of FIG. 4 will now be described with reference to FIGS. 5B and 5F. As shown, each optical image spectrum multiplexer 20A', 20B' comprises an assembly of optically transparent electro-optical panels, namely: a polarizing filter panel 36 for passing spectral component band associated with the color green, while imparting either a linear or circular polarization state P1 thereto; a pair of polarizing filter panels 37 and 38, for passing spectral component bands associated with the colors red and blue, respectively, while imparting either a linear or circular polarization state P2 thereto; a voltage-controlled half-wave (i.e. π radians) phase retarding array panel 39 for imparting either a 0 or π radian phase shift to the optical image (e.g. optical signal) transmitted therethrough when recording controller 21 provides voltage levels V1 or V2, respectively thereto; a broad band optical polarization panel 40 for imparting a linear or circular polarization state P1 to light transmitted therethrough; and picture-frame-like plastic housing 32 for supporting the perimetrical edges of the above panels when they are laminated together in the spatial ordering shown. As described above, frame-like housing facilitates the mounting of electrical conductors 33A and 33B leading to half-wave phase retarding panel 39. In general, the dimensions of electro-optical panel assembly 35 will vary from embodiment to embodiment. However, typical length and width dimensions for the optical image spectrum multiplexer might be 100 millimeters by 100 millimeters, with an overall thickness in the range of from about 1 to about 10 millimeters. Suitable methods for manufacturing each of the polarizing filter panels 37 and 38 are disclosed in great detail in co-pending U.S. Pat. No. 5,221,982 to Faris, which is incorporated herein by reference. Suitable methods for manufacturing voltage-controlled half-wave retarding panel 39 are disclosed in great detail in U.S. Pat. No. 4,719,507 to Bas and U.S. Pat. No. 4,670,744 to Buzak, which are also incorporated herein by reference.

Figure 5G:
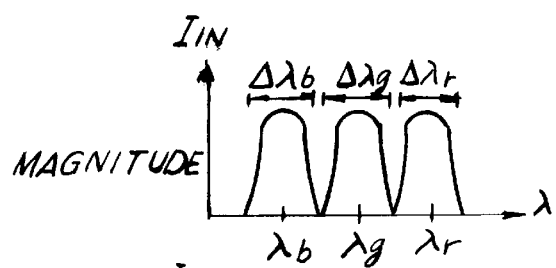
FIG. 5G is a schematic representation illustrating the transmission versus wavelength response characteristics of an exemplary optical image provided to the input surface of the optical image spectrum multiplexer shown in FIG. 5F.
Figure 5H:
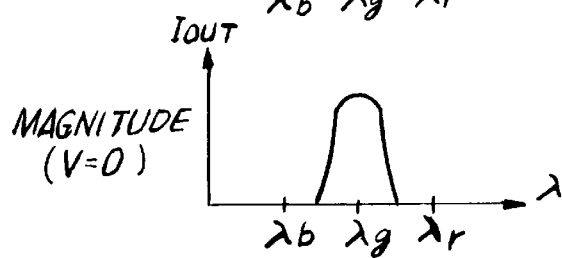
FIG. 5H is a schematic representation illustrating the transmission versus wavelength response characteristics of the optical image emerging from the output surface of the optical image spectrum multiplexer shown in FIG. 5E, when the control voltage provided thereto has a first value
Figure 5I:
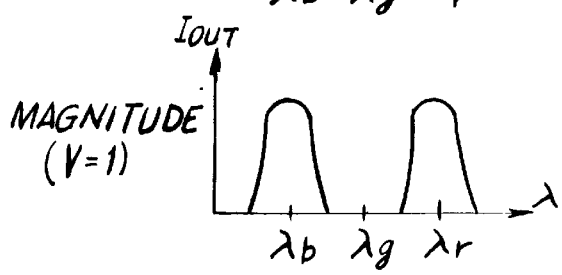
FIG. 5I is a schematic representation illustrating the transmission versus wavelength response characteristics of the optical image emerging from the output surface of the optical image spectrum multiplexer shown in FIG. 5, when the control voltage provided thereto has a second value.

As illustrated in FIG. 5G, the spectrum for a typical color optical image provided input to the input side of optical image spectrum multiplexer 20A' and 20B', comprises three bands each centered about a central wavelength. When the recording controller 21 provides control voltage V=0 to the half-wave phase retarding array panel of the spectrum multiplexer, only the first group of spectral components SCG1 associated with the color green emerge from the output surface of the spectrum multiplexer, while the second spectral component group SCG2 associated with colors red and blue (i.e. magenta) is filtered out, as shown in FIG. 5H. When the recording controller 21 provides control voltage V=1 to the half-wave phase retarding array panel of the spectrum multiplexer, only the second group of spectral components SCG2 associated with the color magenta (i.e. red and blue) emerge from the output surface of the spectrum multiplexer, while the first spectral component group SCG1 associated with the color green is filtered out, as shown in FIG. 5I. By providing control voltages V=0 and V=1 to first and second optical image spectrum multiplexers 20A' and 20B' in the camera system of FIG. 4 during the first recording period T1, and then reversing these control voltages during second recording period T2, a pair of spectrally multiplexed color images of the 3-D scene are produced for subsequent storage and display.

Figure 6A:
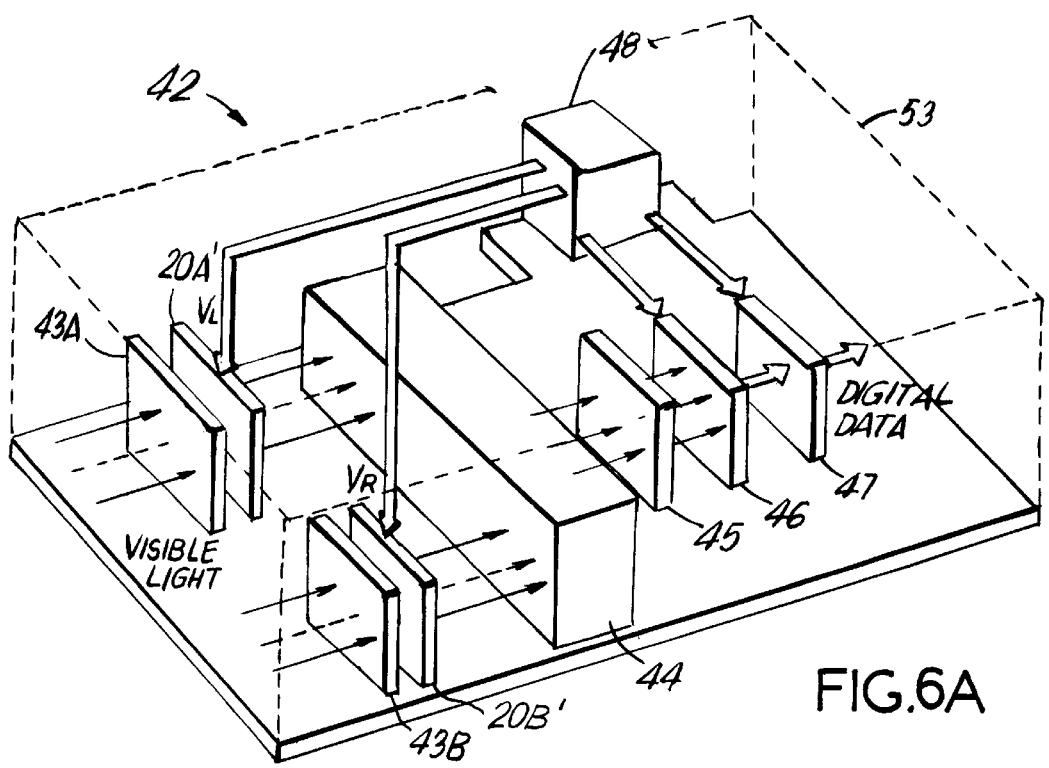
FIGS. 6A and 6B are schematic representations of a first illustrative embodiment of the solid-state camera system of the present invention, employing a pair of optical-image spectrum multiplexers of the type shown in FIG. 5C in order to produce a pair of spectrally-multiplexed color images of 3-D scenery from two pairs of left and right perspective images thereof.
Figure 6B:
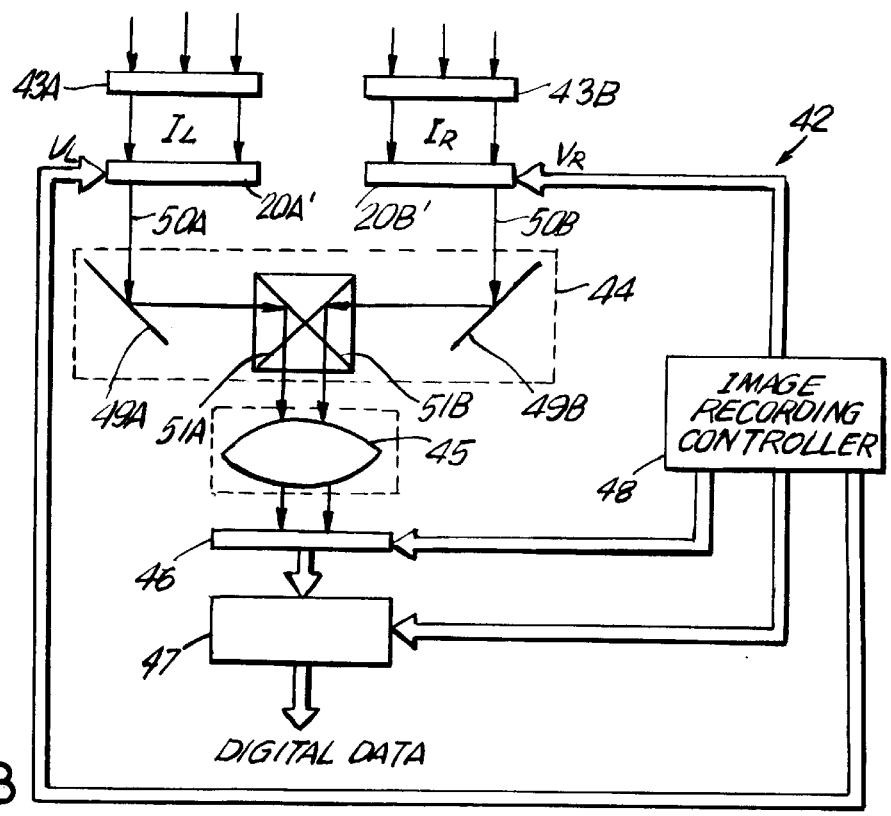

A solid-state camera system employing the optical image spectrum multiplexers of the present invention is shown in FIGS. 6A and 6B. As shown, camera system 42 comprises a number of subcomponents, namely: first and second image forming lenses 43A and 43B for forming left and right perspective color images, respectively, of a 3-D scene along first and second optical axis's; first and second optical image spectrum multiplexers 20A' and 20B' disposed along the first and second optical axis's, respectively; an optical image combining element 44; a third image forming lens 45; a CCD color image detecting array 46 operably associated with scanning electronics and an image frame buffer 47; and an image recording controller 48. As shown, optical image combining element 44 comprises first and second mirrors 49A and 49B disposed at 45 degrees with respect to the first and second optical axis's 50A and 50B, and third and fourth mirrors 51A and 51B, respectively, disposed parallel to the first and second mirrors respectively, so that the twice reflected optical images are optically coaxially combined and focused in a spatially coherent manner through the third image forming lens, to form a spectrally-multiplexed color image on the surface of the CCD image detecting array. The image recording controller 48 generates control signals to optical-image spectrum multiplexers 20A' and 20B', and CCD color image detecting array as described above. All of the above described components are stationarily mounted with respect to an optical bench 52, which is completely contained within a compact housing 53 of rugged construction. The housing is provided with connector jacks in order to supply electrical power to the camera system, while transmitting digitized video output signals to a color video image storage device, such as a VCR recorder or video frame grabber, or directly or indirectly to a stereoscopic image display system of the present invention. The table shown in FIG. 6C sets forth the various control voltage signals which are provided to the optical image spectrum multiplexers of the camera system during six consecutive image recording periods. Notably, two consecutive recording periods are required to generate and record three pairs of spectrally multiplexed color images using the camera system shown in FIGS. 6A and 6B.

Referring to FIGS. 7A to 7E, solid-state camera system 55 not requiring the optical image spectrum multiplexers of FIG. 5F will be described. The camera system of this alternative embodiment of the present invention comprises a number of subcomponents, namely: first and second image forming lenses 56A and 56B for forming left and right perspective color images of a 3-D scene, $I_L$ and $I_R$, respectively, along first and second optical axis; first and second CCD color image detecting arrays 57A and 57B, disposed along the first and second optical axis, respectively, for producing frames of digital color video data representative of left and right perspective images formed through lenses 56A and 56B; first and second color image frame buffers 58A and 58B for buffering single frames of digital color video data produced from the first and second CCD image detecting arrays, respectively; a pair of image frame buffer queues 59A and 59B, for buffering multiple frames of digital color video data sequentially produced from the first and second CCD image detecting arrays 57A and 57B, respectively; an image recording controller 60 for controlling the transfer of frames of digital video data from the first and second CCD image detecting arrays to the first and second image frame buffers, and from the first and second image frame buffers to the first and second image frame buffer queues, respectively; a digital data processor 61 for simultaneously retrieving frames of digital image data from the first and second image frame buffer queues (representative of pairs of left and right perspective images), and processing the same in accordance with the algorithm set forth in the flow chart of FIGS. 7B through 7E, so as to produce frames of digital data representative of pairs of spectrally multiplexed color images $\{I_{SMC_l}(1,k), I_{SMC_l}(2,k)\}$; a high speed data storage memory (e.g., VRAM) 62 for setting up a plurality of image frame buffers needed during the data process; a mass-type data storage device 63 for storing a large number of frames of digital video data representative of pairs of spectrally multiplexed color images $\{I_{SMC_l}(1,k), I_{SMC_l}(2,k)\}$; and a serial data transmission subsystem 64 having means for converting frames of such digital image data into serial streams of digital video output signals, and means for transmitting the same along a serial data communication channel. All of the above described components are stationarily mounted with respect to an optical bench 65, which is completely contained within a compact housing 66 of rugged construction. The housing is provided with connector jacks 66 in order to supply electrical power to the electronic, electro-optical and electrical components of the camera system, while transmitting the serial video data output signals to either a color video image storage device, such as a VCR recorder or video frame grabber, or directly or indirectly to a stereoscopic image display system of the present invention.

In general, each perspective color image formed on the CCD image detecting array 58A and 58B comprises a matrix of pixels, each having a color value representative of the spectral content of the image at the pixel's location in the image. During each recording cycle, CCD image detecting arrays 57A and 57B generate, for each perspective image captured, a frame of digital data representative of the intensity and color of each pixel in the detected perspective color images. Typically, the color value of each pixel contains a magnitude for each of the spectral components comprising the system of color representation (e.g, red, green, blue) being used. In the camera system shown in FIG. 7A, frames of digital video data representative of each pair of perspective images captured by CCD image detecting arrays 57A and 57B are immediately buffered in first and second image buffers 58A and 58B. These frames of digital video data are subsequently accessed by image recording controller 60 and buffered in first and second image frame buffer queues 59A and 59B. Thereafter, frames of digital video data are processed by image data processor 61 in accordance with the spectral-multiplexing algorithm illustrated in FIGS. 7B through 7E.

Figures 6C, 7A:
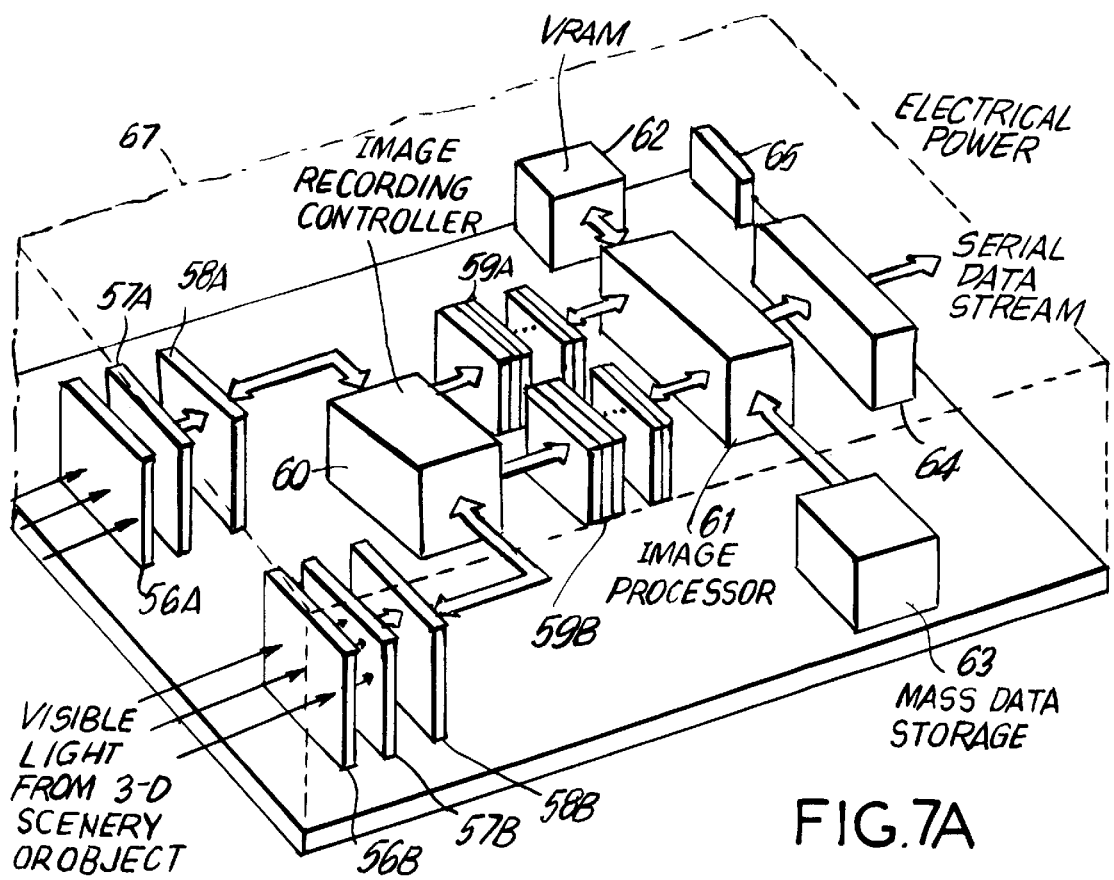
FIG. 6C is a table illustrating which spectral components are multiplexed, optically combined, and subsequently recorded during the alternating recording periods of the image recording process carried out by the camera system of the present invention shown in FIGS. 6A and 6B.
FIG. 7A is a schematic block diagram of a second illustrative embodiment of the solid-state camera system of the present invention, employing digital signal processing in order to produce a pair a pair of spectrally-multiplexed color images of 3-D scenery from a single pair of left and right perspective color images thereof.

As illustrated in FIGS. 7B through 7E, the spectral-multiplexing algorithm comprises six data processing stages which cooperatively produce pairs of spectrally-multiplexed color images $\{I_{SMCI}(1,k), I_{MCI}(2,k)\}$ that can be used to stereoscopically display 3-D scenery recorded by the camera system of FIG. 7A. However, in order to achieve computational efficiency, the first, second, fourth and fifth data processing stages can be performed in parallel as shown.

Figure 7B:
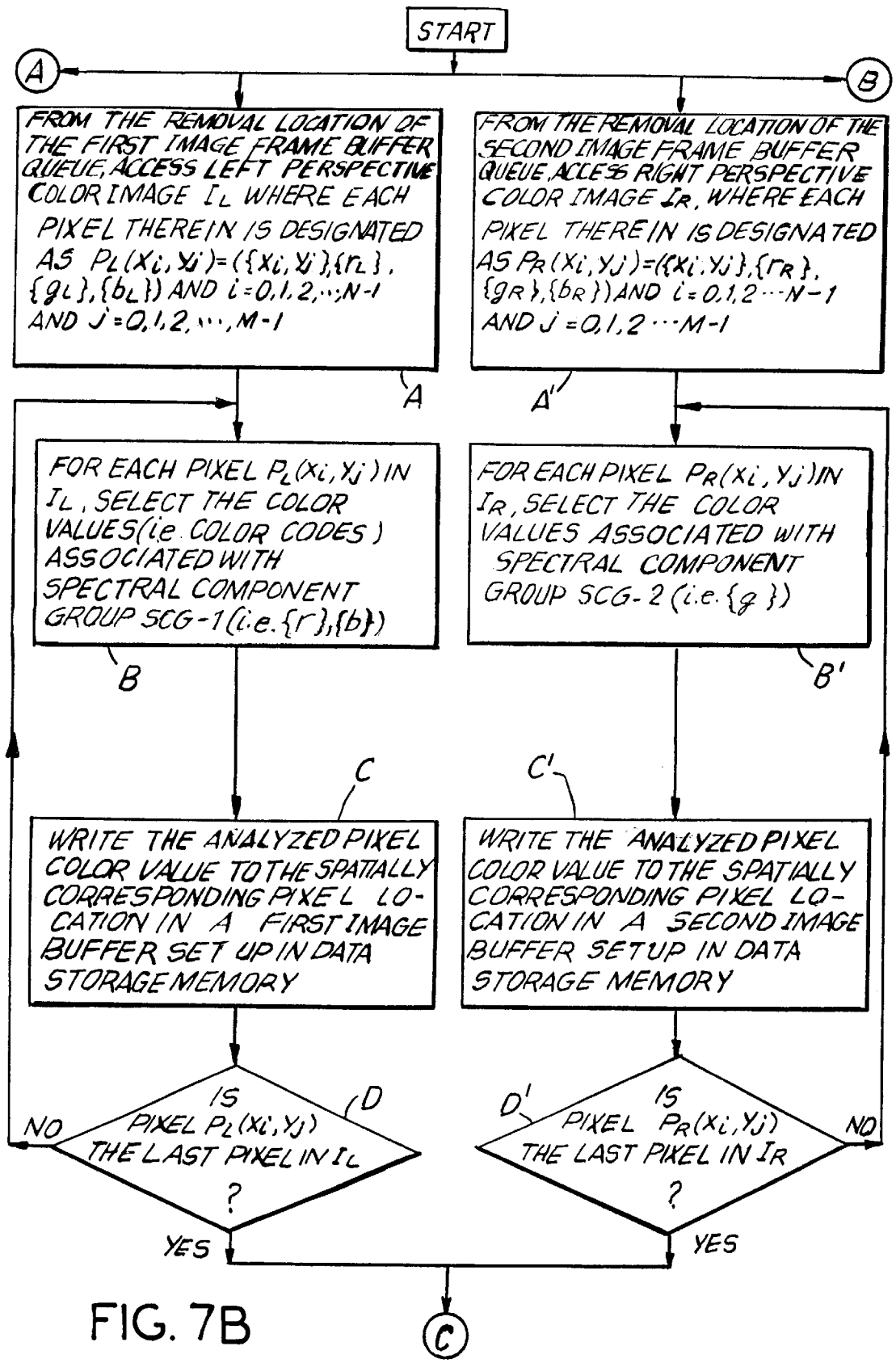
FIGS. 7B through 7E, taken together, provide a schematic representation of a digital image processing method carried out by the camera system shown in FIG. 7A in order to produce a pair of spectrally-multiplexed color images of 3-D scenery from a single pair of left and right perspective images thereof.

As illustrated at Block A in FIG. 7B, image data processor 61 performs the first step in the first stage of the spectral-multiplexing algorithm by accessing from the first image frame buffer queue 59A, a frame of digital data representative of a left perspective color image $I_L$ of recorded 3-D scenery, where each pixel therein is designated as : $P(x_i,y_j)=(\{x_i,y_j\},\{r_{i,j}\},\{g_{i,j}\},\{b_{i,j}\})$, and i=0,1, . . . N−1 and j=0, 1, . . . ,M−1. At Block B, for each pixel $P_L(x_i,y_j)$ in the left color perspective image $I_L$, the processor selects the color value (i.e. color codes) associated with the first predefined spectral component group SCG1 (i.e. $\{r\}, \{b\}$). Then at Block C the processor writes the selected pixel color value to the corresponding pixel location in a first image buffer set up in data storage memory 62. When at Block D the processor determines that the last pixel in the left perspective image has been processed (i.e. i=N−1 and j=M−1), the image processing operations set forth at Blocks E through H are carried out. If desired or required, the image processing operations set forth at Blocks A' through D' can be carried out in parallel with the corresponding operations at Blocks A through D using a second image buffer set up in data storage memory 62. For purposes of completion, these pixel-data processing operations will be described in detail below.

As illustrated at Block A' in FIG. 7A, the first step in the second stage of the spectral-multiplexing algorithm involves accessing from the second image frame buffer queue 59B, a frame of digital data representative of the right perspective color image $I_R$ where each pixel therein is designated as :$P(x_i,y_j)=(\{x_i,y_j\},\{r_{i,j}\},\{g_{i,j}\},\{b_{i,j}\})$, and i=0,1, . . . N−1 and j=0,1, . . . ,M−1. At Block B', for each pixel $P_R(x_i,y_j)$ in the right color perspective image $I_R$, the processor selects the color value (i.e. color code) associated with the second predefined spectral component group SCG2 (i.e. $\{g\}$). Then at Block C' the processor writes the selected pixel color value to the corresponding pixel location in a second image buffer set up in data storage memory 62. When the processor determines at Block D' that the last pixel in the right perspective image has been processed (i.e. i=N−1 and j=M−1), the processor proceeds to Block E in FIG. 7B.

Figure 7C:
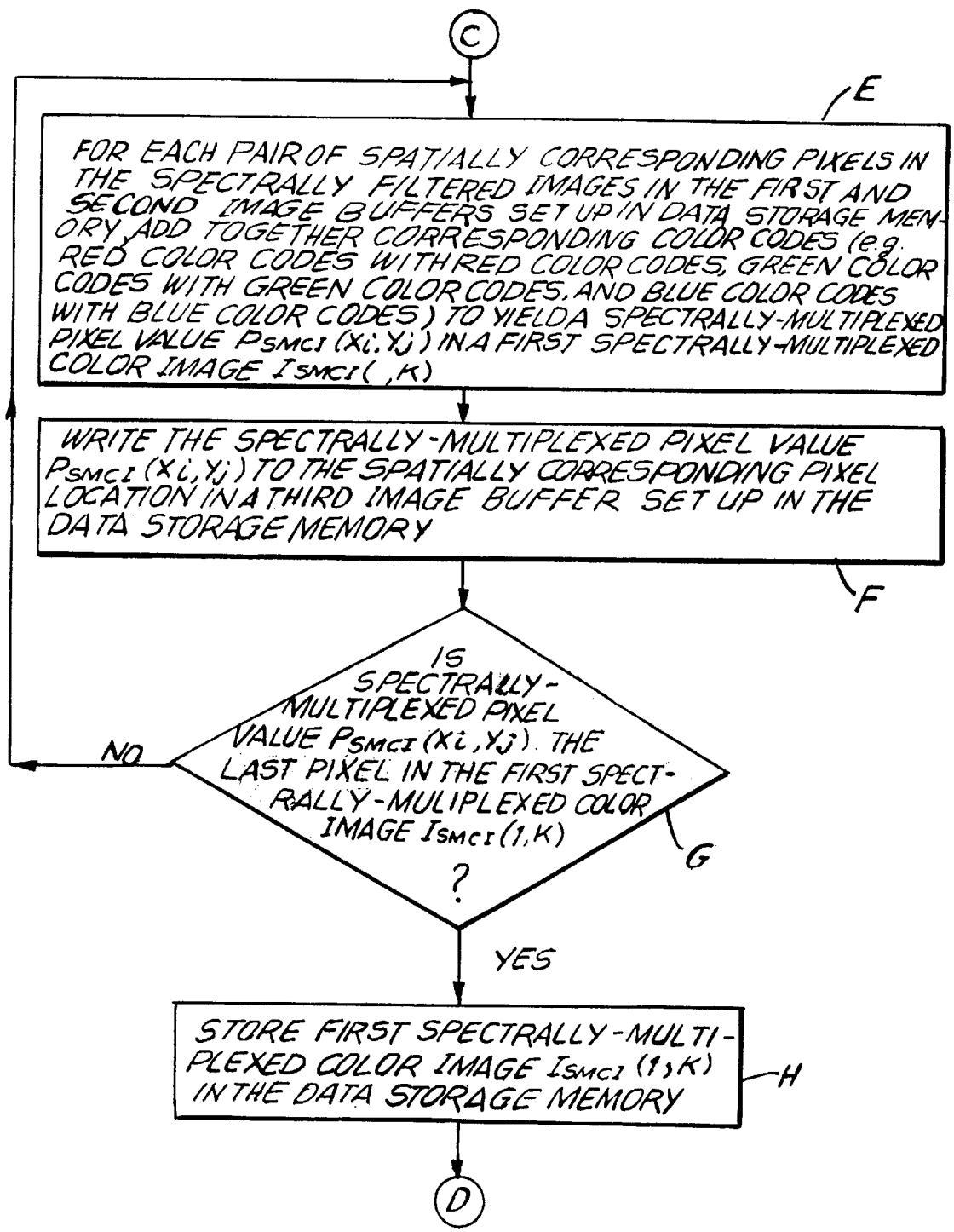

At Block E in FIG. 7C, the processor processes the spectrally filtered images residing in the first and second image buffers so as to produce a first spectrally-multiplexed color image $I_{SMCI}$. As indicated at Block E, for each pair of spatially corresponding pixels in the spectrally filtered images buffered in the first and second image buffers, the processor adds together corresponding color values $\{r_{x,y}\}$, $\{g_{x,k}\}$ in order to yield the (i,j)-th spectrally-multiplexed pixel $P_{SMCI}(x_i,y_j)$ in the first spectrally-multiplexed color image $I_{SMCI}(1,k)$. in the k-th stereo pair thereof. Then at Block F, the processor writes the spectrally-multiplexed pixel $P_{SMCI}(x_i,y_j)$ into its spatially corresponding pixel location in a third image buffer set up in data storage memory 62. As indicated at Block G, these pixel-data processing operations are performed for each set of spatially corresponding pixels residing in the first and second image buffers, until the entire first spectrally-multiplexed color image $I_{SCMI}(1,k)$. is generated (i.e., i=N−1 and j=M−1). Then at Block H, the first spectrally-multiplexed color image $I_{SMCI}(1,k)$. is stored in mass-type data storage memory 63. Thereafter, the processor performs operations necessary to produce the second spectrally-multiplexed color image $I_{SCMI}(2,k)$ associated with the k-th stereo image pair thereof. The details of these pixel-data processing operation will be described below.

Figure 7D:
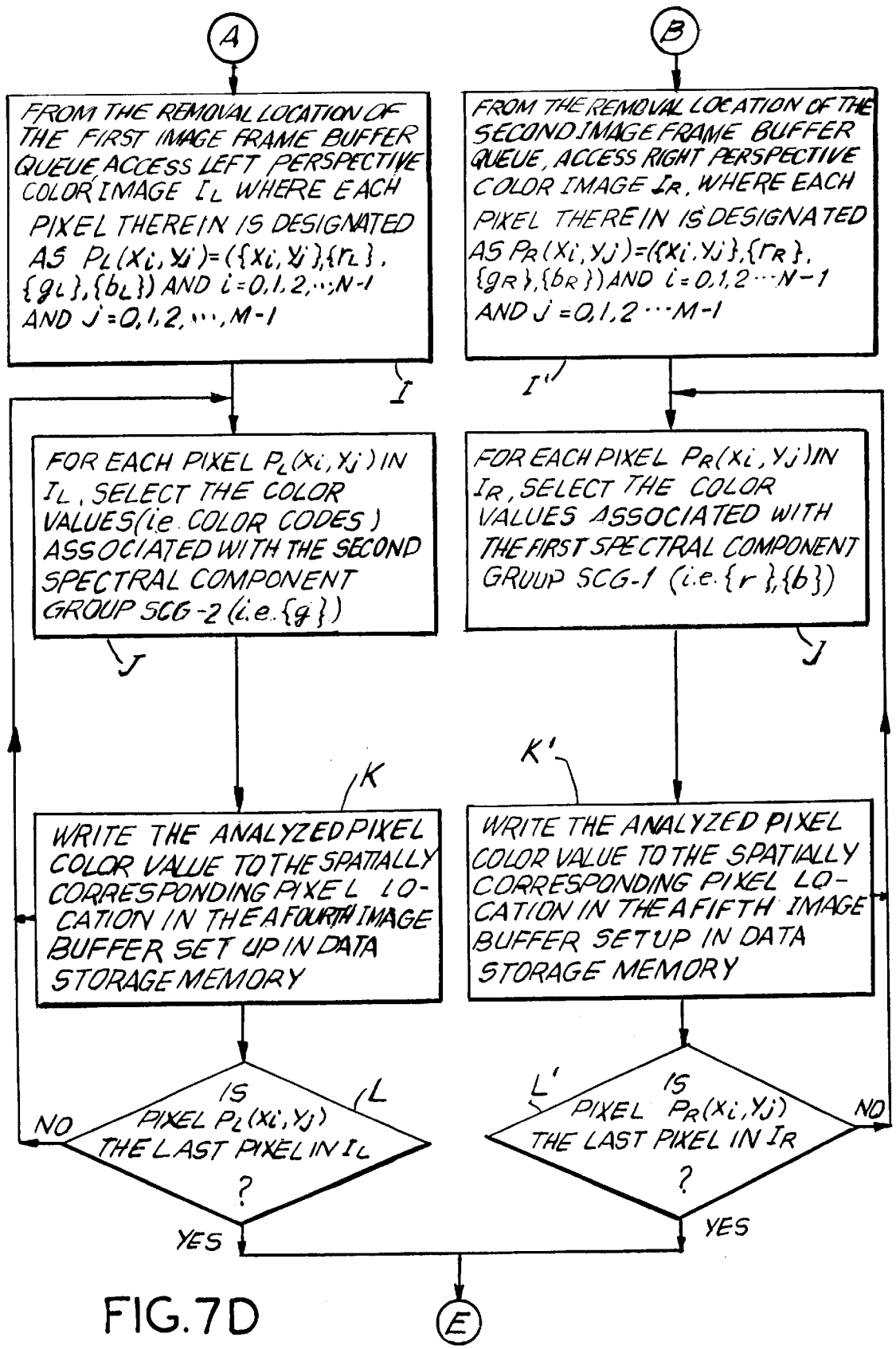

As illustrated at Block I in FIG. 7D, the first step in the fourth stage of the spectral-multiplexing algorithm involves accessing once again from first image buffer queue 59A, the same frame of digital data representative of the left perspective color image $I_L$ where each pixel therein is designated as: $P(x_i,y_j)=(\{x_i,y_j\},\{r_{i,j}\},\{g_{i,j}\},\{b_{i,j}\})$, and i=0,1, . . . N−1 and j=0,1, . . . ,M−1. At Block J, for each pixel $P_L(x_i,y_j)$ in the left color perspective image $I_L$, the processor selects the color value (i.e. color code) associated with the second predefined spectral component group SCG2 (i.e. $\{g\}$). Then at Block K the processor writes the selected pixel color value to the corresponding pixel location in a fourth image buffer set up in data storage memory. When the processor determines at Block L that the last pixel in the left perspective image has been processed (i.e. i=N−1 and j=M−1), the processor proceeds to Block M. While the image processing operations set forth at Blocks M through P are being carried out, preferably the corresponding pixel data processing operations set forth at Blocks I' through L' are carried out in parallel. For purposes of completion, these pixel-data processing operations will be described below.

As illustrated at Block I' in FIG. 7D, the first step in the fifth stage of the spectral-multiplexing algorithm involves accessing once again from second image frame buffer queue 59B, the same frame of digital data representative of the right perspective color image $I_R$ where each pixel therein is designated as :$P(x_i,y_j)=(\{x_i,y_j\},\{r_{i,j}\},\{g_{i,j}\},\{b_{i,j}\})$, and i=0, 1, . . . N−1 and j=0,1, . . . ,M−1. At Block L', for each pixel $P_R(x_i,y_j)$ in the right color perspective image $I_R$, the processor selects the color value (i.e. color codes) associated with the first predefined spectral component group SCG1 (i.e. $\{r\}, \{b\}$). Then at Block K' the processor write the selected pixel color value to the corresponding pixel location in a fifth image buffer set up in a data storage memory 62. When the processor determines at Block L that the last pixel in the right perspective image has been processed (i.e. i=N−1 and j=M−1), the processor proceeds to Block M in FIG. 7E.

Figure 7E:
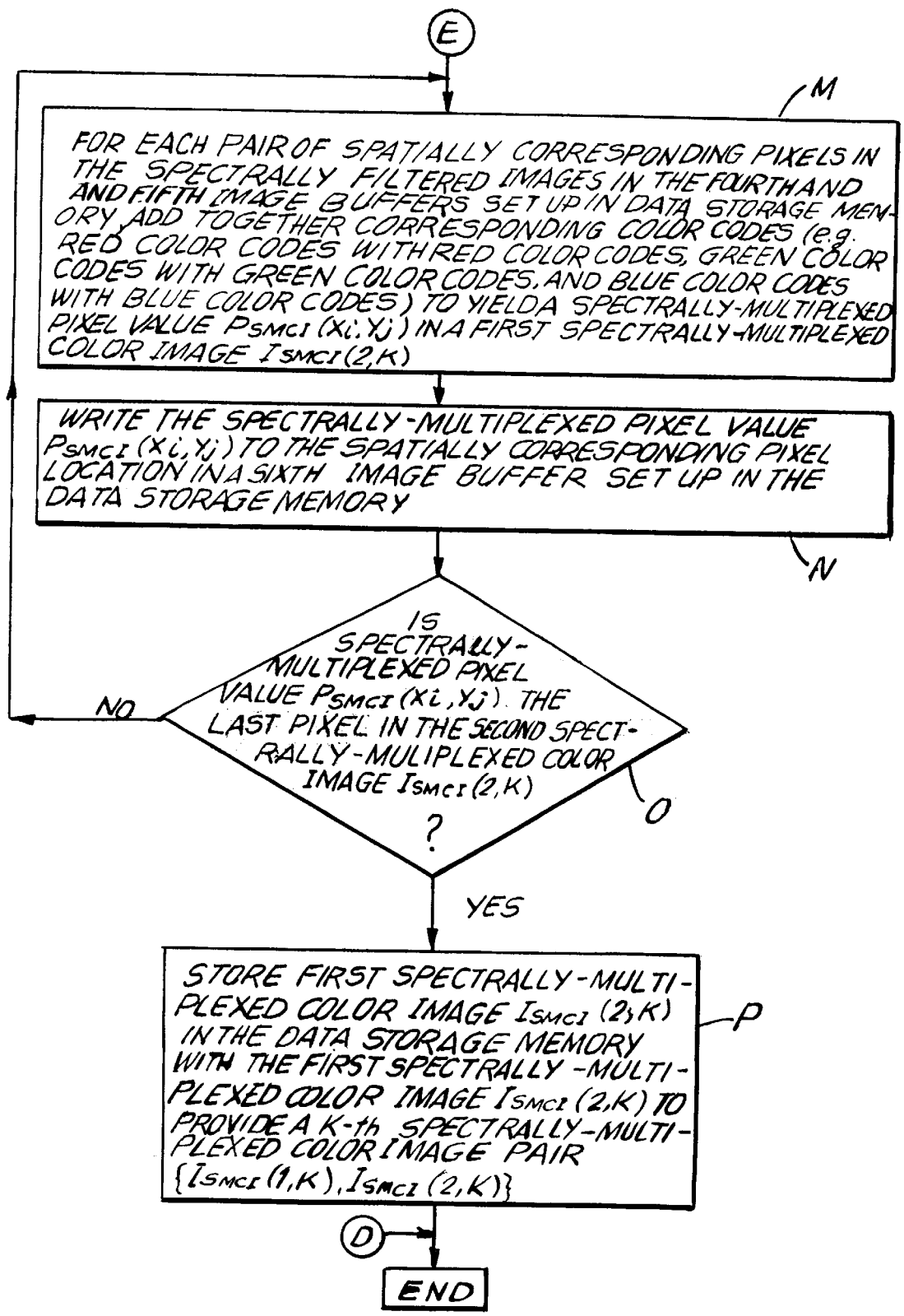

At Block M in FIG. 7E, the processor processes the spectrally filtered images residing in the fourth and fifth image buffers so as to produce the second spectrally-multiplexed color image $I_{SMCI}(2,k)$. As indicated at Block M', for each pair of spatially corresponding pixels in the spectrally filtered images buffered in the fourth and fifth image buffers, the processor adds together the corresponding color values $\{r_{x,y}\},\{g_{x,k}\},\{b_{x,y}\}$ in order to yield the (i,j)-th spectrally-multiplexed pixel $P_{SCMI}(x_i,y_j)$ in the second spectrally-multiplexed color image $I_{SCMI}(2,k)$. in the k-th stereo image pair thereof. Then at Block N the processor writes the spectrally-multiplexed pixel $P_{SMCI}(x_i,y_j)$ into its spatially corresponding pixel location in a sixth image buffer set up in data storage memory 62. As indicated at Block O, these pixel processing operations are performed for each set of spatially corresponding pixels residing in the fourth and fifth image buffers until the entire second spectrally-multiplexed color image $I_{SMCI}(2,k)$. is generated. Then at Block P, the second spectrally-multiplexed color image $I_{SMCI}(2,k)$. is stored in mass-type data storage memory 63 along with the first spectrally-multiplexed color image $I_{SMCI}(1,k)$. for future access and display. Together, the first and second spectrally-multiplexed color images comprise a spectrally-multiplexed color image pair $\{I_{SMCI}(1,k),I_{SCMI}(2,k)\}$, containing sufficient visual information for stereoscopic viewing of the 3-D scenery recorded by the camera system of FIG. 7A. The above-described image processing method can be repeated upon left and right perspective color images of recorded 3-D scenery in order to produce spectrally-multiplexed color image pairs at a sufficiently high rate to support 3-D stereoscopic viewing. Novel techniques for stereoscopically displaying pairs of spectrally-multiplexed color images produced by the SMCI camera systems hereof, will be described hereinafter. Notably, while FIGS. 7A to 7E teaches a digital camera and data processing technique, it is understood that analog signal processing circuitry can be readily adapted for use in constructing a camera system with such functionalities.

Figure 8A:
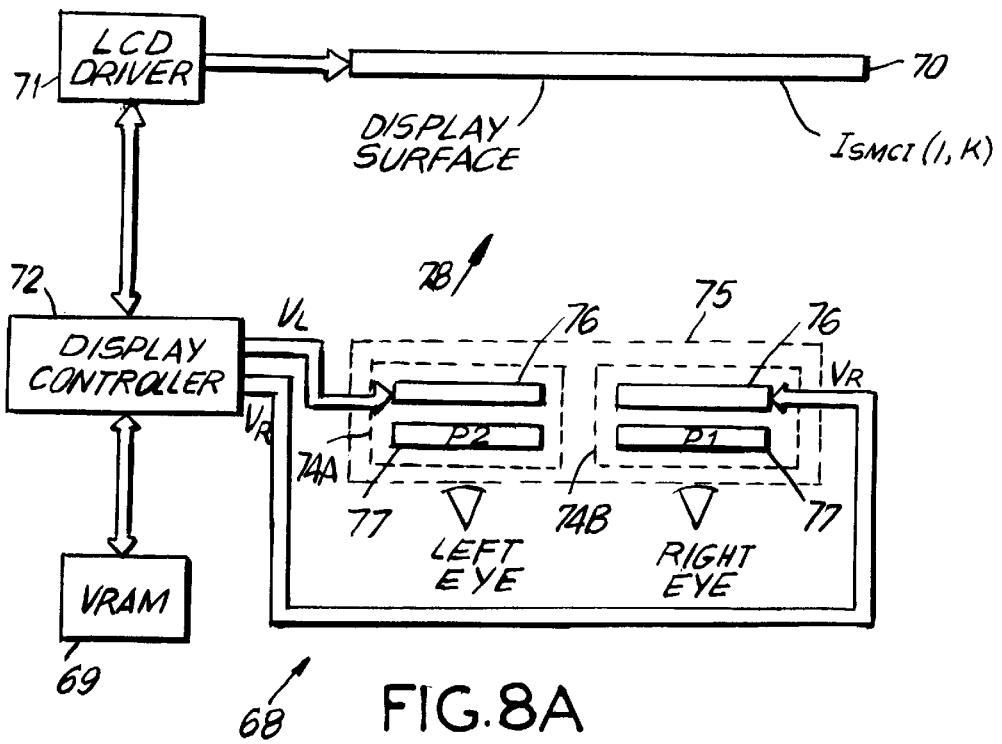
FIGS. 8A and 8B, taken together, provide a schematic representation of a system and method for displaying a pair of spectrally-multiplexed color images of 3-D scenery, stereoscopically viewable through a pair of electrically-active polarized lenses, each incorporating either the optical-image spectrum polarizer of the present invention shown in FIGS. 9A or 9C.
Figure 8B:
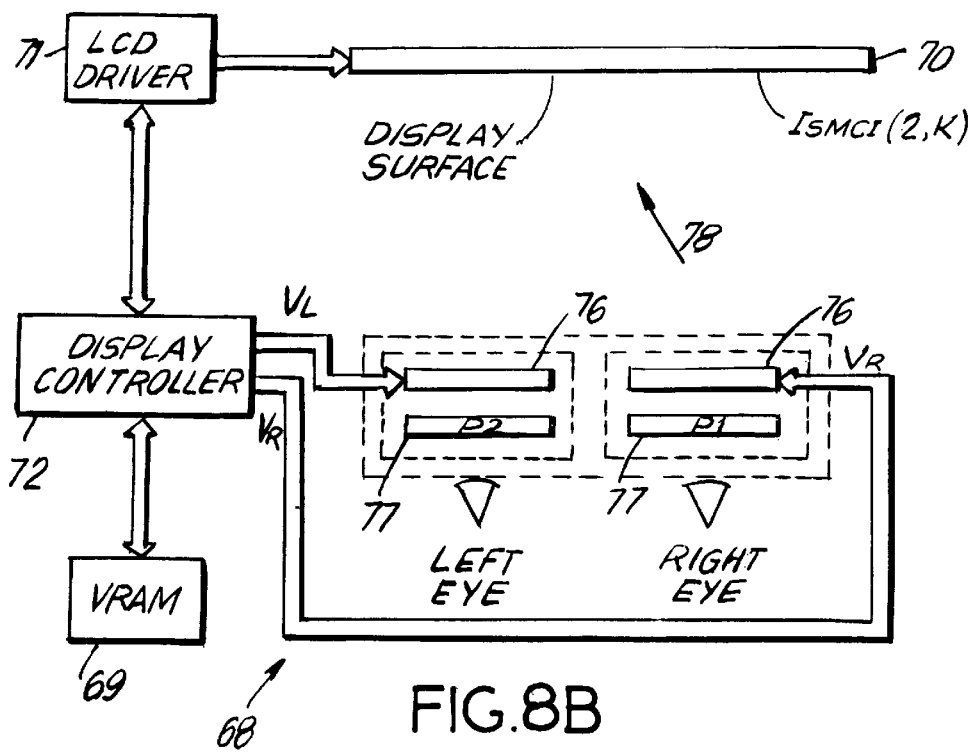

Referring to FIGS. 8A and 8B, a generalized method for displaying spectrally-multiplexed color images using electrically-active polarizing eyewear will now be described. As illustrated in FIGS. 8A and 8B, display system 68 comprises a number of components, namely: video random access memory (VRAM) 69 for storing frames of digital video data representative of spectrally-multiplexed color images of 3-D scenery; a flat liquid crystal display (LCD) panel 70 consisting of a matrix of actively driven pixel elements; LCD driver circuitry 71 for driving the pixels of the LCD panel; an image display controller (e.g., programmed microprocessor) 72 for accessing frames of digital video data from VRAM 69 and providing the same to LCD driver circuitry 71 so that spectrally-multiplexed color images are visually displayed on LCD panel 70 at rate in excess of 30 frames per second; and lightweight spectacles 73 is to impart comprising a pair of electrically-active polarizing lenses 74A and 74B mounted in a frame 75. The function of spectacle 73 is to impart time dependent polarization states to particular spectral component groups of light emitted from the LCD panel, during the image display process. As illustrated, each polarizing lens comprises an optical process. As shown, each lens 75 comprises an image spectrum polarizer 76 laminated directly onto a broad band optical polarizer 77. The broad band optical polarizer for the left lens 74A is characterized by either a linear or circular polarization state P2, whereas the broad band optical polarizer for the right lens 74B is characterized by either a linear or circular polarization state P1. Notably, display panel 70 can be realized using alternative image display technology including, for example, CRT display devices, LCD flat panel display panels, plasma display panels, electroluminescent display panels and the like.

As shown in FIG. 8A, the display controller displays a first spectrally-multiplexed color image of a 3-D scene on the LCD panel during a first display period. As illustrated in FIG. 8A, this spectrally-multiplexed color image contains only the first spectral component group SCG1 of the left perspective image and the second spectral component group SCG2 of the right perspective image. During this display period, display controller 72 provides a first control signal $V_L$ to the left polarizing lens 74A, changing its spectral transmission characteristics so that only the first spectral component group SCG1 of the left perspective image can propagate from the display surface, through the transmission medium (e.g. air) 78, and be viewed by the left eye of the viewer. At the same time, the display controller 72 provides a second control signal $V_R$ to the right polarizing lens 74B changing its spectral transmission characteristics so that only the second spectral component group SCG2 of the right perspective image can propagate from the display surface, through the transmission medium and be viewed by the right eye of the viewer. Then as shown in FIG. 8B, the display controller displays a second spectrally-multiplexed color image of the same 3-D scene on the LCD panel during a second display period. As illustrated in FIG. 8B, this spectrally-multiplexed color image contains only the second spectral component group SCG2 of the left perspective image and the first spectral component group SCG1 of the right perspective image. During this display period, the display controller provides the second control signal to the left polarizing lens 74A changing its spectral transmission characteristics so that it allows only the second spectral component group SCG2 of the left perspective image can propagate from the display surface, through the transmission medium, and be viewed by the left eye of the viewer. At the same time, the display controller 72 provides the first control signal to the right polarizing lens 74A changing its spectral transmission characteristics so that only the first spectral component group SCG1 of the right perspective image can propagate from the display surface, through the transmission medium, and be viewed by the right eye of the viewer. As this cyclical display process is repeated at least thirty times per second, the spectral components of the left and right perspective images are effectively provided to the left and right eyes of the viewer, permitting full color stereoscopic viewing of the 3-D scene without image-flicker.

The detailed structure of optical image spectrum polarizers 74A, 74B is schematically illustrated in FIGS. 9A and 9B. As shown, each optical image spectrum polarizer of the illustrative embodiment generally comprises an assembly of optically transparent electrooptical panels, namely: a first plurality of passive polarizing filter panels 80, 81 and 82, for passing spectral component bands $\Delta\lambda_1$, $\Delta\lambda_2$ and $\Delta\lambda_3$, respectively, while imparting either a linear or circular polarization state P1 thereto; a second plurality of passive polarizing filter panels 83, 84 and 85, for passing spectral component bands $\Delta\lambda_4$, $\Delta\lambda_5$ and $\Delta\lambda_6$, respectively, while imparting either a linear or circular polarization state P2 thereto; a voltage-controlled half-wave phase retarding panel 86 for imparting either a 0 or π radian phase shift to the optical image (e.g., optical signal) transmitted therethrough when display controller 72 provides voltage levels $V_L$ or $V_R$ thereto; and frame-like plastic housing 87 for supporting the perimetrical edges of the above panels when they are laminated together in the spatial ordering shown, and also for mounting a pair of electrical conductors 88A and 88B leading to the half-wave phase retarding panel 86. In general, the dimensions of electro-optical panel assembly will vary from embodiment to embodiment. However, typical length and width dimensions for the optical image spectrum polarizer will typically be 50 millimeters by 50 millimeters. The thickness of the electro-optical panel assembly between optically transparent input and output surfaces 89 and 90 will typically be in the range of from about 1 to about 10 millimeters, although such dimensions may vary from embodiment to embodiment.

Typically, although not necessarily, the spectral component bands of the first plurality of polarizing filter array panels will be selected so as to correspond to a first set of visible colors, while the spectral component bands of the second plurality of polarizing filter panels are selected so as to correspond to a second set of visible colors. However, in order to minimize "cross-viewing" between the left and right visual fields of viewers during the stereoscopic display process of the present invention, spectral component band selection and design will be best made with consideration to the amount of power present in the spectral bands of perspective images utilized in producing the spectrally-multiplexed images. Suitable methods for manufacturing each of the polarizing filter panels 80 to 85 are disclosed in great detail in co-pending U.S. Pat. No. 5,221,982 to Faris. Suitable methods for manufacturing voltage-controlled half-wave retarding panel 86 are disclosed in great detail in U.S. Pat. No. 4,719,507 to Bas and U.S. Pat. No. 4,670,744 to Buzak. The construction and operation of the polarizing filter array panels is based upon the selective reflective property of cholesteric liquid crystals.

As illustrated in FIG. 9C, the spectrum of an exemplary optical image provided to the optically transparent input surface of each optical image spectrum polarizer comprises six bands $\Delta\lambda_1$, $\Delta\lambda_2$ $\Delta\lambda_3$, $\Delta\lambda_4$, $\Delta\lambda_5$, and $\Delta\lambda_6$, each centered about a central wavelength $\lambda_1$, $\lambda_2$, $\lambda_3$, $\lambda_4$, $\lambda_5$, and $\lambda_6$, respectively. Whenever display controller 72 provides control voltage V=0 to the half-wave phase retarding panel 86, the first group of spectral components SCG1 emerge from the output surface of the spectrum polarizer with polarization state P1, while the second spectral component group SCG2 emerges with polarization state P2. Whenever display controller 72 provides control voltage V=1 to the half-wave phase retarding array panel of the spectrum polarizer, the second group of spectral components SCG2 emerge from the output surface of the spectrum polarizer with polarization state P1, while the first spectral component group SCG1 emerges with. polarization state P2. Thus as shown in FIGS. 9D and 9E, when control voltages $V_L$=0 and $V_R$=0 are provided to the first and second optical image spectrum polarizers 74A and 74B in polarizing spectacles 73 during each first display period T1, and when the values of these control voltages are changed to '1' during each second display period T2, then only the spectral components associated with the left perspective image(s) of the 3-D scene are transmitted to the left eye of the viewer through broad band polarizer (P2) 77, while only the spectral components associated with the right perspective image(s) thereof are transmitted to the right eye of the viewer through broad band polarizer (P1) 77. During each first and second consecutive display periods, fusion of these spectral components occurs within the vision system of the viewer, thereby providing the viewer with full color and depth perception of the 3-D scene.

Figure 9F:
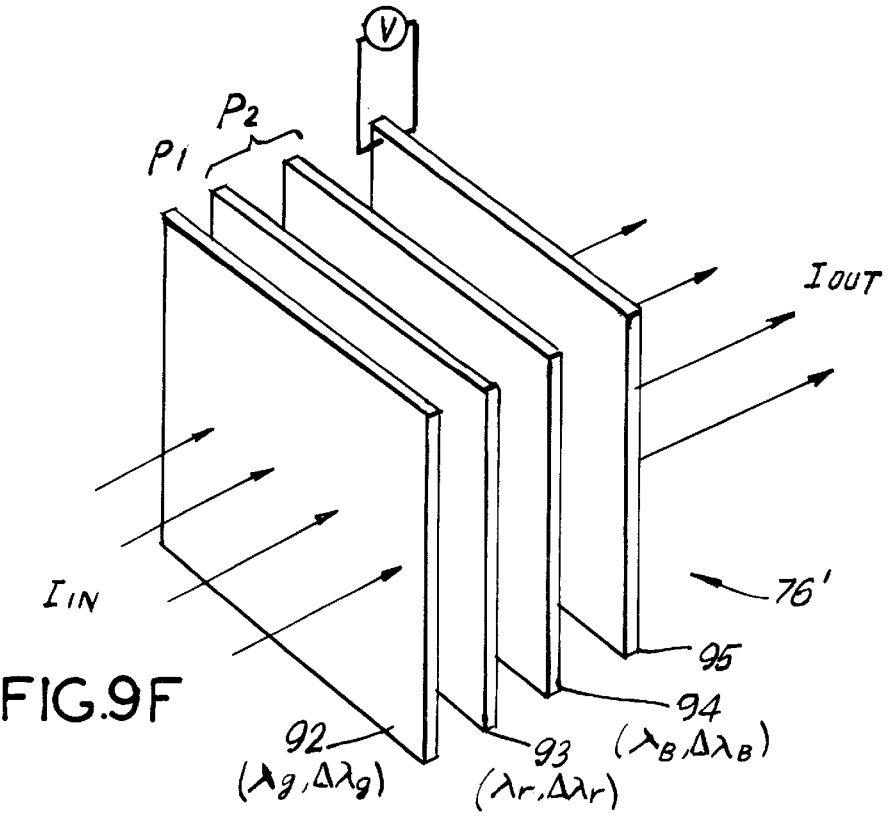
FIG. 9F is a schematic representation illustrating the polarization versus wavelength response characteristics of an exemplary color optical image provided to the input surface of the optical image spectrum polarizer shown in FIG. 9E.

The detailed structure of a particular embodiment of the optical image spectrum polarizers 74A, 74B is schematically illustrated in FIGS. 9F and 9B. As shown, optical image spectrum polarizer 74A', 74B' comprises an assembly of optically transparent electro-optical panels, namely: a passive polarizing filter panel 92 for passing the spectral component band $\Delta\lambda_G$ associated with the color green, while imparting either a linear or circular polarization state P1 thereto; a pair of passive polarizing filter panels 93 and 94, for passing spectral component bands associated with the colors red and blue, respectively, while imparting either a linear or circular polarization state P2 thereto; a voltage-controlled half-wave phase retarding panel 95 for imparting either a 0 or π radian phase shift to optical images transmitted therethrough when display controller 72 provides voltage levels V=0 and V=1 thereto, respectively; and the frame-like plastic housing 87 for supporting the perimetrical edges of the above panels when they are laminated together in the spatial ordering shown, and also for mounting a pair of electrical conductors 88A and 88B leading to half-wave phase retarding panel 95. In general, the dimensions of this electro-optical panel assembly will vary from embodiment to embodiment. However, in a preferred embodiment typical length and width dimensions for each optical image spectrum polarizer will be 50 millimeters by 50 millimeters, with an overall thickness in the range of from about 1 to about 10 millimeters. Suitable methods for manufacturing each of the polarizing filter panels 92 to 94 are disclosed in great detail in co-pending U.S. Pat. No. 5,221,982 to Faris. Suitable methods for manufacturing voltage-controlled half-wave retarding panel 95 are disclosed in great detail in U.S. Pat. No. 4,719,507 to Bas and U.S. Pat. No. 4,670,744 to Buzak.

Figure 9G:
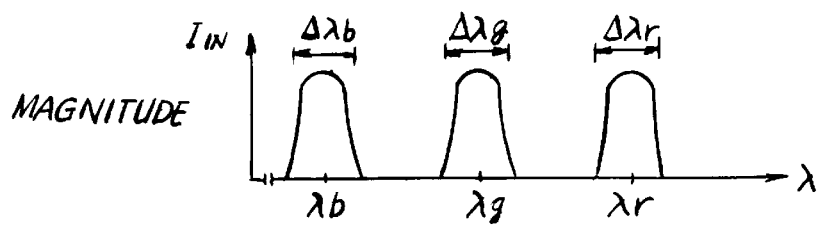
FIGS. 9G–9I are schematic representations illustrating the polarization versus wavelength response characteristics of the optical-image spectrum polarizer shown in FIG. 9E, exhibited during the first and second cyclical display periods of the image display process of the present invention.
Figure 9H:
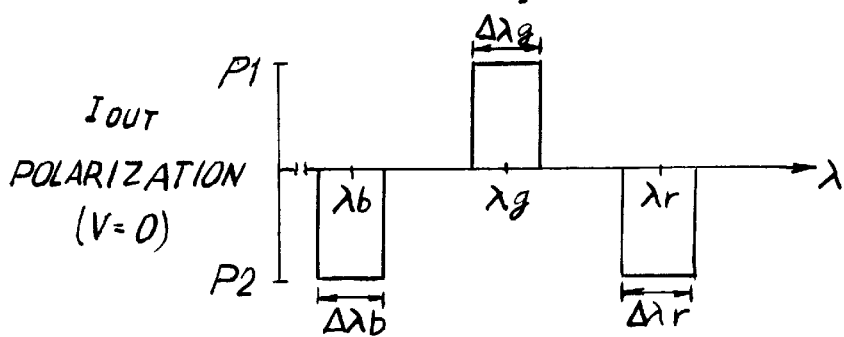
Figure 9I:
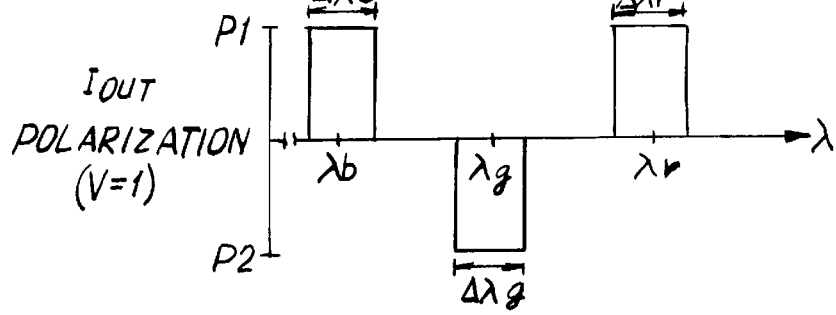

As illustrated in FIG. 9G, the spectrum for a typical color optical image provided input to the optically transparent input surface of each optical image spectrum polarizer 74A' and 74B', comprises three bands $\Delta\lambda_R$, $\Delta\lambda_G$ and $\Delta\lambda_B$, each centered about a central wavelength $\lambda_R \lambda_G$ and $\lambda_B$, respectively. Whenever the display controller 72 provides control voltage V=0 to the half-wave phase retarding array panel 95, the first group of spectral components SCG1 associated with the colors blue and red (i.e. magenta) emerge from the output surface of the spectrum polarizer with polarization state P1, while the second group of spectral components SCG2 associated with color green emerge with polarization state P2. In this state of operation, half-wave phase retarding panel 95 does not convert the polarization state of spectrally polarized optical signals. Whenever the display controller 72 provides control voltage V=1 to the half-wave phase retarding panel 95, the second group of spectral components SCG2 associated with the color green emerge from the output surface of the spectrum polarizer with polarization state P2, while the first group of spectral components SCG1 associated with the color magenta emerge with polarization state P1. In this state of operation, half-wave phase retarding panel 95 converts the polarization state of incoming optical signals. Thus as shown in FIGS. 9H and 9I, when control voltages $V_L$=1 and $V_R$=1 are provided to first and second optical image spectrum polarizers 74A and 74B during each first display period T1, and then the values of these control voltages are changed to "1" during each second display period T2, then only the spectral components associated with the left perspective image of the 3-D scene are transmitted to the left eye of the viewer through broad band optical polarizer (P2), while only the spectral components associated with the right perspective image thereof are transmitted to the right eye of the viewer through broad band optical polarizer (P1). During each first and second consecutive display period, fusion of these spectral components occurs within the vision system of the viewer, providing full color and depth perception of the 3-D scene.

Figure 10A:
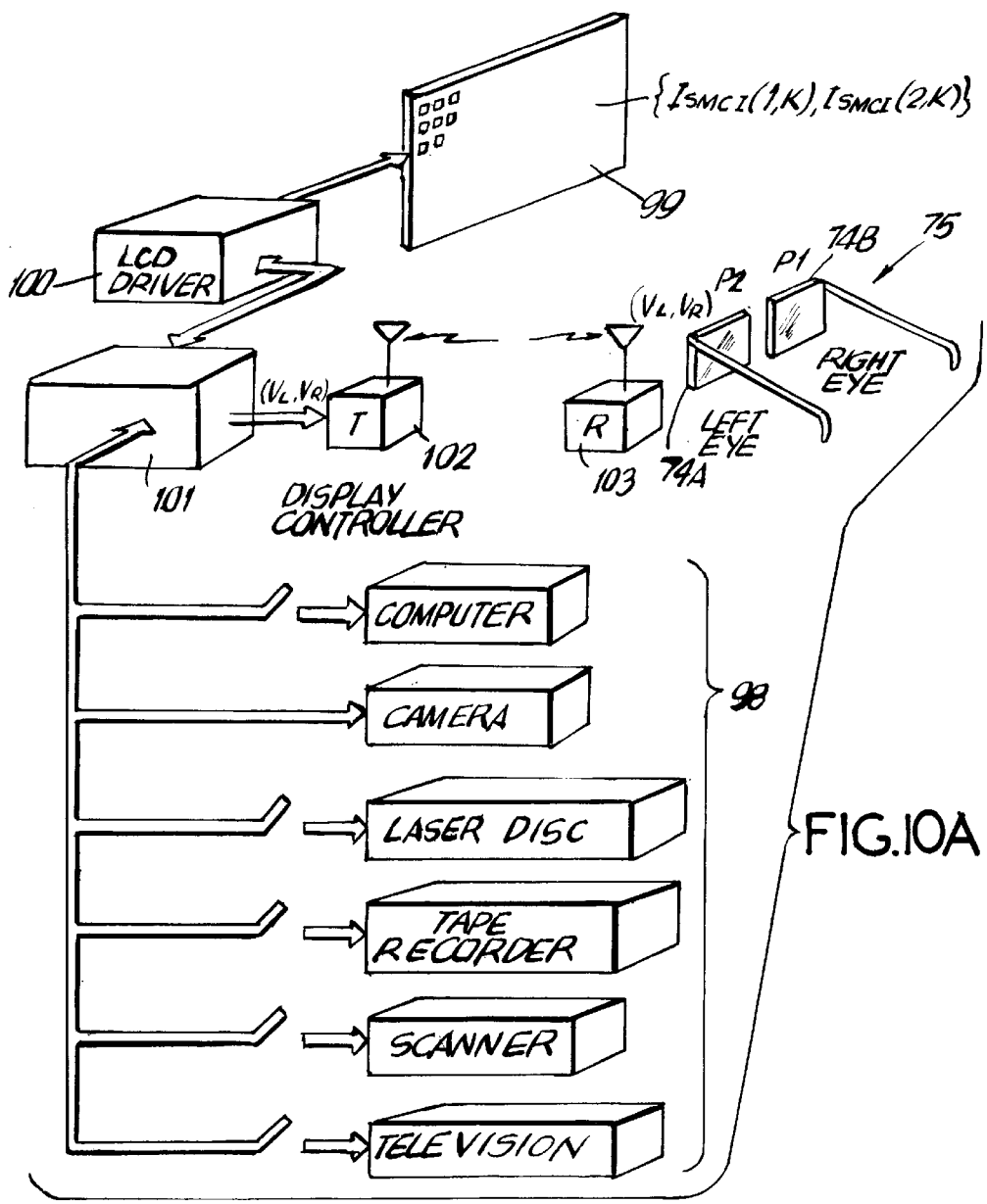
FIG. 10A is a schematic representation of a system adapted for receiving a pair of spectrally-multiplexed color images of 3-D scenery from a selected SCMI generating device of the present invention, and for displaying the same so that the 3-D imagery is stereoscopically viewable through a pair of electrically-active polarized spectacles worn by the viewer.
Figure 10C:
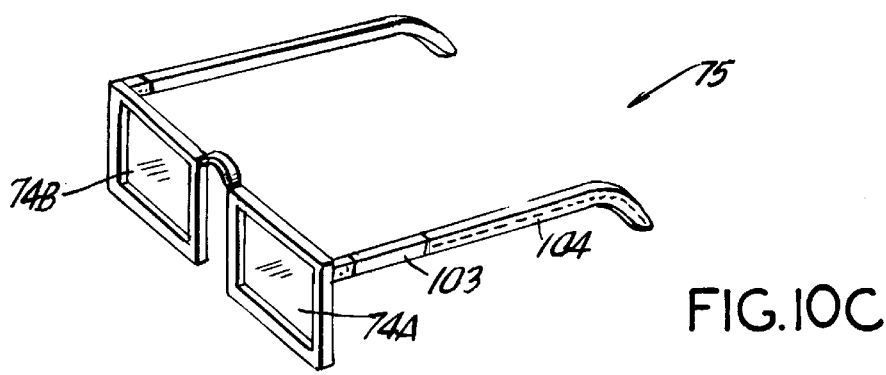
FIG. 10C is a perspective view of an electrically-active pair of polarizing spectacles constructed in accordance with the present invention.

In FIG. 10A, an alternative LCD embodiment of the display system of FIGS. 8A and 8B is shown. As illustrated, LCD system 97 comprises a number of components, namely: one or more devices 98 for producing frames of digital video data representative of spectrally-multiplexed images of 3-D scenery; a flat liquid crystal display(LCD) panel 99 consisting of a matrix of pixel elements; LCD driver circuitry 100 for driving the pixels of the LCD panel; an image display controller (e.g., programmed microprocessor) 101 for receiving frames of digital video data from one or more devices 98 and providing the same to LCD driver circuitry 100 so that spectrally-multiplexed color images are visually displayed on LCD panel 99 at a rate in excess of 30 frames per second; an infrared transmitter 102 for receiving control signals from the display controller and transmitting these signals onto a modulated carrier in the infrared region of the electromagnetic spectrum; an infrared receiver 103 for receiving the transmitted carrier signals and demodulating the same to recover the control signals from the display controller; and lightweight spectacles 75, constructed from a pair of electrically-active polarizing lenses 74A and 74B for imparting time dependent polarization states to particular spectral component groups of light emitted from the LCD panel during the image display process so that the 3-D scene can be stereoscopically viewed therethrough in color and with full depth perception. As illustrated, each polarizing lens 74A, 74B comprises an optical image spectrum polarizer 76 which is directly laminated onto a broad band optical polarizer 77, and is responsive to control signals $V_L$ or $V_R$ recovered from infrared receiver 103. The broad band optical polarizer 77 for the left lens 74A is characterized by either a linear or circular polarization state P2, whereas the broad band optical polarizer for the right lens 74B is characterized by either a linear or circular polarization state P1. Polarizing lenses 74A and 74B, infrared receiver 103 along with its antenna element 104 each mounted within plastic spectacle frame 75 shown in greater detail in FIG. 10C. The construction and operation of each optical image spectrum polarizer 74A and 74B is identical to that described in connection with the optical image spectrum polarizer shown in FIG. 9A. The table shown in FIG. 10B sets forth the spectral components of display outputs, polarization states of spectral components thereof, and various control voltage signals $V_L$ and $V_R$ provided to the optical image spectrum polarizers of the display system during six consecutive image display periods.

Figure 11A:
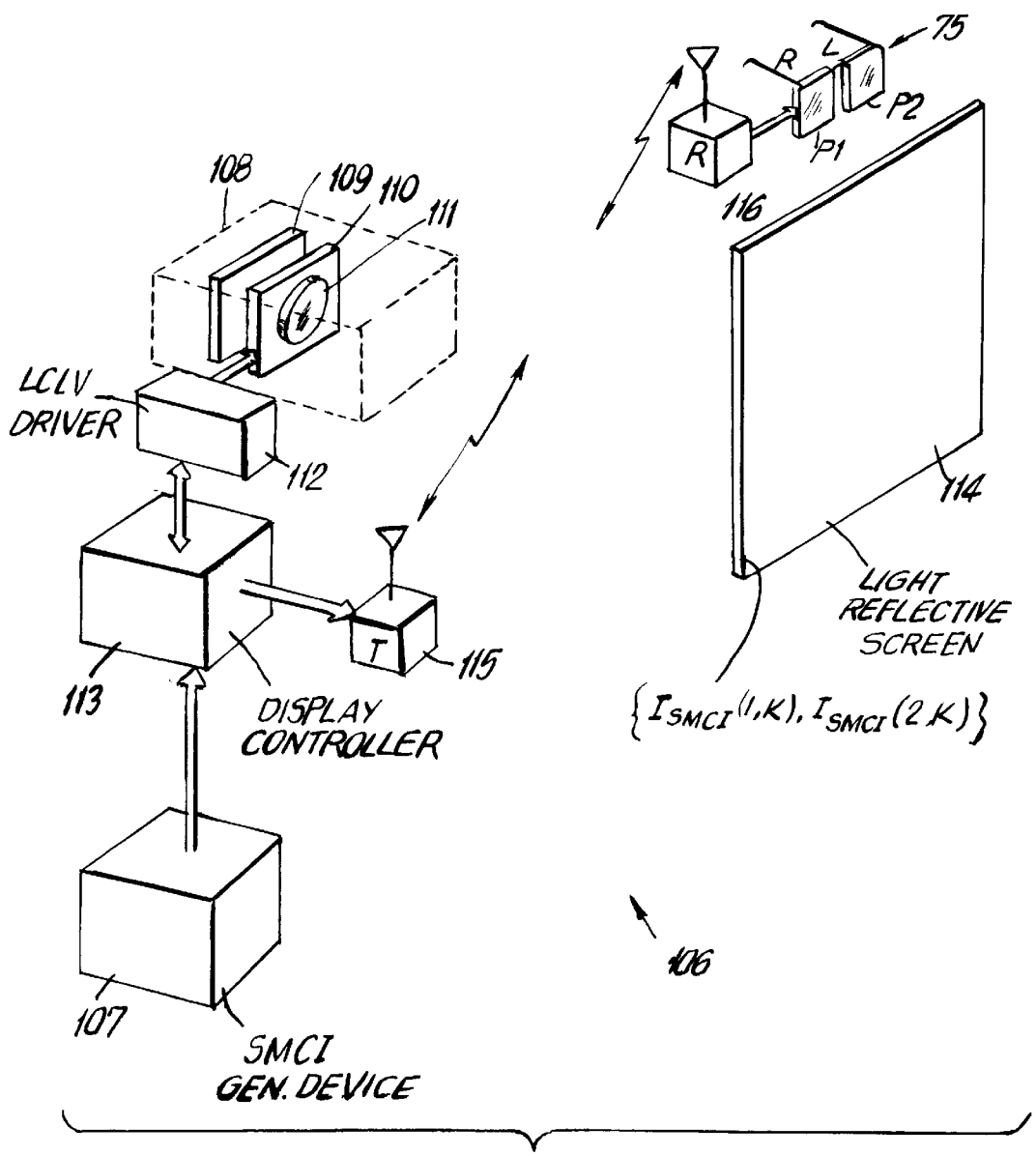
FIG. 11A is a schematic representation of a projection-type system for displaying a pair of spectrally-multiplexed color images of 3-D scenery, stereoscopically viewable through a pair of electrically-active, radio-frequency linked, polarized lenses worn by the viewer and embodying the optical-image spectrum polarizers shown in FIG. 9E.

In FIG. 11A, a projection type embodiment of the display system of FIGS. 8A and 8B is shown. As illustrated, projection display system 106 comprises a number of components, namely: a device 107 in accordance with the present invention for producing frames of digital video data representative of spectrally-multiplexed color images of 3-D scenery; a color LCLV-type image projector 108 consisting of an illumination source 109, a liquid crystal light valve (LCLV) 110, image projection lens 111 and supporting electronics known in the image display art; an LCLV driver circuit 112 for actively driving the pixel elements of LCLV 110; an image display controller (e.g., programmed microprocessor) 112 for receiving frames of digital video data from one or more devices 107 and providing the same to LCLV driver circuit so that spectrally-multiplexed color images are visually displayed from LCLV 110 onto a reflective display surface 114 at a rate in excess of 30 frames per second; an infrared transmitter 115 for receiving control signals from the display controller 113 and transmitting these signals onto a modulated carrier in the infrared region of the electromagnetic spectrum; an infrared receiver 116 for receiving the transmitted carrier signals and demodulating the same to recover the control signals; and lightweight spectacles 75. In this particular embodiment of the present invention, electrically-active polarizing lenses 74A and 74B mounted within spectacles 73 impart time dependent polarization states to particular spectral component groups of light emitted from the LCLV projection panel 110 during the image display process. As a result, 3-D scenery represented within the spectrally-multiplexed images being cyclically displayed can be stereoscopically viewed through spectacles 73 with full depth perception. The table shown in FIG. 11B sets forth the spectral components of display outputs, polarization states of spectral components thereof, and various control voltage signals $V_L$ and $V_R$ provided to the optical image spectrum polarizers of the projection type display system during six consecutive image display periods.

Figure 12A:
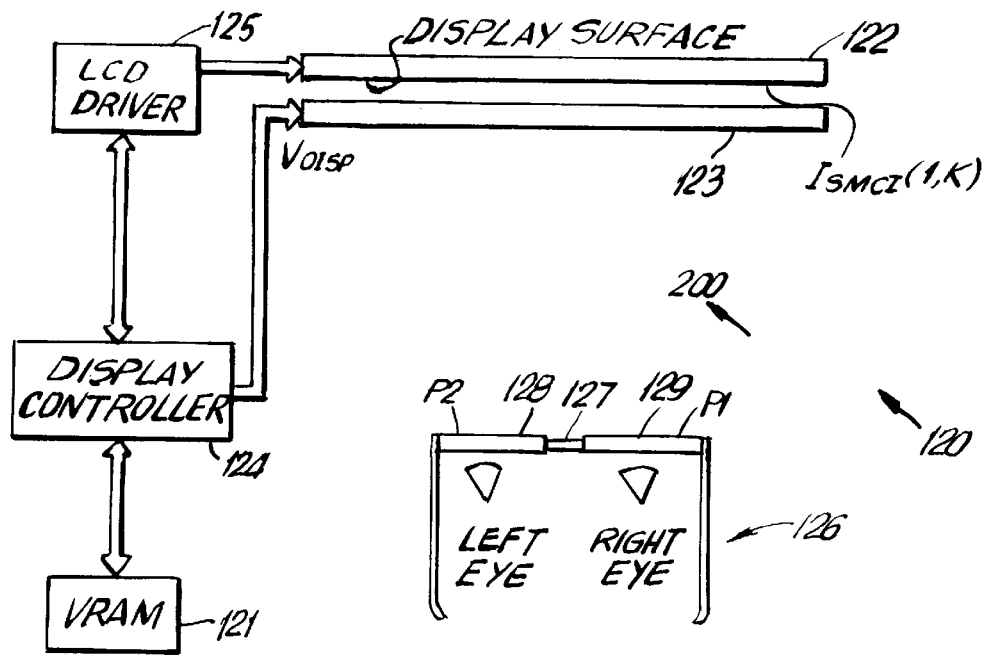
FIGS. 12A and 12B, taken together, provide a schematic representation of a method and system for displaying pairs of spectrally-multiplexed color images of 3-D scenery, stereoscopically viewable through a pair of electrically-passive polarized spectacles worn by the viewer.
Figure 12B:
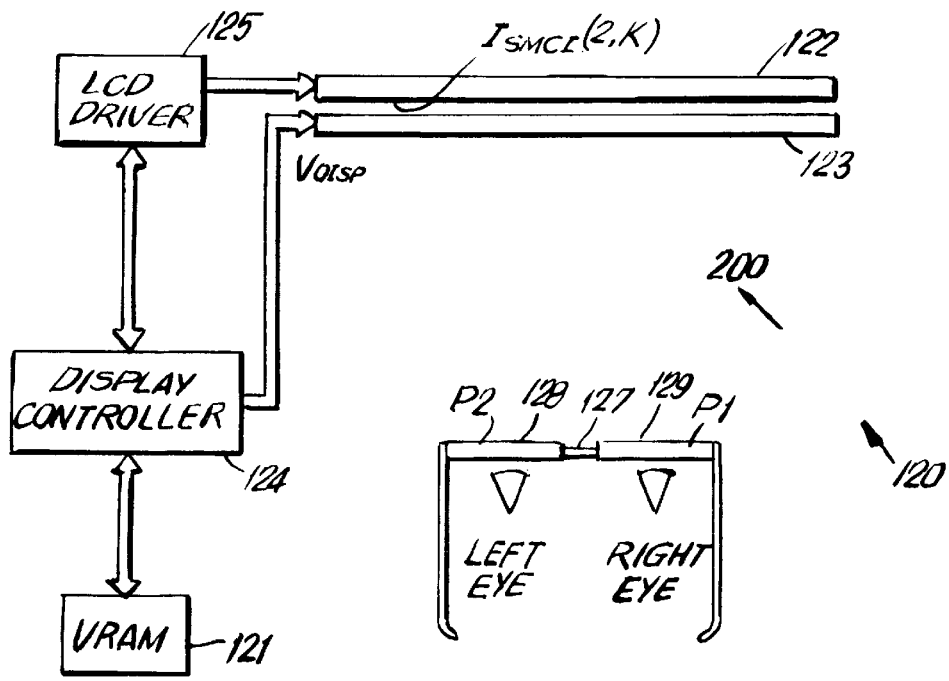

Referring to FIGS. 12A and 12B, a generalized method and system for displaying spectrally-multiplexed color images using electrically-passive polarizing eyewear will now be described. As shown, display system 120 comprises a number of components, namely: VRAM 121 for storing frames of digital video data representative of spectrally-multiplexed color images of 3-D scenery; a flat LCD panel 122 consisting of a matrix of actively driven pixel elements; an optical image spectrum polarizer 123 laminated directly onto flat LCD panel 121 for imparting time dependent polarization states to particular spectral component groups of light emitted from the LCD panel during the image display process; LCD driver circuitry 125 for driving the pixels of the LCD panel; an image display controller (e.g., programmed microprocessor) 124 for accessing frames of digital video data from VRAM 121 and providing the same to LCD driver circuitry 123 so that spectrally-multiplexed color images are visually displayed on the LCD panel at a rate in excess of 30 frames per second; and lightweight spectacles 126 having a lightweight plastic frame 127 within which a pair of polarizing lenses 128 and 129 are mounted. Structurally and functionally, optical image spectrum polarizing panel 123 is identical to the electro-optical device illustrated in FIGS. 9A through 9H and described above, except that the length and width dimensions of optical image spectrum polarizing panel 123 will conform substantially to the length and width dimensions of LCD panel 122. Also, each polarizing lens within spectacles 126 is realized as a broad band optical polarizer. The broad band optical polarizer for left lens 128 is characterized by either a linear or circular polarization state P2, whereas the broad band optical polarizer for right lens 129 is characterized by either a linear or circular polarization state P1.

As shown in FIG. 12A, display controller 124 displays a first spectrally-multiplexed color image of a 3-D scene on LCD panel 122 during each first display period. As illustrated in FIG. 12A, this spectrally-multiplexed color image contains only the first spectral component group SCG1 of the left perspective image and the second spectral component group SCG2 of the right perspective image. During this display period, the display controller provides a first control signal $V_{OISP1}$ to optical image spectrum polarizer 123, thereby adjusting its spectral polarizing characteristics so that the first spectral component group SCG1 of the left perspective image is imparted with a linear or circular polarization state P1 upon emerging from its optically transparent output surface, while the second spectral component group SCG2 of the right perspective image is imparted with a linear or circular polarization state P2 upon emerging from its optically transparent output surface. As a result of the spectral polarizing functions performed by the optical image spectrum polarizer during each first display period, the left polarized lens 128 characterized by polarization state P2 permits only the first spectral component group SCG1 of the left perspective image to propagate from the display surface, through transmission medium (e.g.,air) 200 and pass to the viewer's left eye, while the right polarized lens 129 characterized by polarization state P1 permits only the second spectral component group SCG2 of the right perspective image to propagate from the display surface, through the transmission medium, and to the viewer's right eye.

As shown in FIG. 12B, the display controller displays a second spectrally-multiplexed color image of a 3-D scene on the LCD panel during a second display period. As illustrated in FIG. 12B, this spectrally-multiplexed color image contains only the second spectral component group SCG2 of the left perspective image and the first spectral component group SCG1 of the right perspective image. During this display period, the display controller provides a second control signal $V_{OISP2}$ to the optical image spectrum polarizer 123, thereby adjusting its spectral polarizing characteristics so that the second spectral component group SCG2 of the left perspective image is imparted with a linear or circular polarization state P2 upon emerging from its optically transparent output surface, while the first spectral component group SCG1 of the right perspective image is imparted with a linear or circular polarization state P1 upon emerging from its optically transparent output surface. As a result of the spectral polarizing functions performed by the optical image spectrum polarizer during each second display period, the left polarized lens 128 characterized by polarization state P2 permits only the second spectral component group SCG2 of the left perspective image to pass to the viewer's left eye, while the right polarized lens 129 characterized by polarization state P1 permits only the first spectral component group SCG1 of the right perspective image to pass to the viewer's right eye. As this cyclical display process is repeated at least thirty times per second, the spectral components of the left and right perspective images are effectively provided to the left and right eyes of the viewer, permitting full color and stereoscopic viewing of the 3-D scene. The table shown in FIG. 12C sets forth the spectral components of display outputs, polarization states of spectral components thereof, and the control voltage signals $V_{OISP}$ provided to the optical image spectrum polarizer of LCD type display system 120 during six consecutive image display periods.

Figure 13A:
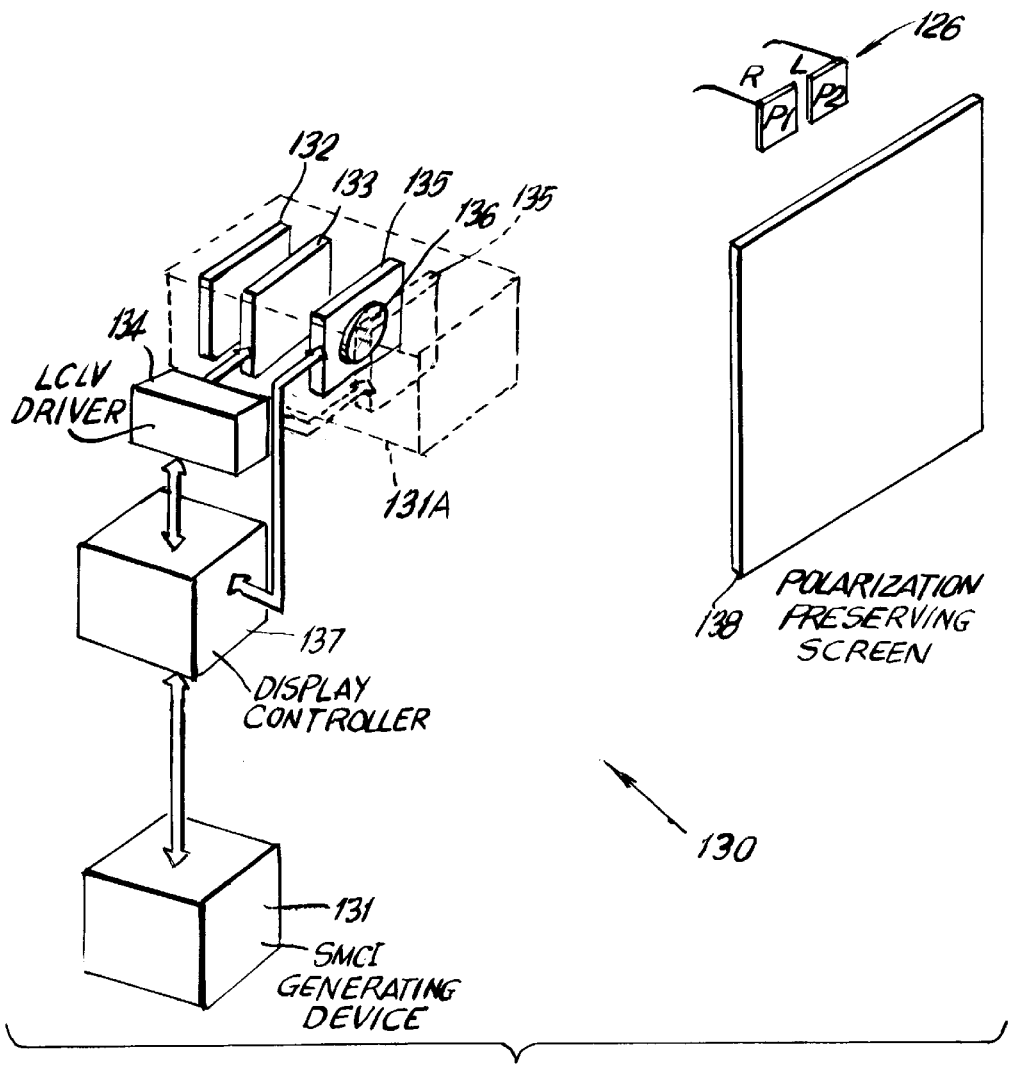
FIG. 13A is a schematic representation of an LCLV type projection system for displaying a pair of spectrally-multiplexed color images of 3-D scenery, stereoscopically viewable through a pair of electrically-passive polarized lenses worn by the viewer.

A projection type embodiment of the display system of FIGS. 12A and 12B is shown in FIG. 13A. As illustrated, projection display system 130 comprises a number of components, namely: a device 131 in accordance with the present invention for producing frames of digital video data representative of spectrally-multiplexed color images of 3-D scenery; a color LCLV-type image projector 131 consisting of an illumination source 132, a liquid crystal light valve (LCLV) panel 133; an LCLV driver circuitry 134 for actively driving the pixels of LCLV panel 133; an optical image spectrum polarizer 135 as shown in FIGS. 9A through 9H; an image projection lens 136 and supporting electronics known in the image display art; an image display controller (e.g.,programmed microprocessor) 137 for receiving frames of digital video data from device 131 and providing the same to color projector 131 so that spectrally-multiplexed color images are visually displayed on a polarization preserving display surface 138 at a rate in excess of 30 frames per second; and lightweight electrically-passive spectacles 126 described above. Preferably, optical image spectrum polarizer 135 is directly laminated onto LCLV projection panel 135, and is responsive to control signals $V_{OISP}$ generated by display controller 137 in order to impart time dependent polarization states to particular spectral component groups of light emitted from the LCLV projection panel during the image display process. The table shown in FIG. 13B sets forth the spectral components of display outputs, polarization states of spectral components thereof, and the control voltage signals $V_{OISP}$ provided to optical image spectrum polarizer 135 during six consecutive image display periods in the projection type display system of FIG. 13A.

Figure 14A:
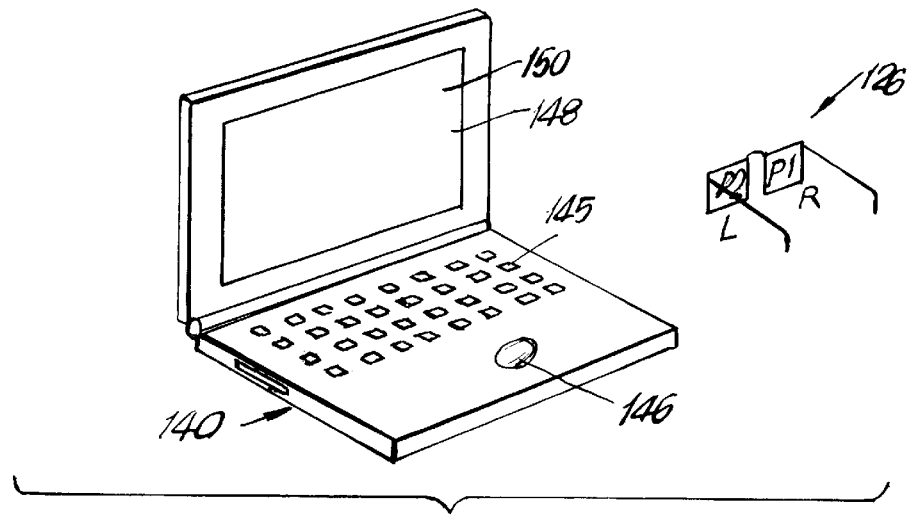
FIG. 14A is a perspective diagram of a portable computer having a color stereoscopic display system constructed in accordance with the principles of the present invention.
Figure 14B:
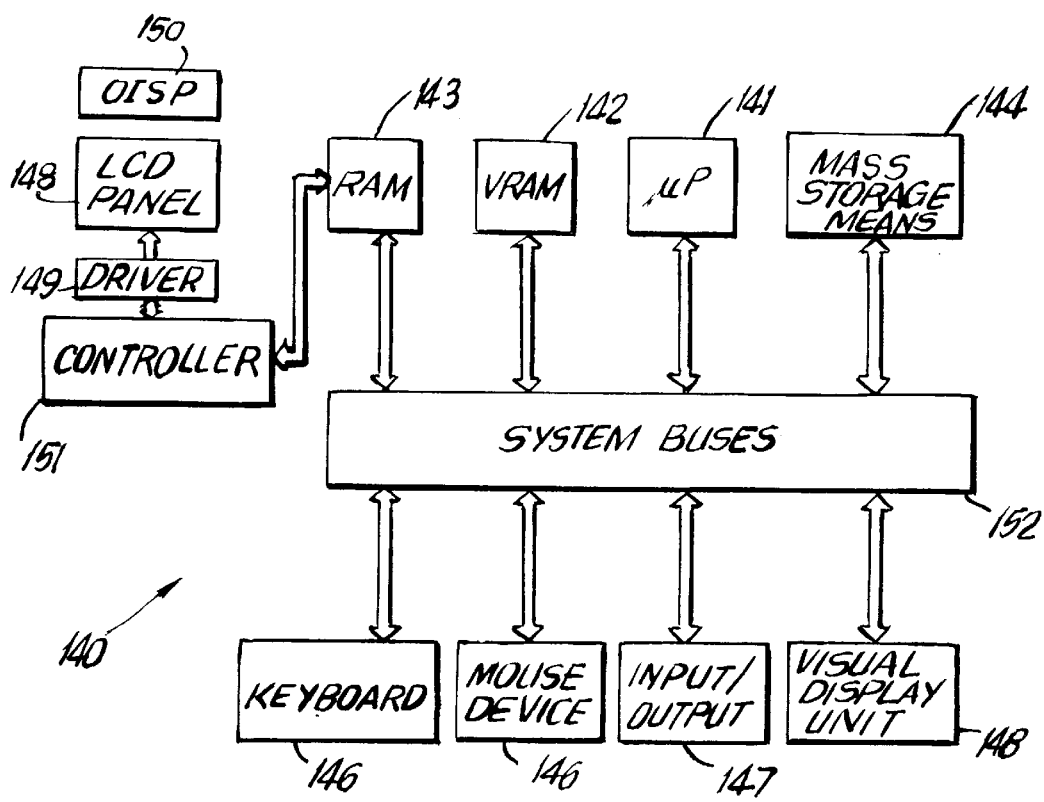
FIG. 14B is a block diagram of the portable computer shown in FIG. 14A.

FIGS. 14A and 14B show a portable notebook type computer system 140 capable of displaying spectrally-multiplexed color images using electrically-passive polarizing eyewear 126 described above. As illustrated in FIGS. 14A and 14B, portable notebook computer system of the present invention comprises a number of integrated system components, namely: one or more central processing units 141 (e.g. microprocessor); hard-disc data storage device 142 for storing an operating system program, application programs, and optionally various image processing routines of the present invention; random access data storage memory (e.g. VRAM) 143 for buffering frames of digital video data representative of spectrally-multiplexed color images of 3-D scenery or objects; a mass-type data storage memory 144 for long term storage of produced pairs of spectrally-multiplexed color images; a keyboard or other text input device 145; a pointing and selecting device (e.g. track-ball) 146; and one or more video output devices 147, such as CD-ROM or a stereo-image producing computer or camera as shown in FIGS. 3,4 or 6A; a flat LCD panel 148 consisting of a matrix of actively driven pixels; LCD panel driver circuitry 149 for driving the pixels of the LCD panel; an optical image spectrum polarizer 150 (similar to polarizer panel 123 shown in FIGS. 12A and 12B) directly laminated onto flat LCD panel 148 for imparting time dependent polarization states to particular spectral component groups of optical images emitted from the LCD panel during the image display process; an image display controller (e.g., programmed microprocessor) 151 for accessing frames of digital video data from VRAM 143 and providing the same to LCD driver circuitry 149 so that spectrally-multiplexed color images are visually displayed on the LCD panel at a rate in excess of 30 frames per second; and electrically-passive lightweight polarizing spectacles 126 of the type shown in FIGS. 12A, 12B, and 13A. As illustrated, these system components are operably associated with the processor 141 by way of one or more system buses 152 in a manner known in the art. In a preferred embodiment, Macintosh System 7 operating system software from Apple Computer, Inc. or Windows operating system software from Microsoft Corporation can be employed in order to enable processor 141 to support at least two input/output windows, pointing and selecting device 146, and multi-media input and output devices 147. The operation of the display system aboard notebook computer 140 is essentially the same as described in connection with the generalized LCD type display system shown in FIGS. 12A and 12B.

Figure 15:
FIG. 15 is a table illustrating the magnitude values for the spectral component groups of exemplary left and right perspective color images which, when processed to produce spectrally-multiplexed color images, may result in potential image-flicker during stereoscopic viewing thereof.

As schematically illustrated in FIG. 15, there may be instances during the production of spectrally-multiplexed color images when either the left and/or right perspective images lack sufficient energy in one or more spectral component groups (i.e. {r} and {b}, and/or {g}). In such instances, the transient energy imbalance in the produced spectrally-multiplexed image will result in there being a moment or so, during the stereoscopic display process, when only one of the viewer's eyes is stimulated (i) with sufficient light energy from the primary spectral component groups (e.g. {r} and {b}, and {g}) of the 3-D image, and (ii) for a predetermined period of time that is functionally related to the retinal response time of the human eye. Consequently when this condition exists in pairs of spectrally-multiplexed composite images, then it is possible that some viewers may be more susceptible than others in perceiving what appears to be "image-flicker" during the stereoscopic viewing process. In order to eliminate the possibility of such image-flicker perception during the stereoscopic viewing process, the following techniques have been developed.

In accordance with the present invention, flicker free stereoscopic images can be produced independent of the spectral power distribution of perspective images by using the method of spectral-multiplexing illustrated in FIGS. 16A to 17G. In general, this method can be carried out using the computer system of FIG. 3, the camera system of FIG. 7A, or any other computer-based SMCI producing system of the present invention. As in the case of the spectral multiplexing methods shown in FIGS. 3A to 3E and 7B to 7E, each perspective color image produced within and processed by the SMCI computer system comprises a matrix of pixels. Each pixel in the image matrix is designated as $P(x_i,y_j)= (\{x_i,y_j\},\{r_{i,j}\},\{g_{i,j}\},\{b_{i,j}\})$, and has a composite color value representative of the spectral content of the image at the pixel's location in the image, indicated by the coordinate pair (x, y). In typical color video applications, the color value of each pixel contains a magnitude for each of the spectral components, e.g. $\{g_{i,j}\},\{b_{i,j}\},\{r_{i,j}\}$, constituting the system of color representation being used in the illustrative embodiment. In the SMCI computer system of the present invention, the left and right color perspective images are stored in data storage memory (e.g. frame buffers) 8 and are then processed by processor 6 in accordance with the spectral-multiplexing algorithm schematically illustrated in FIGS. 17A to 17G. As shown in these figures, the "flicker-free" spectral-multiplexing algorithm also comprises plural stages of pixel-data processing which collectively produce pairs of spectrally-multiplexed color images for display and flicker-free stereoscopically viewing of the 3-D imagery represented in the computer-based system. To achieve computational efficiency, several of these stages can be performed in parallel as shown.

Figure 16A:
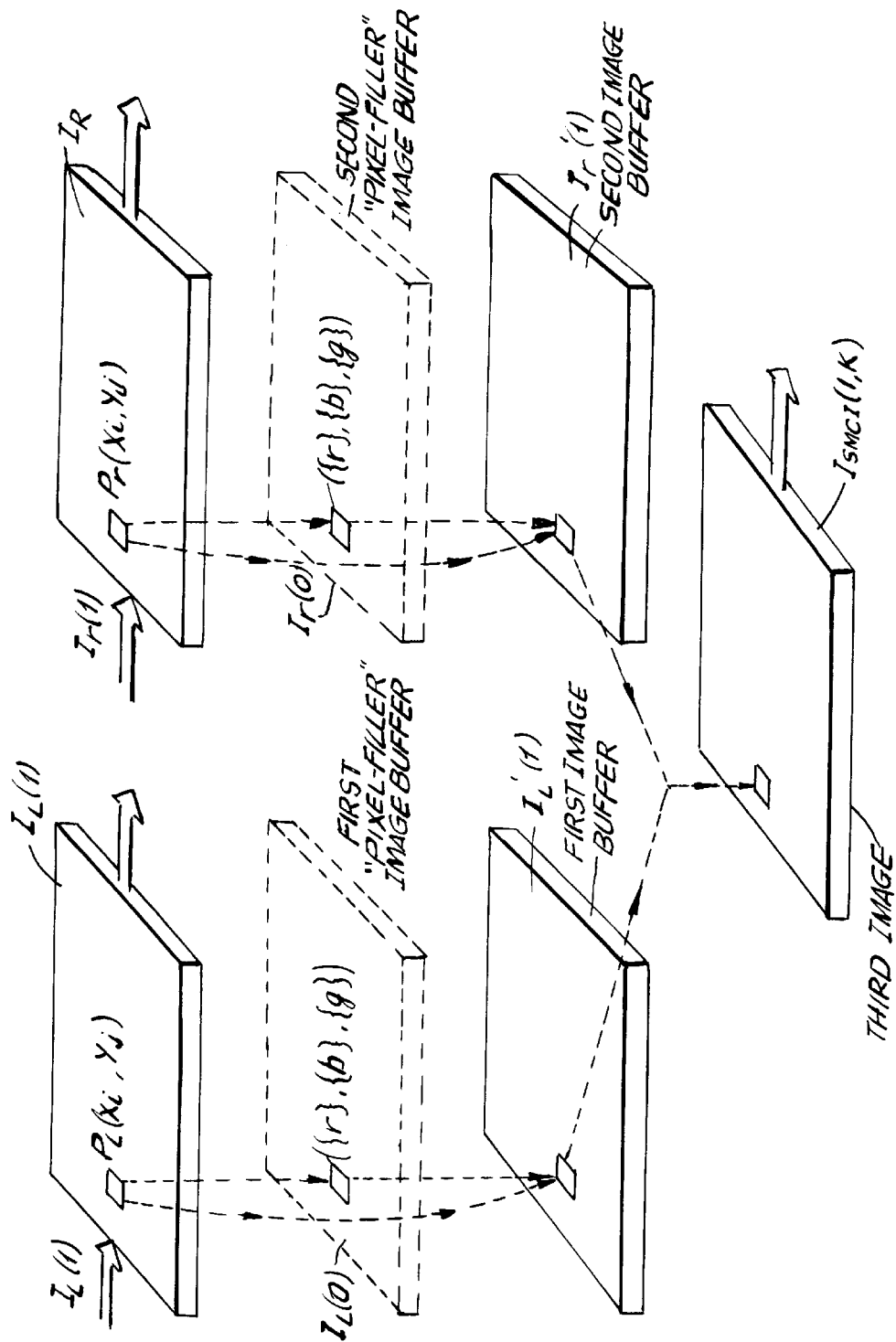
Figure 17A:
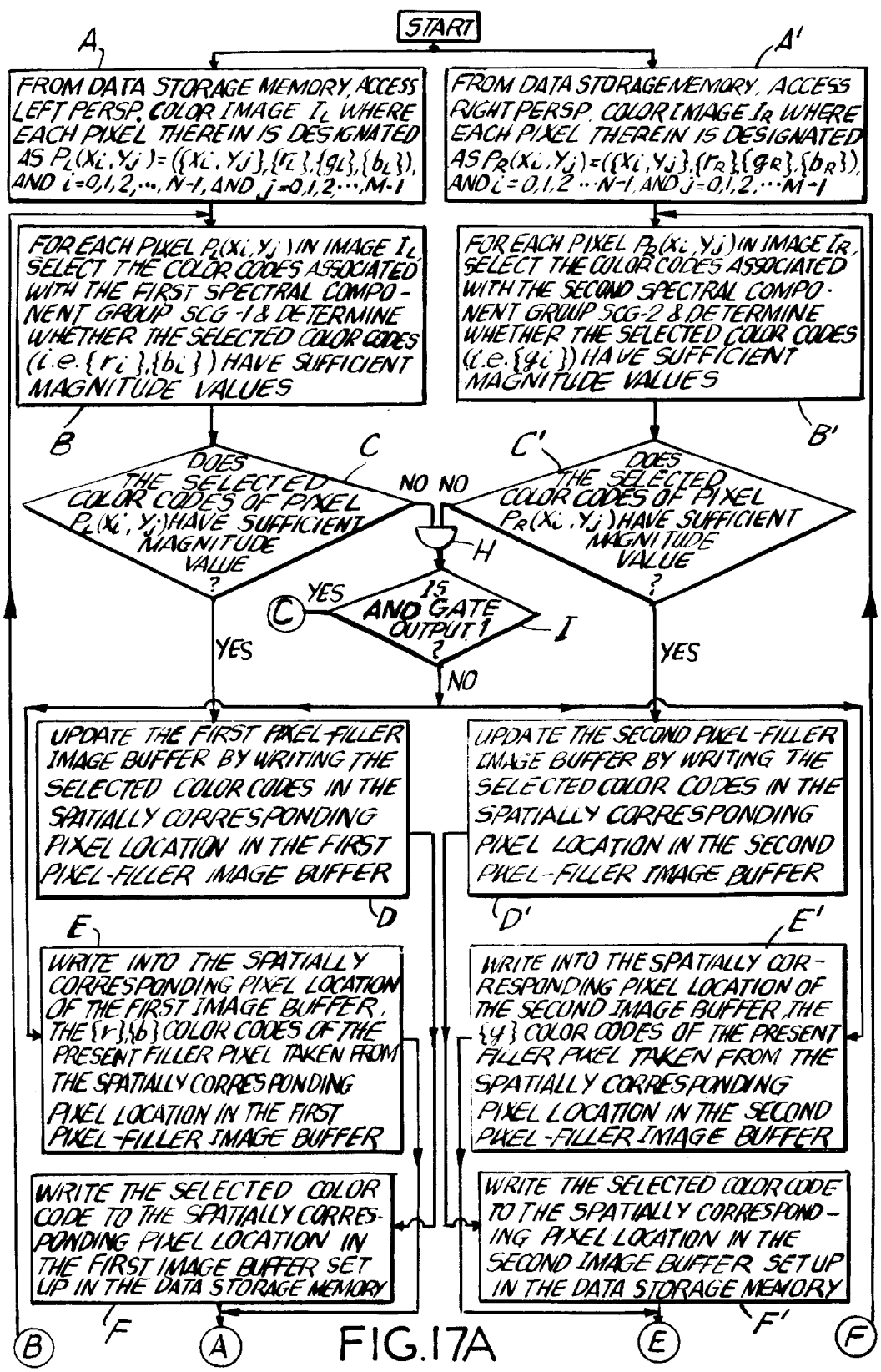
Figure 17C:
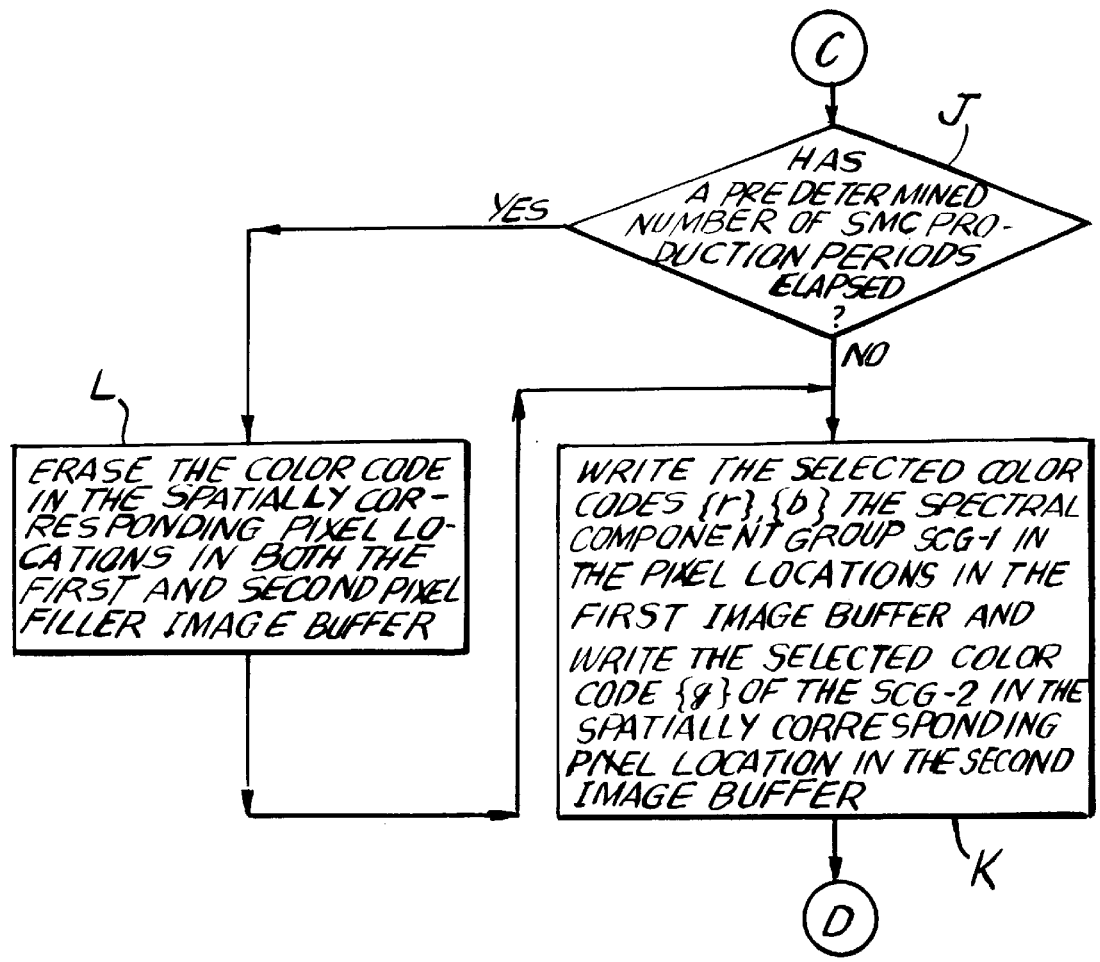

As illustrated at Block A in FIG. 17A, processor 6 performs the first step in the first stage of the spectral-multiplexing algorithm by accessing from data storage memory 8, a frame of digital data representative of the left perspective color image $I_L$ where each pixel therein is designated as :$P(x_i,y_j)=(\{x_i,y_j\},\{r_i,y_j\},\{g_{i,j}\},\{b_{i,j}\})$, and i=0, 1, . . . N−1 and j=0,1, . . . ,M−1. At Block B, for each pixel $P_L(x_i,y_j)$ in the left color perspective image $I_L$, the processor selects the color value (i.e. color code) associated with the first predefined spectral component group SCG1 (i.e.{r}, {b}) and determines whether the selected color codes have sufficient magnitude values (i.e. exceed a predetermined power threshold). Notably, this predetermined power threshold can be readily determined by empirical investigation of the human vision system. If at Block C the processor determines that the selected color codes of pixel $P_L(x_i,y_j)$ have sufficient magnitude values, then at Block D the processor updates the first pixel-filler image buffer shown in FIG. 16A by writing the selected color codes in the spatially corresponding pixel location in the first pixel-filler image buffer set up in data storage memory 8. Thereafter the processor proceeds to Block F and writes the selected color code to the spatially corresponding pixel location in the first image buffer set up in data storage memory.

While the pixel-data processing operations set forth at Blocks A through F are being carried out, the corresponding pixel-data processing operations set forth at Blocks A' through F' are preferably carried out in parallel using a second image buffer set up in data storage memory. For purposes of completion, these operations will be described below.

As illustrated at Block A' in FIG. 17A, the first step in the second stage of the spectral-multiplexing algorithm involves accessing from data storage memory 8, a frame of digital data representative of the right perspective color image I R where each pixel therein is designated as :$P(x_i,y_j)=(\{x_i,y_j\},\{r_{i,j}\},\{g_{i,j}\},\{b_{i,j}\})$, and i=0,1, . . . N−1 and j=0,1, . . . ,M−1. At Block B', for each pixel $P_R(x_i,y_j)$ in the right color perspective image $I_R$, the processor selects the color value (i.e. color code) associated with the second predefined spectral component group SCG2 (i.e. {g}) and determines whether the selected color code has a sufficient magnitude value. If at Block C' the processor determines that the selected color value of pixel $P_R(x_i,y_j)$ from the right perspective image IR has a sufficient magnitude value, then at Block D' the processor updates the second pixel-filler image buffer shown in FIG. 16A by writing the selected color code in the spatially corresponding pixel location in the second pixel-filler image buffer. Thereafter the processor proceeds to Block F' and writes the selected color code to the spatially corresponding pixel location in the second image buffer set up in the data storage memory.

As indicated at Blocks H and I, the processor determines whether the selected color value of pixel $P_L(x_i,y_j)$ from the left perspective image $I_L$ and the selected color value of pixel $P_R(x_i,y_j)$ from the right perspective image $I_R$ both lack a sufficient magnitude value. If so, then the output of AND operation (Block H) will be a logical 1. When this condition is determined at Block I, then the processor proceeds to Block J in FIG. 17C. At Block J the processor determines whether a predetermined number of SMCI production periods have lapsed since the output of the AND operation at Block H was a logical "0". Notably, this operation checks to determine whether the spatially corresponding pixel values in the left and right perspective images both lack sufficient energy in the primary color values, a pixel condition incapable of producing image flicker. If the predetermined number of SMCI production periods have elapsed, then at Block L the processor erases (e.g. sets to zero value) the color code(s) in the spatially corresponding pixel locations in both the first and second pixel-filler image buffers. Thereafter the processor proceeds to Block K in FIG. 17C and writes the selected color code(s) of the first spectral component group SCG-1 in the spatially corresponding pixel location in the first image buffer, and writes the selected color code(s) of the second spectral component group SCG-2 in the spatially corresponding pixel location in the second image buffer. Otherwise, if the predetermined number of SMCI production cycles have not elapsed, then the processor proceeds directly from Block J to Block K, as shown. From Block K, the processor proceeds to Blocks G and G' in FIG. 17B.

However, if at Block I its determined that the output of the AND operation (at Block H) is not a logical "1", then the processor proceeds from Block C to Block E during the first processing stage, and from Block C' to Block E' during the second processing stage, as shown in FIG. 17A. At Block E the processor writes into the spatially corresponding pixel location in the first image buffer, the color codes {r} and {b} of the present (i.e. most recently updated) filler pixel taken from the spatially corresponding pixel location in the first pixel-filler image buffer. Similarly, at Block E' the processor writes into the corresponding pixel location in the second image buffer, the color code {g} of the present filler pixel taken from the spatially corresponding pixel location in the second pixel-filler image buffer, as shown in FIG. 16A. When the processor determines at Blocks G and G' that the last pixel in the left and right perspective images have been processed (i.e. i=N−1 and j=M−1), then the processor proceeds to Blocks M and N in FIG. 17B. Only when the output of the AND operation at Block M is a logical "1", then the processor proceeds to Block O. Until this condition is satisfied, the high level flow of the process remains at Block N, awaiting for the first and second spectrally filtered images to be produced.

At Block O, the processor processes the spectrally filtered images residing in the first and second image buffers in order to produce a first spectrally-multiplexed color image $I_{SMCI}$ (1,k). Specifically, for each pair of spatially corresponding pixels in the pair of spectrally filtered images buffered in the first and second image buffers, the processor adds together the corresponding color values $\{r_{x,y}\},\{g_{x,k}\},\{b_{x,y}\}$ in order to yield the (i,j)-th spectrally-multiplexed pixel $P_{SMCI}(x_i,y_j)$ in the first spectrally-multiplexed color image $I_{SMCI}(1,k)$. in the k-th stereo image pair thereof. Then at Block P, the processor writes the spectrally-multiplexed pixel $P_{SMCI}(x_i,y_j)$ into its spatially corresponding pixel location in a third image buffer set up in data storage memory 8, as shown in FIG. 16A. As indicated at Block Q, these pixel-data processing operations are performed for each set of spatially corresponding pixels residing in the first and second image buffers, until the entire first spectrally-multiplexed color image $I_{SCMI}(1,k)$. is generated (i.e., i=N−1 and j=M−1). Then at Block R, the first spectrally-multiplexed color image $I_{SMCI}(1,k)$. is stored in data storage memory 9. As indicated at Block R, the processor thereafter proceeds to Blocks S and S' in order to commence the fourth and fifth stages of pixel-data processing, which produce the second spectrally-multiplexed color image $I_{SMCI}(2,k)$ of the k-th stereo image pair thereof. The details of these pixel data processing operations will be described below.

Figure 17D:
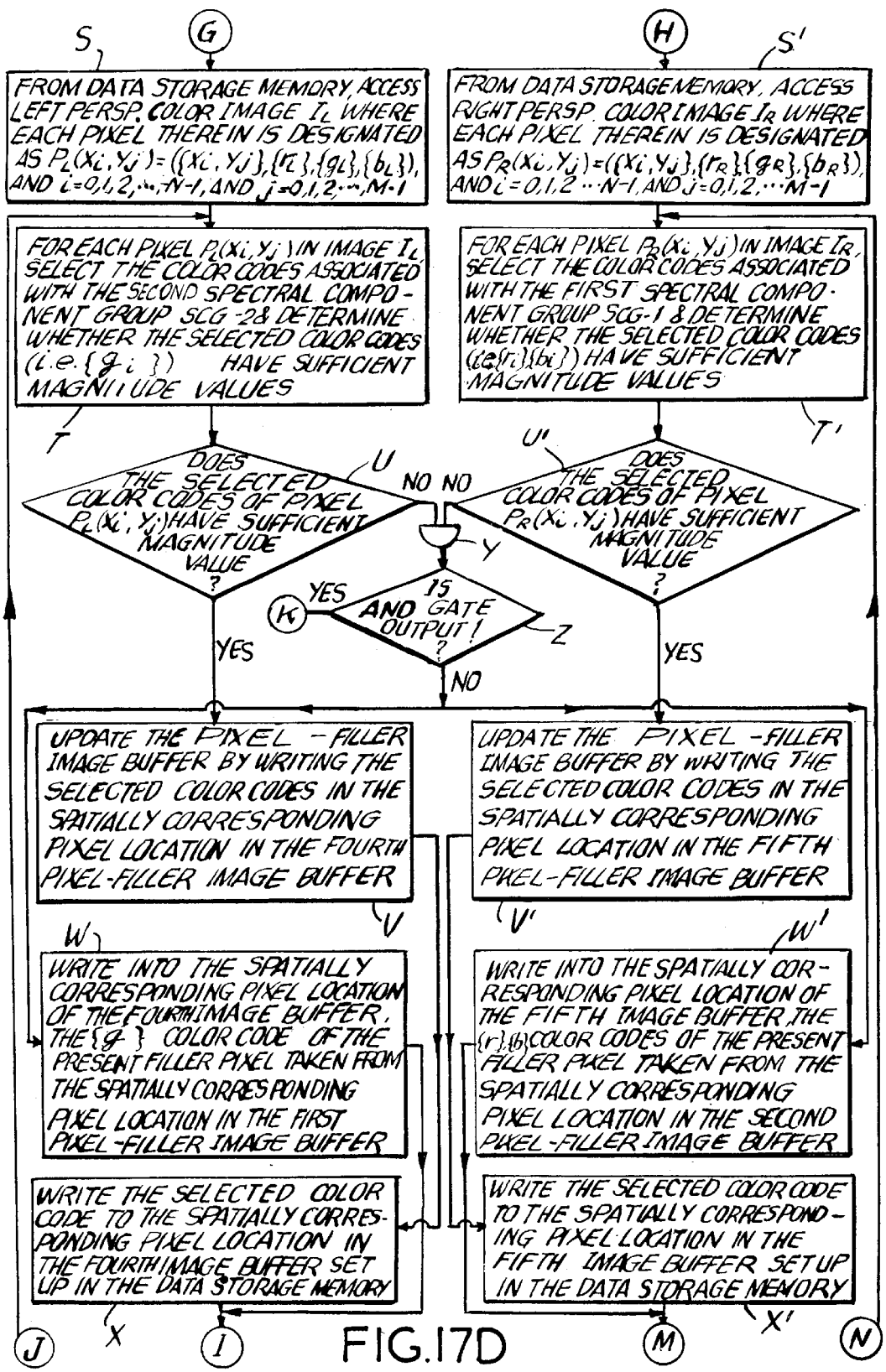

As illustrated at Block S in FIG. 17D, the first step in the fourth stage of the spectral-multiplexing algorithm involves accessing once again from data storage memory 8, the frame of digital data representative of the left perspective color image $I_L$ where each pixel therein is designated as :$P(x_i,y_j)=(\{x_i,y_j\},\{r_{i,j}\},\{g_{i,j}\},\{b_{i,j}\})$, and i=0,1, . . . N−1 and j=0, 1, . . . ,M1. At Block T, for each pixel $P_L(x_i,y_j)$ in the left color perspective image $I_L$, the processor selects the color value (i.e. color code) associated with the second predefined spectral component group SCG2 (i.e. {g}) and determines whether the selected color code has a sufficient magnitude value. If at Block U the processor determines that the selected color value of pixel $P_L(x_i,y_j)$ from the left perspective image $I_L$ has a sufficient magnitude value, then at Block V the processor updates the first filler-pixel image buffer shown in FIG. 16B by writing the selected pixel color value to its spatially corresponding pixel location. Thereafter the processor proceeds to Block X and writes the selected color value to the corresponding pixel location in the fourth image buffer set up in the data storage memory. While the processor carries out the image processing operations set forth at Blocks S through X, it preferably carries out in parallel corresponding operations at Blocks S' through X' using a fifth image buffer set up in data storage memory 8. For purposes of completion, these pixel-data processing operations will be described below.

As illustrated at Block S' in FIG. 17D, the first step in the fifth stage of the flicker-free spectral-multiplexing algorithm involves accessing once again from data storage memory 8, the frame of digital data representative of the right perspective color image $I_R$ where each pixel therein is designated as :$P(x_i,y_j)=(\{x_i,y_j\},\{r_{i,j}\},\{g_{i,j}\},\{b_{i,j}\})$, and i=0,1, . . . .N−1 and j=0,1, . . . ,M−1. At Block T, for each pixel $P_R(x,i,y_j)$ in the right color perspective image $I_R$, the processor selects the color value (i.e. color codes) associated with the first predefined spectral component group SCG1 (i.e. {r}, {b}) and determines whether the selected color value has a sufficient magnitude value. If at Block U' the processor determines that the selected color value of pixel $P_R(x_i,y_j)$ from the right perspective image $I_R$ has a sufficient magnitude value, then at Block V' the processor updates the fourth pixel-filler image buffer shown in FIG. 16B by writing the selected color codes to the spatially corresponding pixel location in a fifth image buffer set up in data storage memory 8. Thereafter the processor proceeds to Block X' and writes the selected color codes to the spatially corresponding pixel location in the fifth image buffer, as illustrated in FIG. 16B.

As indicated at Blocks Y and Z, the processor determines whether the selected color values of pixel $P_L(x_i,y_j)$ from the left perspective image $I_L$ and the selected color value of pixel $P_R(x_i,y_j)$ from the right perspective image $I_R$ both lack a sufficient magnitude value. If so, then the output of AND operation (Block Y) will be a logical "1", and the processor proceeds to Block Z. At Block AA the processor determines whether a predetermined number of SMCI production periods have lapsed since the output of the AND operation at Block Y was a logical"0". Notably, this operation checks to determine whether the spatially corresponding pixel values in the left and right perspective images both lack sufficient energy in the primary color values, a pixel condition incapable of producing image flicker. If the predetermined number of SMCI production periods have elapsed, then at Block CC the processor erases (e.g. sets to zero value) the color codes in the spatially corresponding pixel locations in both the first and second pixel-filler image buffers. Thereafter the processor proceeds to Block BB and writes the selected color codes of the second spectral component group SCG-2 in the spatially corresponding pixel location in the fourth image buffer, and writes the selected color code(s) of the first spectral component group SCG-1 in the spatially corresponding pixel location in the fifth image buffer. Otherwise, if the predetermined number of SMCI production cycles have not elapsed, then the processor proceeds directly from Block AA to Block BB, as shown. From Block BB, the processor proceeds to Blocks Y and Y'.

If however, at Block J the output of AND operation (at Block I) is not a logical "1", then the processor proceeds from Block U to Block W during the first processing stage, and from Block U' to Block W' during the second processing stage, as shown in FIG. 17D. At Block W the processor writes into the spatially corresponding pixel location in the first image buffer, the color codes {g} of the present (i.e. most recently updated) filler pixel taken from the spatially corresponding pixel location in the first pixel-filler image buffer. Similarly, at Block W' the processor writes into the corresponding pixel location in the second image buffer, the color codes {r} and {b} of the present filler pixel taken from the spatially corresponding pixel location in the second pixel-filler image buffer, as shown in FIG. 16B. When the processor determines at Blocks Y and Y' that the last pixel in the left and right perspective images have been processed (i.e. i=N−1 and j=M−1), then the processor proceeds to Blocks DD and EE in FIG. 17E. Only when the output of the AND operation at Block DD is a logical "1", then the processor proceeds to Block FF. Until this condition is satisfied, the process remains at Block EE, awaiting for the third and fourth spectrally filtered images to be produced.

Figure 17E:
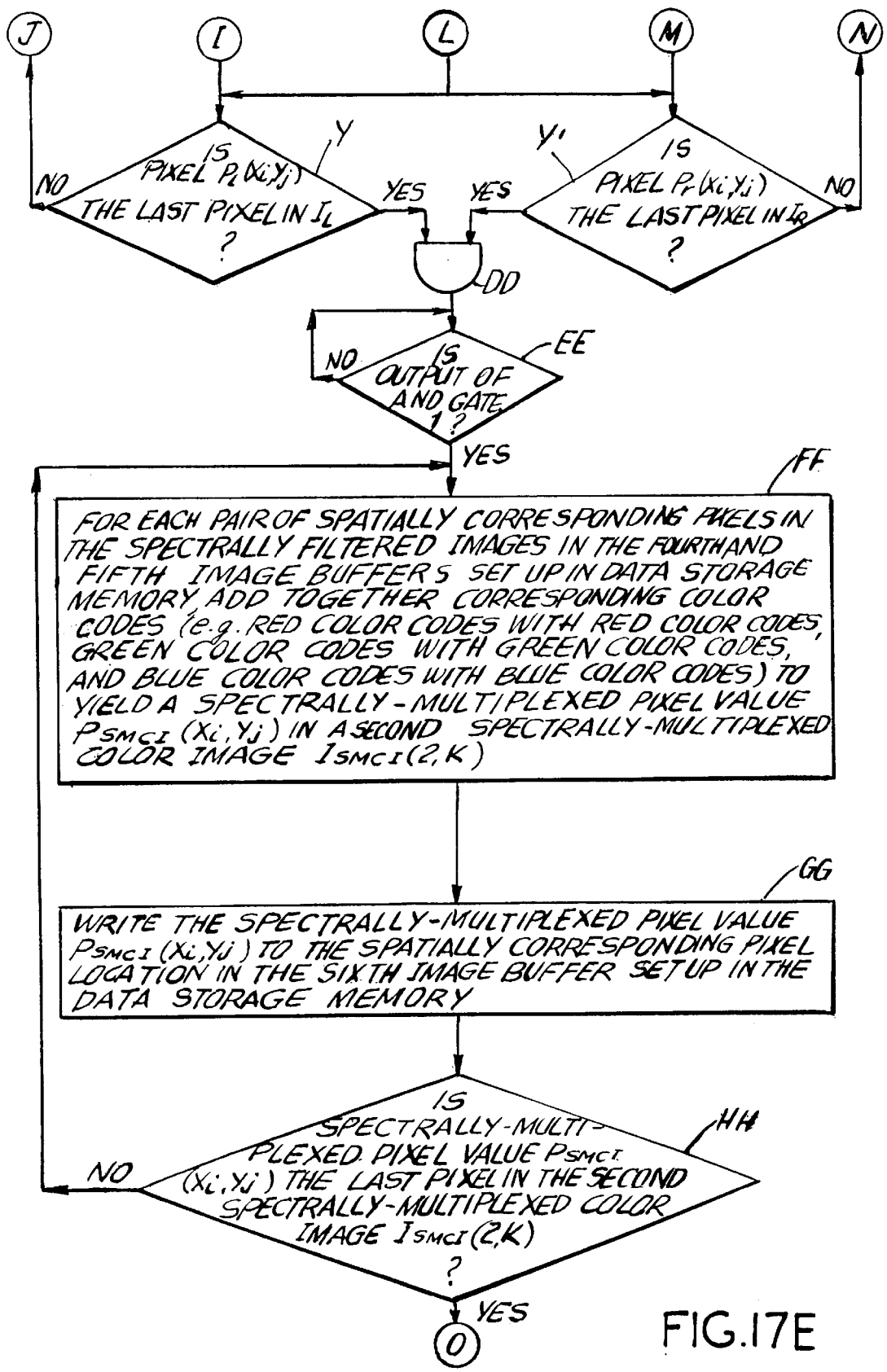
Figure 17F:
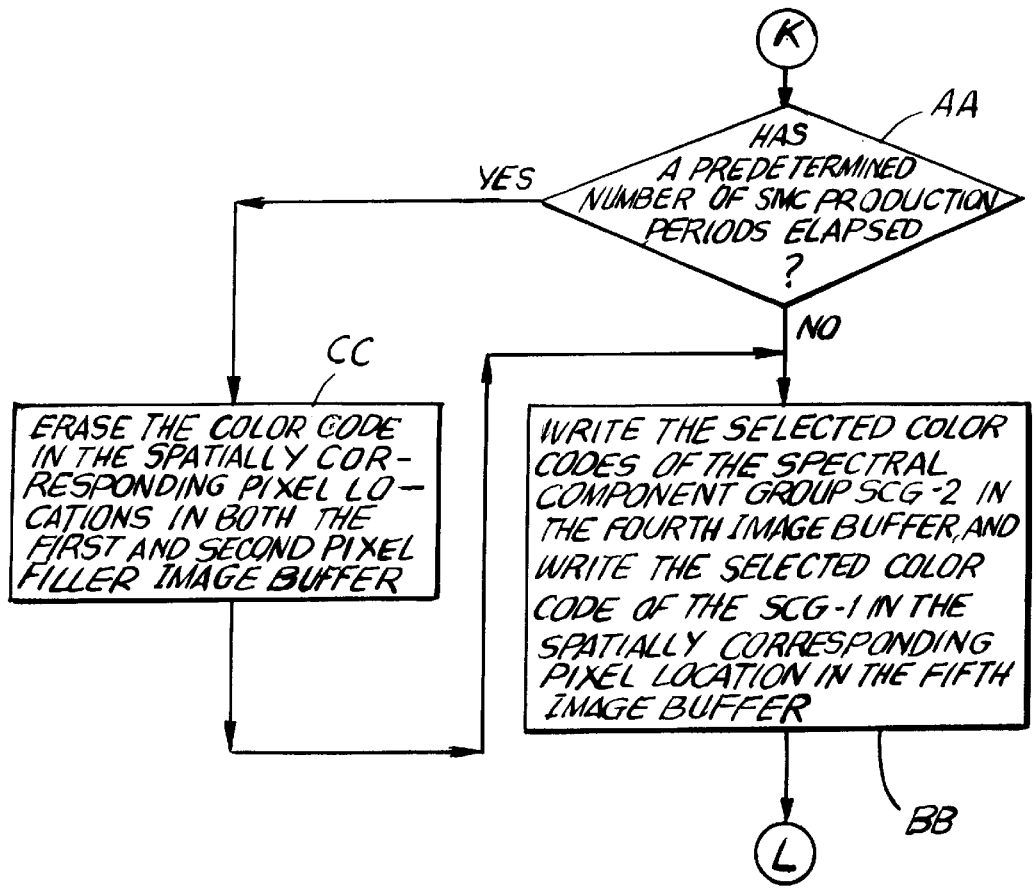
Figure 17G:
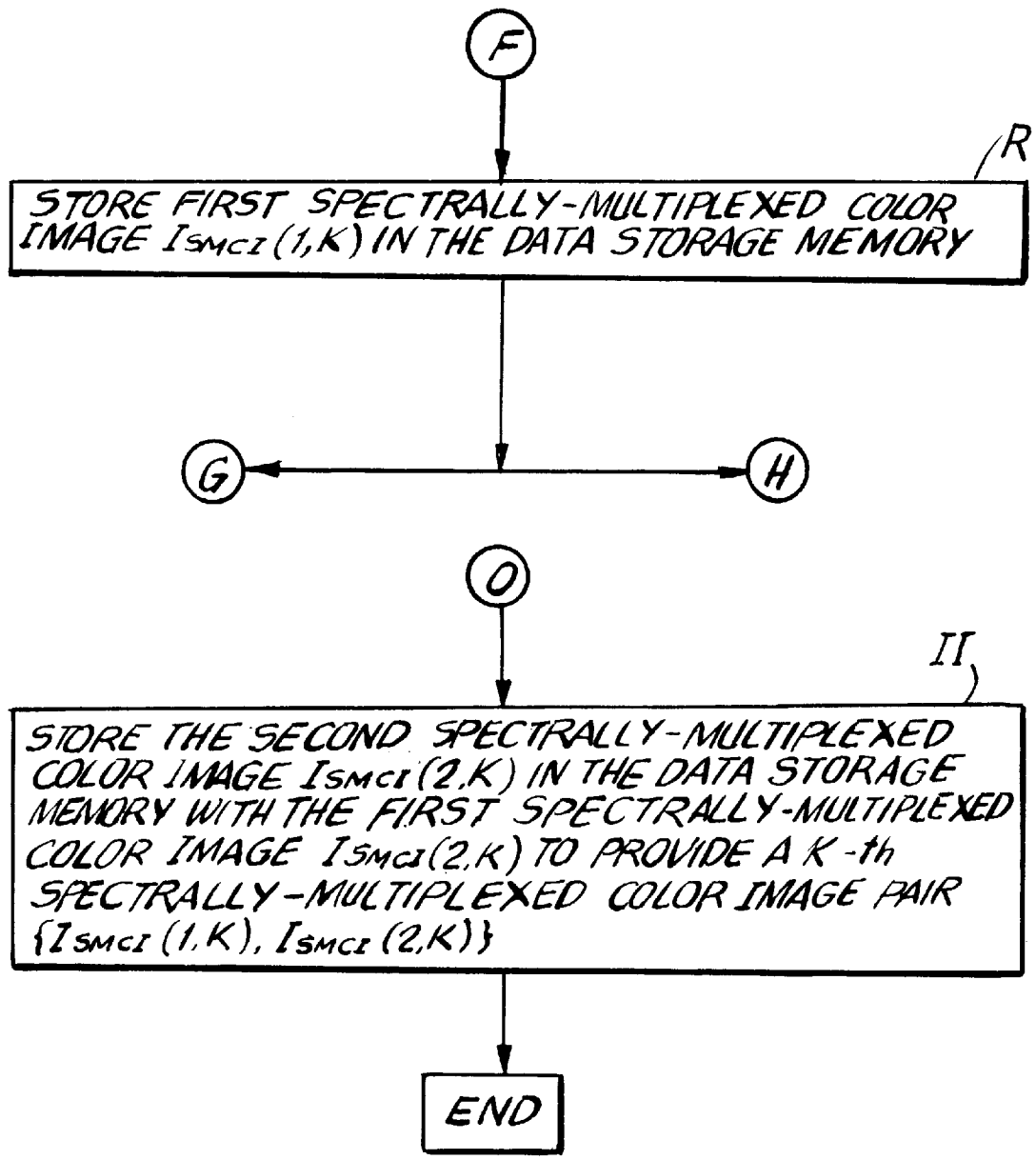

At Block FF in FIG. 17E, the processor processes the spectrally filtered images residing in the fourth and fifth image buffers so as to produce the second spectrally-multiplexed color image $I_{SCMI}(2,k)$. As indicated at Block FF, for each pair of spatially corresponding pixels in the pair of spectrally filtered images buffered in the fourth and fifth image buffers, the processor adds together the corresponding color values $\{r_{x,y}\},\{g_{x,k}\},\{b_{x,y}\}$ in order to yield the (i,j)-th spectrally-multiplexed pixel $P_{SMCI}(x_i,y_j)$ in the second spectrally-multiplexed color image $I_{SMCI}(2,k)$ in the k-th stereo image pair thereof. Then at Block GG, the processor writes the spectrally-multiplexed pixel $P_{SMCI}(x_i,y_j)$ into its spatially corresponding pixel location in a sixth image buffer set up in data storage memory 9, as shown in FIG. 16B. As indicated at Block HH, these pixel-data processing operations are performed for each set of spatially corresponding pixels residing in the fourth and fifth image buffers, until the entire second spectrally-multiplexed color image $I_{SMCI}(2,k)$ is generated. Then at Block II, the second spectrally-multiplexed color image ISMCI(2,k). is stored in data storage memory 9 along with the first spectrally-multiplexed color image $I_{SMCI}(1,k)$ for future access and display. Together, the first and second spectrally-multiplexed color images comprise a spectrally-multiplexed color image pair $\{I_{SCMI}(1,k),I_{SCMI}(2,k)\}$, containing original pixel color codes and possibly "filler" pixel color codes that permit stereoscopic viewing of the original 3-D scene without visual perception of image flicker.

The above-described pixel-data processing method can be repeated upon left and right perspective color images of either real or synthetic 3-D imagery in order to produce spectrally-multiplexed color image pairs at a sufficiently high rate to support flicker-free 3-D stereoscopic display and animation processes. Any of the above-described display techniques can be used for stereoscopically displaying pairs of spectrally-multiplexed color images produced by the spectral-multiplexing process described above.

Alternative techniques may be employed for stereoscopically displaying 3-D images without image flicker. An alternative approach will be described below.

In accordance with this alternative method, the spectral power distributions of perspective color images are analyzed in real-time prior to producing and displaying spectrally-multiplexed color images therefrom. Using information collected from real-time spectral power distribution analysis, particular wavelengths are assigned to the spectral component groups (e.g. SCG1 and SCG2) associated with perspective images to be spectrally multiplexed during the SMCI production processes described above. Sg"adaptive spectral multiplexing" can be achieved using a modified version of the camera system shown in FIG. 6A. Preferably, the adaptive SMCI camera system includes two mechanism, namely: a means for performing spectral power distribution analysis on perspective images presented to the camera system; and also a means for adapting the spectral transmission characteristics of the left and right optical image spectrum multiplexers utilized therein, to a prespecified criteria. The means for performing spectral power distribution analysis can be realized using a beam splitting optics, an color image detecting array, and an image processor programmed to perform spectral power distribution analysis and produce an appropriate set of control signals on a real-time basis. Such control signals carry information representative of the wavelength characteristics comprising the spectral component groups SCG1 and SCG2 in each spectrally-multiplexed color image. Thus as the spectral power distribution of incoming perspective images changes from a predetermined criteria, so too will the spectral component groups SCG1 and SCG2 and the control signals produced from the means for adapting the spectral transmission characteristics of the left and right optical image spectrum multiplexers. In a preferred embodiment, the means for adapting the spectral transmission characteristics of the left and right optical image spectrum multiplexers can be realized using optical image spectrum multiplexers having spectral transmission characteristics that can be selectively changed from recording period to recording period, in response to different control signals produced by the means for performing spectral power distribution analysis. In a preferred embodiment, the prespecified criteria satisfied by the adaptive camera system would be to spectrally multiplex the perspective color images so that the spectral power contained in each pair of left and right perspective color images is substantially equally distributed between the pair of spectrally-multiplexed images produced therefrom.

When using the above described adaptive camera system or a like device for producing spectrally-multiplexed color images, it will be necessary to employ an adaptive display system in order to avoid the possibility of flicker perception during the display process. This is particularly important in instances where the left and right perspective images (used to produce the displayed spectrally-multiplexed images) have severely unbalanced spectral power distributions, as previously illustrated in FIG. 15. An adaptive display system in accordance with the present invention would employ one or two "adaptive" optical image spectrum polarizers, each having spectral polarizing characteristics particularly adapted to change in response to the control signals produced by the image processor programmed to perform spectral power distribution analysis during the spectral-multiplexed color image production process. With this adaptive display system, the wavelengths associated with the spectral component groups SCG1 and SCG2 defined during the SMCI production process, will be polarized during the image display process so that only the spectral components associated with the left perspective image propagate through the transmission medium (e.g. air) to the viewer's left eye, while only the spectral components associated with the right perspective image propagate through the transmission medium to the viewer's right eye.

Figure 18:
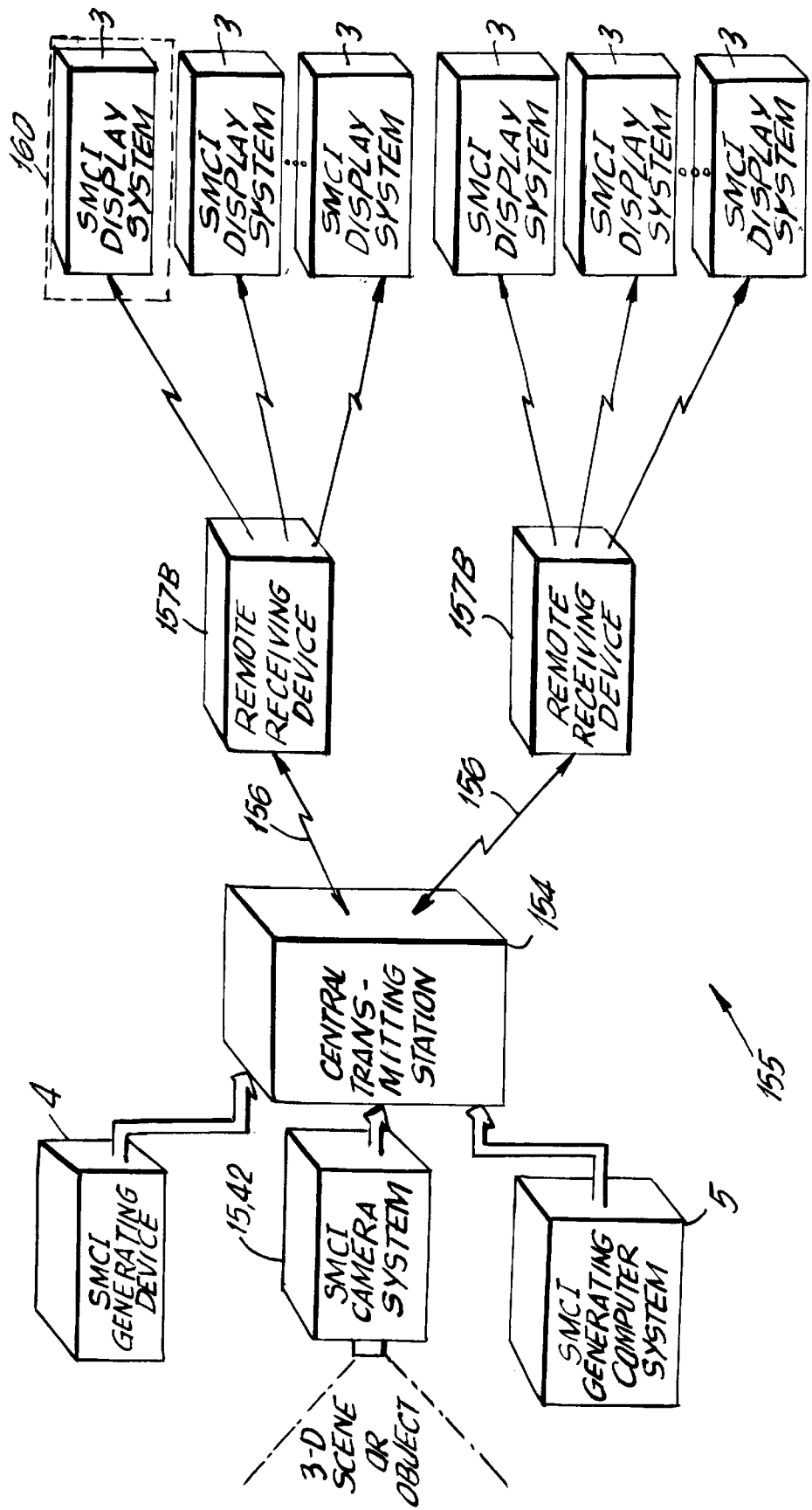
FIG. 18 is a block schematic diagram of a 3-D color television signal transmission and distribution system constructed in accordance with the principles of the present invention.

It is understood that the systems and components of the present invention will find numerous applications in diverse fields of human endeavor including, for example, business, education, scientific research, entertainment and defense. Among these various fields, one such application is Stereo TeleVision (STV) entertainment and educational services, in which the SMCI producing computer, camera or like devices described above is used to supply analog or digital SMCI signals to the central transmitting system 154 (e.g. station) of a television signal transmission and distribution system 155, schematically illustrated in FIG. 18. In general, the central transmitting system includes one or more television carrier signal generators and modulators, which can be used to modulated a television carrier signal by a SMCI video signal, which functions as a modulation signal. In turn, the central transmitting station can transmit the modulated television carrier signal over one or more channels 156 in the television signal transmission and distribution system, to one or more remote television signal receiving devices 157A, 157B. In general, each such channel 156 can be realized as coaxial cable, fiber optical cable and/or the free-space medium, and transmission of such modulated television carrier signals may include the use of microwave or optical transmitters, receivers and/or transceivers, and frequency conversion devices well known in the telecommunication art. At each such receiving device, the modulated television carrier signal can be redistributed to one or more SMCI display systems of the present invention 3, which includes a SMCI display system of the present invention, such as 68, 97, 106, 120, 130 and 140 described above. At each such SMCI display system, the modulated television carrier signal is demodulated and the recovered SMCI signals (including the control signals $V_{OISP}$) are used to display the spectrally-multiplexed color images as hereinbefore described. As discussed above, such images will be displayed at a rate in excess of 30 video frames per second in order to provide flicker-free stereoscopic viewing of 3-D color images.

Figure 19:
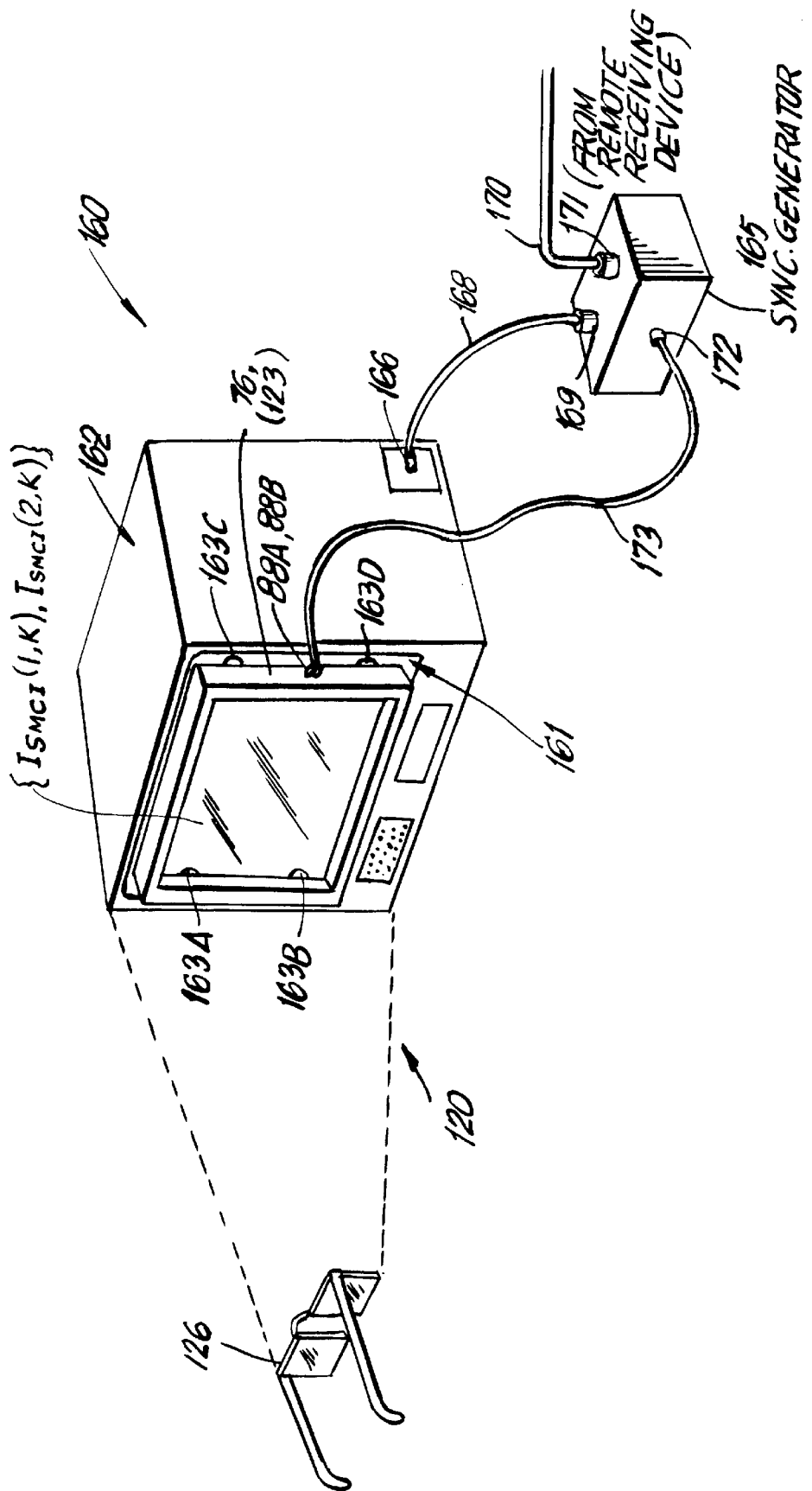
FIG. 19 is schematic diagram illustrating a conventional color television system adapted with the spectral polarization panel of the present invention and interconnected with a cable television signal receiving device within the 3-D color television signal transmission and distribution of the present invention.

In FIG. 19, stereoscopic display system 120 described above is shown operably connected to a remote receiving device 157A (e.g. a cable television signal converter) present in television signal transmission and distribution system 155. As shown, electrically-active spectral polarization panel 76 (123) is releasably mounted to the CRT display surface 161 of a conventional color television set 162, using a set of four suction cup type attachment devices 163A, 163B, 163C and 163D which are fixedly connected to the corners of the plastic frame 87 of the spectral polarization panel 76, detailed in FIG. 9B. The spectral polarization panel is mounted to the CRT display surface by simply pressing the frame against the CRT surface. The spectral polarization panel can be made in a variety of sizes in order to accommodate the various size image display surfaces of commercially available television sets.

In order to interconnect the spectral polarization panel to a remote receiving device 157A (e.g. a cable television converter), a control signal re-generation device 165 is installed in-line between the TV signal input connector 166 on the television set and the signal output connector 167 on the cable television signal converter, as shown. Within the compact housing of the control signal re-generation device is electronic circuitry which processes the analog SMCI television signal provided to its input connector 171 in order to re-generate control signals $V_{OISP}$ for input to control terminals 88A and 88B of the spectral polarization panel, as described above in connection with stereoscopic display system 120. Preferably, the control signal re-generation device is powered by a long-life battery contained within the compact housing of the device.

As shown in FIG. 19, the control signal re-generation device can be interconnected the television set and the cable television signal converter by connecting a first section of coaxial cable 168 between connector 166 and the output signal connector 169 on the control signal re-generation device, and then connecting a second coaxial cable section 170 between the input connector 171 of the control signal re-generation device and the output connector of the cable television signal converter. The control signal re-generation device 165 has an control signal output connector 172 which is operably connected to input conductors 88A and 88B of the spectral polarization panel using a section of flexible shielded cable 173, as shown.

During the operation of the stereoscopic display system, the control signal re-generation device 165 analyzes the received SMCI television signal provided to its input connector terminals, and generates therefrom control signals V1, V2 described above. In turn, these control signals are provided to the spectral polarization panel 76 in order to control the operation of thereof while spectrally-multiplexed images are visually presented upon the CRT display surface of the television set. During this image display process, the the displayed spectrally-multiplexed images are viewed through passive polarization spectacles 126 so that the 3-D imagery carried by the received SMCI television signal is viewed with full depth perception.

It is readily apparant that the above-described stereo television display system has a number of advantages from a practical stand point. Foremost, the technique and system is completely compatible with NTSC Standards; it can be used in connection with non-planar display surfaces provided by CRT devices; it can be practiced in a manner substantially free from image flicker; and it can be used with any conventional television set by simply mounting a spectral polarization panel to the CRT display surface thereof and inserting control signal re-generation device between a the television set and a section of incoming television signal cable. Such accessories are simple and inexpensive to manufacture and distribute to television viewers who desire to stereoscopically view STV™ programs in the comfort of their own home.

Having described the above illustrative embodiments of the present invention, several modifications readily come to mind.

In particular, digital equipment has been used in the illustrative embodiments in order to support the processes of the present invention. It is understood, however, that analog as well as hybrid analog and digital equipment well known in the art can be readily adapted to carry out such processes in accordance with the teachings of the present invention disclosed herein.

While active-pixel type flat panel image display devices have been disclosed in the illustrative embodiments, it is understood that such image display devices can include cathode ray tube (CRT) display devices, plasma display panels, passive back-lighted flat display panels, electroluminescent display panels and the like without departing from the principles of the present invention.

The various embodiments of the present invention will be useful in many diverse stereoscopic imaging applications. However it is also understood that various modifications to the illustrative embodiments of the present invention will readily occur to persons with ordinary skill in the art. All such modifications and variations are deemed to be within the scope and spirit of the present invention as defined by the Claims to Invention appended hereto.

What is claimed is:

1. A system for producing and displaying pairs of first and second spectrally-multiplexed images of a three-dimensional object for use in 3-D stereoscopic viewing thereof substantially free of image flicker, said system comprising:

(A) first pixel data set producing means for producing a first set of pixel data elements representative of a first perspective image of said object and each said pixel data element thereof including color codes representing first and second groups of spectral components contained in said first perspective image;

(B) second pixel data set producing means for producing a second set of pixel data elements representative of a second perspective image of said object and each said pixel data element thereof including color codes representing first and second groups of spectral components contained in said second perspective image;

(C) pixel data element processing means for
  (i) analyzing the color codes of pixel data elements in said first and second pixel data sets,
  (ii) determining which pixel data elements in said first and second pixel data sets have color code values of a prespecified magnitude for one of said first and second spectral component groups, and
  (iii) assigning a filler pixel to each said pixel data element in said first and second pixel data sets which has been determined to have at least one color code value of said prespecified magnitude, thereby producing modified first and second perspective images;

(D) pixel data element multiplexing means for multiplexing the color codes of pixel data elements in said modified first and second perspective images so as to produce third and fourth sets of pixel data elements representative of first and second spectrally-multiplexed images, respectively; and (E) image display means for sequentially displaying said first and second spectrally-multiplexed images using said third and fourth sets of pixel data elements, whereby a human viewer viewing said displayed first and second spectrally-multiplexed images can stereoscopically perceive said three-dimensional object substantially free of image flicker.

2. The system of claim 1, wherein said image display means comprises:
  an image display panel; and
  eyewear having a first electro-optical element positionable in front of the left eye of the viewer and a second electro-optical element positionable in front of the right eye of the viewer.

3. The system of claim 2, wherein said first and second electro-optical lenses of said eyewear are operably connected with said display controller by way of a communication subsystem.

4. The system of claim 2, wherein said first and second electro-optical lenses of said eyewear are operably connected to said display controller by way of a communication subsystem.

5. The system of claim 2, wherein said first electro-optical element comprises
  a first optically transparent input surface through which the first and second groups of spectral components can enter said first electro-optical element,
  a first optically transparent output surface through which the first and second groups of spectral components can exit said first electro-optical element, and
  first spectral-component transmission means, disposed between the first optically transparent input and output surfaces of said first electro-optical element, for transmitting the first group of spectral components of said first perspective image to the left eye of the viewer during said first display period and transmitting the second group of spectral components of said first perspective image to the left eye of the viewer during said second display period, while substantially blocking the transmission of the second and first spectral components of said second perspective image during the first and second display periods, respectively, and wherein said second electro-optical element comprises
  a second optically transparent input surface through which the first and second groups of spectral components can enter said second electro-optical element,
  a second optically transparent output surface through which the first and second groups of spectral components can exit said second electro-optical element, and
  second spectral-component transmission means, disposed between the second optically transparent input and output surfaces of said second electro-optical element, for transmitting the second group of spectral components of said second perspective image to the right eye of the viewer during said first display period and transmitting the first group of spectral components of said second perspective image to the right eye of the viewer during said second display period, while substantially blocking the transmission of the first and second spectral components of said first perspective image during the first and second display periods, respectively.

6. The system of claim 5, wherein said first spectral-component transmission means comprises
  a first polarizing filter panel for transmitting said first and second groups of spectral components while imparting said first polarization state P1 to said first group of spectral components, without imparting any particular polarization state to said second group of spectral components,
  a second polarizing filter panel for transmitting said first and second groups of spectral components while imparting said second polarization state P2 to said second group of spectral components, without changing the polarization state of state of said first group of spectral components, and controllable polarization state conversion means for preserving the first and second polarization states P1 and P2 of the first and second groups of spectral components in response to a first control signal provided to said controllable polarization conversion means during said first display period, and for converting the first polarization state P1 of said first group of spectral components to the second polarization state P2 and the second polarization state P2 of the second group of spectral components to the first polarization state P1 in response to a second control signal provided to said controllable polarization conversion means during said second display period.

7. The system of claim 1, wherein the first group of spectral components of said first and second perspective images include optical wavelengths which induce the perception of the color red and blue in the human vision system, and wherein the second group of spectral components of said first and second perspective images include optical wavelengths which induce the perception of the color green in the human vision system.

8. The system of claim 1, which further comprises image storage means for storing a plurality of pairs of said first and second spectrally-multiplexed color images.

9. The system of claim 1, wherein said image display means comprises:
  an image display panel;
  an electro-optical panel laminated to said image display panel; and
  eyewear, freely transportable relative to said display panel, and having a first polarized lens characterized by polarization state P1 and positionable in front of the left eye of the viewer and a second polarized lens characterized by polarization state P2 and positionable in front of the right eye of the viewer.

10. The system of claim 9, wherein said electro-optical panel further comprises an optically transparent input surface through which the first and second groups of spectral components can enter said electro-optical panel, an optically transparent output surface through which the first and second groups of spectral components can exit said electro-optical panel, first means, disposed between said optically transparent input and output surfaces, for imparting a first polarization state P1 to said first group of spectral components, second means, disposed between said optically transparent input and output surfaces, for imparting a second polarization state P2 to said second group of spectral components, and controllable polarization state conversion means, disposed between said optically transparent input and output surfaces, for converting the first polarization state P1 of said first group of spectral components to the second polarization state P2 and the second polarization state P2 of the second group of spectral components to the first polarization state P1 in response to a first control signal provided to said controllable polarization conversion means, and preserving the first and second polarization states P1 and P2 of the first and second groups of spectral components in response to a second control signal provided to said controllable polarization conversion means.

11. The system of claim 10, wherein said first means comprises a first polarizing filter panel for transmitting said first and second groups of spectral components while imparting said first polarization state P1 to said first group of spectral components, without imparting any particular polarization state to said second group of spectral components, and wherein said second means comprises a second polarizing filter panel for transmitting said first and second groups of spectral components while imparting said second polarization state P2 to said second group of spectral components, without changing the polarization state of state of said first group of spectral components.

12. The system of claim 10, which further comprises a display controller for producing said first control signal during each said first display period, and for producing each said second control signal during each said second display period.

13. The system of claim 10, wherein said image display means comprises a liquid crystal light valve(LCLV) image projection panel, and wherein said electro-optical panel laminated to said LCLV image projection panel.

14. The system of claim 10, wherein said polarization state conversion means comprises a polarization state conversion panel, and wherein said image display panel, said first polarizing filter panel, said second polarizing filter panel and said controllable polarization state conversion panel are laminated together to form integral unit of substantially planar geometry.

15. The system of claim 14, wherein said polarization state conversion panel comprises a half-wave phase retardation panel.

16. A method of producing a pair of pixel data sets representative of a pair of spectrally-multiplexed images of a three-dimensional scene, for use in stereoscopic viewing thereof substantially free of image flicker, said method comprising the steps of:

(a) producing first and second pixel data sets representative of first and second perspective images of said three-dimensional scene, respectively, each said perspective image having at least first and second groups of spectral components and each said pixel data set containing data representative of the first and second groups of spectral components;

(b) analyzing the color codes of pixel data elements in said first and second pixel data sets;

(c) determining which pixel data elements in said first and second pixel data sets have color code values of a prespecified magnitude for one of said first and second spectral component groups;

(d) assigning a filler pixel to each said pixel data element in said first and second pixel data sets which has been determined to have at least one color code value of said prespecified magnitude, thereby producing modified first and second perspective images;

(e) multiplexing the color codes of pixel data elements in said modified first and second perspective images so as to produce third and fourth sets of pixel data elements representative of first and second spectrally-multiplexed images, respectively; and (f) sequentially displaying said first and second spectrally-multiplexed images using said third and fourth sets of pixel data elements, whereby a human viewer viewing said displayed first and second spectrally-multiplexed images can stereoscopically perceive said three-dimensional scene substantially free of image flicker.

17. The method of claim 16, wherein step (a) comprises using a pair of CCD image detecting arrays to detect said first and second perspective images of said three-dimensional scene, and produce said first and second pixel data sets.

18. The method of claim 16, wherein at least step (a) is carried out in a camera system.

19. The method of claim 16 wherein the first group of spectral components of said first and second perspective images include optical wavelengths which induce the perception of the color red and blue in the human vision system, and wherein the second group of spectral components of said first and second perspective images include optical wavelengths which induce the perception of the color green in the human vision system.

20. The method of claim 16, step (a) comprises producing said first and second pixel data sets from a computer-based model of said three-dimensional scene.

21. The method of claim 20, wherein at least step (a) is carried out in a programmed computer-based system.

\* \* \* \* \*

UNITED STATES PATENT AND TRADEMARK OFFICE
CERTIFICATE OF CORRECTION

PATENT NO : 6,111,598
DATED : August 29, 2000
INVENTOR(S): Sadeg M. Faris

It is certified that error appears in the above-identified patent and that said Letters Patent is hereby corrected as shown below:

Assignee: Reveo, Inc., of Elmsford, New York 10523 US

Signed and Sealed this

Twenty-ninth Day of May, 2001

Attest:

NICHOLAS P. GODICI

*Attesting Officer*  *Acting Director of the United States Patent and Trademark Office*